(12) United States Patent
Davydov et al.

(10) Patent No.: US 12,388,496 B2
(45) Date of Patent: Aug. 12, 2025

(54) APPARATUS AND METHOD FOR ALLOCATING RESOURCES IN TIME DOMAIN

(71) Applicant: Samsung Electronics Co., Ltd., Suwon-si (KR)

(72) Inventors: Alexei Vladimirovich Davydov, Moscow (RU); Gregory Vladimirovich Morozov, Moscow (RU); Dmitry Sergeyevich Dikarev, Moscow (RU); Gregory Aleksandrovich Ermolaev, Moscow (RU)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 18/511,227

(22) Filed: Nov. 16, 2023

(65) Prior Publication Data

US 2024/0322865 A1    Sep. 26, 2024

(30) Foreign Application Priority Data

Mar. 24, 2023  (RU) .......................... RU2023107137

(51) Int. Cl.
*H04L 5/00* (2006.01)
*H04B 7/0413* (2017.01)

(52) U.S. Cl.
CPC ......... *H04B 7/0413* (2013.01); *H04L 5/0023* (2013.01); *H04L 5/0048* (2013.01)

(58) Field of Classification Search
CPC .... H04B 7/0413; H04L 5/0048; H04L 5/0023
See application file for complete search history.

(56) References Cited

U.S. PATENT DOCUMENTS

| 11,212,053 B2 | 12/2021 | Manolakos et al. |
| 2021/0014095 A1* | 1/2021 | Ly .......................... H04W 72/23 |

FOREIGN PATENT DOCUMENTS

| EP | 3 949 227 B1 | 3/2023 |
| KR | 10-2427126 B1 | 7/2022 |
| WO | 2021167518 A1 | 8/2021 |

OTHER PUBLICATIONS

3GPP TSG RAN WG1#112, Samsung, Views on DMRS enhancements, R1-2301250 Athens, Greece, Feb. 27-Mar. 3, 2023.

(Continued)

*Primary Examiner* — Rahel Guarino
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). A method is provided for allocating resources in the time domain, the method including in a downlink transmission part of a DL/UL-period of a frame allocating a preset number of adjacent OFDM-symbols for transmission of a PDCCH, generating a bundle of time intervals comprising an integer number of adjacent time intervals, wherein each time interval includes a preset number of OFDM-symbols, wherein the PDCCH relates to the entire bundle of time intervals, allocating a subbundle of OFDM-symbols to transmit a DMRS pattern which multiplexes DMRS signals for a required number of MIMO layers of a PDSCH, and allocating OFDM-symbols for transmission of the PDSCH.

20 Claims, 47 Drawing Sheets

(56) References Cited

OTHER PUBLICATIONS

3GPP TS 38.211 V17.4.0, 3rd Generation Partnership Project;Technical Specification Group Radio Access Network; NR; Physical channels and modulation (Release 17), Dec. 2022.

International Search Report and written opinion dated Feb. 27, 2024, issued in International Application No. PCT/KR2023/095087.

* cited by examiner

| DMRS port index | CDM-group | FD-OCC | | TD-OCC | |
|---|---|---|---|---|---|
| p | Δ | $w_f(k')$ | | $w_t(l')$ | |
| | | k' = 0 | k' = 1 | l' = 0 | l' = 1 |
| 1000 | 0 | +1 | +1 | +1 | +1 |
| 1001 | 0 | +1 | -1 | +1 | +1 |
| 1002 | 1 | +1 | +1 | +1 | +1 |
| 1003 | 1 | +1 | -1 | +1 | +1 |
| 1004 | 0 | +1 | +1 | +1 | -1 |
| 1005 | 0 | +1 | -1 | +1 | -1 |
| 1006 | 1 | +1 | +1 | +1 | -1 |
| 1007 | 1 | +1 | -1 | +1 | -1 |

FIG.4A

| Value | Number of CDM groups without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0, 2, 3 |
| 13~15 | Reserved | Reserved |

| Code point | Loaded CDM groups | Used DMRS port indices |

|  | $n_{SCID} = 0$ | $n_{SCID} = 1$ | $n_{SCID} = 2$ | $n_{SCID} = 3$ |
|---|---|---|---|---|
| $\Delta = 0$ | $N_{ID}^0$ | $N_{ID}^1$ | $N_{ID}^2$ | $N_{ID}^3$ |
| $\Delta = 1$ | $N_{ID}^1$ | $N_{ID}^0$ | $N_{ID}^3$ | $N_{ID}^2$ |
| $\Delta = 2$ | $N_{ID}^2$ | $N_{ID}^3$ | $N_{ID}^0$ | $N_{ID}^1$ |
| $\Delta = 3$ | $N_{ID}^3$ | $N_{ID}^2$ | $N_{ID}^1$ | $N_{ID}^0$ |

FIG. 31

APPARATUS AND METHOD FOR ALLOCATING RESOURCES IN TIME DOMAIN

CROSS-REFERENCE TO RELATED APPLICATION(S)

This application is based on and claims priority under 35 U.S.C. § 119(a) of a Russian patent application number 2023107137, filed on Mar. 24, 2023, in the Russian Intellectual Property Office, the disclosure of which is incorporated by reference herein in its entirety.

BACKGROUND

1. Field

The disclosure relates to wireless communications using advanced demodulation reference signals (DMRSs). More particularly, the disclosure relates to devices and methods for allocating resources in the time domain based on aggregation thereof.

2. Description of Related Art

Considering the development of wireless communication from generation to generation, the technologies have been developed mainly for services targeting humans, such as voice calls, multimedia services, and data services. Following the commercialization of $5^{th}$ generation (5G) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the $6^{th}$ generation (6G) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 μsec, and thus, will be 50 times as fast as 5G communication systems and have the 1/10 radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in millimeter wave (mmWave) bands introduced in 5G, technologies capable of securing the signal transmission distance (that is, coverage) will become more crucial. It is necessary to develop, as major technologies for securing the coverage, radio frequency (RF) elements, antennas, novel waveforms having a better coverage than orthogonal frequency division multiplexing (OFDM), beamforming and massive multiple-Input multiple-output (MIMO), full dimensional MIMO (FD-MIMO), array antennas, and multiantenna transmission technologies, such as large-scale antennas. In addition, there has been ongoing discussion on new technologies for improving the coverage of terahertz-band signals, such as metamaterial-based lenses and antennas, orbital angular momentum (OAM), and reconfigurable intelligent surface (RIS).

Moreover, in order to improve the spectral efficiency and the overall network performances, the following technologies have been developed for 6G communication systems a full-duplex technology for enabling an uplink (UL) transmission and a downlink (DL) transmission to simultaneously use the same frequency resource at the same time, a network technology for utilizing satellites, high-altitude platform stations (HAPS), and the like in an integrated manner, an improved network structure for supporting mobile base stations, and the like, and enabling network operation optimization and automation, and the like, a dynamic spectrum sharing technology via collision avoidance based on a prediction of spectrum usage, an use of artificial intelligence (AI) in wireless communication for improvement of overall network operation by utilizing AI from a designing phase for developing 6G and internalizing end-to-end AI support functions, and a next-generation distributed computing technology for overcoming the limit of user equipment (UE) computing ability through reachable super-high-performance communication and computing resources (such as mobile edge computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. More particularly, it is expected that services, such as truly immersive extended reality (XR), high-fidelity mobile hologram, and digital replica could be provided through 6G communication systems. In addition, services, such as remote surgery for security and reliability enhancement, industrial automation, and emergency response will be provided through the 6G communication system such that the technologies could be applied in various fields, such as industry, medical care, automobiles, and home appliances.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide devices and methods for allocating resources in time domain in a wireless communication system.

Another aspect of the disclosure is to provide techniques which are intended for allocating time domain resources for broadband data transmission and which would allow to avoid the abovementioned negative effects, first of all—the increased demodulation reference signals (DMRS) overhead.

Additional aspects will be set forth in part in the description which follows and, in part, will be apparent from the description, or may be learned by practice of the presented embodiments.

In accordance with an aspect of the disclosure, a method for allocating resources in the time domain which performed in a base station (TRP) in a wireless communication system is provided. The TRP is configured to support simultaneous transmission of a plurality of spatial MIMO layers for data transmission, wherein a DMRS is associated with each of the plurality of MIMO layers.

The method includes, in a downlink transmission part (DL part) of a downlink transmission—uplink transmission period (DL/UL-period) of a frame, allocating a preset number of adjacent OFDM-symbols for transmission of a downlink control channel, generating a DL bundle of time intervals, said bundle comprising an integer number of adjacent time intervals, wherein each time interval includes a preset number of OFDM-symbols, wherein the downlink control channel relates to the entire DL bundle of time intervals, allocating at least one DL subbundle of OFDM-symbols to transmit DMRS signals (DL DMRS-subbundle) for a required number of MIMO layers of a physical downlink shared channel (PDSCH), and allocating, within the DL bundle of time intervals, OFDM-symbols for transmission of the PDSCH. The method includes allocating the DL bundle of time intervals for DL transmission. Furthermore, the downlink control channel carries control information including at least an indication of a beginning of the DL bundle of time intervals and of duration of the DL bundle of time intervals. Preferably, duration of the frame is 10 milliseconds (ms), wherein the frame includes a plurality of DL/UL-periods, and duration of the DL/UL-period is defined by the base station.

The downlink control channel is preferably a physical downlink control channel (PDCCH), and the control information is represented as downlink control information (DCI) carried in the PDCCH, wherein the indication of the beginning of the DL bundle of time intervals is preferably an indication of a start OFDM-symbol of the DL bundle of time intervals.

According to an embodiment of the disclosure, the time interval is a slot comprising 12 or 14 OFDM-symbols. Furthermore, the OFDM-symbols allocated for the transmission of the downlink control channel can be start OFDM-symbols of a first slot of the DL bundle of slots. Moreover, the DL slot bundle can include said at least one DL DMRS-subbundle, wherein a first DL DMRS-subbundle of the at least one DL DMRS-subbundle can be adjacent to the OFDM-symbols allocated for the transmission of the downlink control channel. The indication of the beginning of the DL slot bundle can be an indication of a start slot of the DL slot bundle.

According to an embodiment of the disclosure, said at least one DL DMRS-subbundle is a plurality of DL DMRS-subbundles separated from each other by a DL period of a configurable number of OFDM-symbols, wherein the control information further includes the DL period. The DL period is adjustable in the TRP. Furthermore, an amount of resources allocated to transmit DMRS signals in a first DL DMRS-subbundle of said plurality can be greater than an amount of resources allocated to transmit DMRS signals in each of subsequent DL DMRS-subbundles of said plurality, in such a way that a number of OFDM-symbols of said subsequent DL DMRS-subbundle is less than a number of OFDM-symbols of the first DL DMRS-subbundle.

According to an embodiment of the disclosure, the time interval is a mini-slot, wherein the mini-slot can include 1, 2, 4, or 7 OFDM-symbols. Furthermore, boundaries of at least a first DL DMRS-subbundle of said at least one DL DMRS-subbundle in the time domain can be aligned with boundaries of the mini-slot.

According to an embodiment of the disclosure, the method provided herein further includes performing channel coding with respect to data to be transmitted in the OFDM-symbols allocated for the PDSCH in the DL bundle of time intervals, and obtaining code blocks representing the encoded data. A number and length of the code blocks are selected according to duration of the time interval in such a way that, when allocating time-frequency resources for every combination of said number of code blocks, boundaries of said combination in the time domain are aligned with boundaries of the time interval in the DL bundle of time intervals. The channel coding is preferably LDPC, wherein the number and length of the code blocks are selected according to a number of available resource elements (REs) in the time interval, used modulation and coding rate.

According to an embodiment of the disclosure, the DL/JL-period further includes an uplink transmission part (UL part) following the DL part. The method provided herein further includes, in the UL part, generating an UL bundle of time intervals, said bundle comprising an integer number of adjacent time intervals, allocating at least one UL subbundle of OFDM-symbols to transmit DMRS signals (UL DMRS-subbundle) for a required number of MIMO layers of a physical uplink shared data channel (PUSCH), and allocating, within the UL bundle of time intervals, OFDM-symbols for transmission of the PUSCH. The method further includes allocating the UL bundle of time intervals for UL transmission. Moreover, the control information further includes an indication of a beginning of the UL bundle of time intervals and of duration of the UL bundle of time intervals. The method according to this embodiment can further include allocating, in the UL part, a preset number of OFDM-symbols for transmission of a physical uplink control channel (PUCCH). Furthermore, the OFDM-symbols allocated for the transmission of the PUCCH can follow after the UL DMRS-subbundle and the OFDM-symbols allocated for the transmission of the PUSCH. Otherwise, the UL DMRS-subbundle and the OFDM-symbols allocated for the transmission of the PUSCH can follow after the OFDM-symbols allocated for the transmission of the PUCCH.

According to an embodiment of the disclosure, an UL time interval is a slot comprising 12 or 14 OFDM-symbols. Furthermore, the OFDM-symbols allocated for the transmission of the PUCCH can be tail OFDM-symbols of a last slot of the UL bundle of slots. The UL slot bundle can include said at least one UL DMRS-subbundle, in particular, the UL slot bundle can include all slots of the UL part.

According to an embodiment of the disclosure, said at least one UL DMRS-subbundle is a plurality of UL DMRS-subbundles separated from each other by an UL period of a configurable number of OFDM-symbols, wherein the control information includes the UL period. Furthermore, an amount of resources allocated to transmit DMRS signals in a first UL DMRS-subbundle of said plurality can be greater than an amount of resources allocated to transmit DMRS signals in each of subsequent UL DMRS-subbundles of said plurality, in such a way that a number of OFDM-symbols of said subsequent UL DMRS-subbundle is less than a number of OFDM-symbols of the first UL DMRS-subbundle.

According to an embodiment of the disclosure, when an UL time interval in the UL part is a mini-slot, boundaries of at least a first UL DMRS-subbundle of said at least one UL DMRS-subbundle in the time domain are aligned with boundaries of the mini-slot.

According to an embodiment of the disclosure, the method provided herein can include performing channel coding with respect to data to be transmitted in the OFDM-symbols allocated for the PUSCH in the UL bundle of time intervals, and obtaining code blocks representing the encoded data. A number and length of the code blocks are selected according to duration of a time interval in such a way that, when allocating time-frequency resources for every combination of said number of code blocks, boundaries of said combination in the time domain are aligned with boundaries of the time interval in the UL bundle of time intervals. The channel coding is preferably LDPC, wherein the number and length of the code blocks are selected according to a number of available REs in the time interval, used modulation and coding rate.

In accordance with another aspect of the disclosure, a base station (TRP) in a wireless communication system is provided. The base station includes at least transceiving units, data processing units, and data storage units having computer-executable codes stored therein which, when executed by the data processing units, cause the base station to perform the method according to any one of the embodiments of the first aspect of the disclosure. A computer-readable storage medium is also provided, the computer-readable storage medium having computer-executable codes stored therein which, when executed by at least one data processing unit of a TRP in a wireless communication system, cause the TRP to perform the method according to any one of the embodiments of the first aspect of the disclosure.

The technical result achievable by the disclosure relates to providing the efficient techniques of allocating time domain resources for broadband data transmission based on flexible slot or mini-slot aggregation, along with providing a larger unit of allocating/scheduling resources in the time domain, thereby enabling to use less frequent transmissions of DMRSs and the downlink control channel and, in turn, to at least avoid the increased overhead, which is especially urgent in the case of DMRS patterns of greater density for next generation communication systems. Moreover, improved efficiency of pipelining of processing code blocks of data at the receiver side is provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4A is an illustration of an approach according to 5G NR for informing a UE about DMRS ports to be used according to an embodiment of the disclosure;

FIG. 4B is an illustration of an approach according to 5G NR for informing a UE about DMRS ports to be used according to an embodiment of the disclosure;

FIG. 19C is illustrations of a table representation of adjacent DMRS port groups according to an embodiment of the disclosure;

FIG. 31 is a table illustrating an initialization of PN sequences for a case of using an unified DMRS pattern according to an embodiment of the disclosure.

Throughout the drawings, it should be noted that like reference numbers are used to depict the same or similar elements, features, and structures.

DETAILED DESCRIPTION

Figure 1:
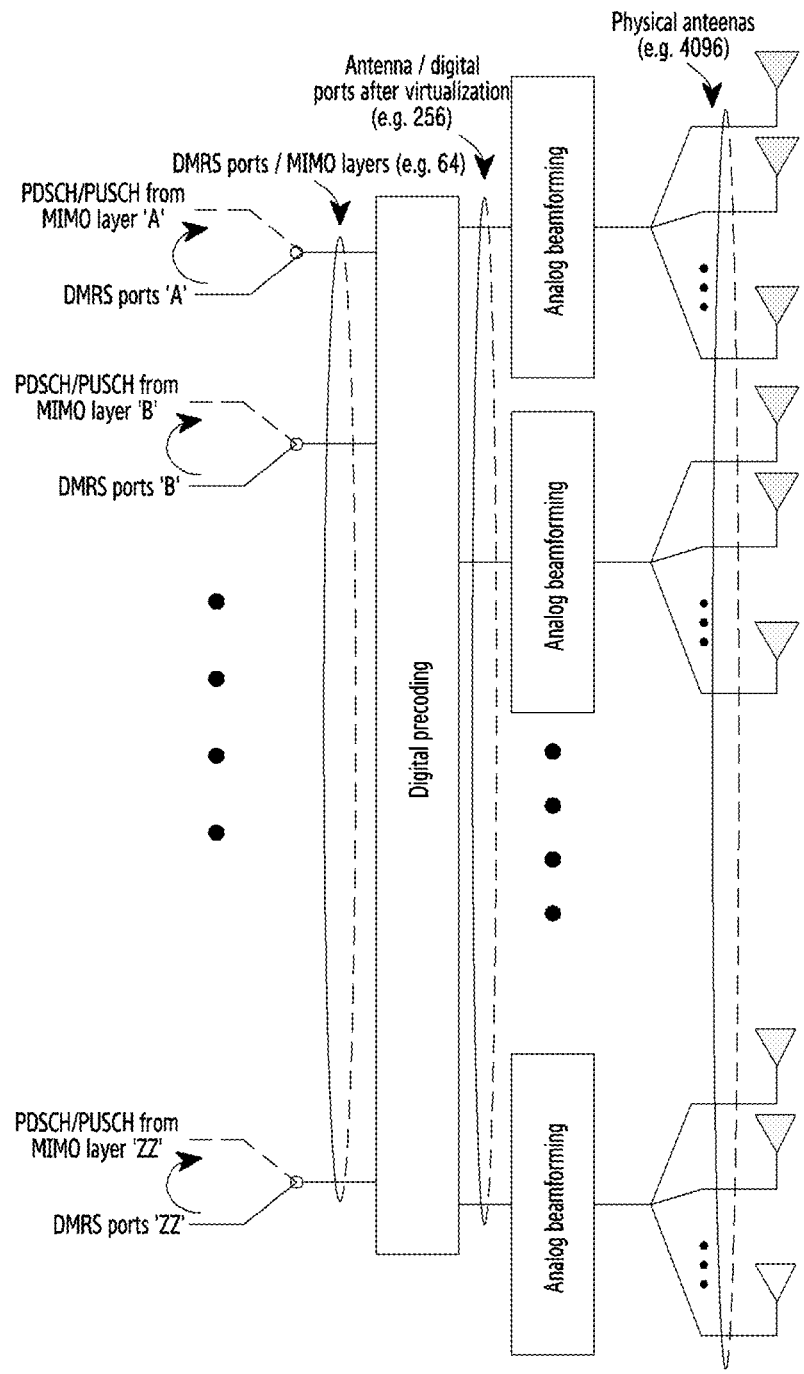
FIG. 1 is an illustrative scheme of spatial processing of signals at a receiver side according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Nowadays more and more active deployment of $5^{th}$ generation (5G) new radio (NR) networks takes place whose advantages and capabilities are broadly known.

In a 5G NR system, base stations (transmission-reception points (TRPs)) use complex antenna arrays comprising plural transceiving antenna elements that enable to efficiently use the multiple input multiple output (MIMO) technology when a number of spatial MIMO streams or layers, which are to be transmitted in parallel, are generated to transmit data (for example, the physical downlink data shared channel (PDSCH)).

A digital signal is transmitted or received by one or more digital ports coupled to antenna elements of a base station via a radio frequency unit which performs the function of forward and inverse conversion of the digital signal into an analog one. More particularly, for the frequency range of 3.5 GHz up to 64 digital antenna ports can be employed which enable to use, in base stations, various precoding schemes. For instance, the spatial multiplexing (SM) technology enables to reuse the same time-frequency resources to transmit plural signals (MIMO layers) to one or more user devices (user equipment (UEs)), while the adaptive beamforming technology enables to dynamically steer power of a transmitted signal into one or more predefined directions. Usage of advanced modulation techniques, such as orthogonal frequency-division multiplexing (OFDM), provides efficient broadband signal transmission. OFDM provides orthogonality of signals which are simultaneously transmitted on different subcarriers (i.e., orthogonality in the frequency domain). Spatial MIMO layers are in general not orthogonal, and signals transmitted in different MIMO layers cause interference at a receiver side. As a rule, various adaptive beamforming techniques are employed in a receiver and in a transmitter to reduce the interference.

Furthermore, the transmitted MIMO layers are accordingly received by user devices which also support the abovementioned techniques.

Plural MIMO layers transmitted from a base station can all be destined to one UE, and this case refers to the single-user MIMO mode (SU-MIMO). Otherwise they can be destined to different UEs, and this case refers to the multi-user MIMO mode (MU-MIMO).

Special reference signals (RSs) are used to enable communication between various devices in the 5G NR system, e.g., between base stations and user devices. A demodulation reference signal (DMRS) is one of such reference signals. DMRS signals are transmitted only within a respective physical channel (more particularly, the following physical data channels: PDSCH and physical uplink shared data channel (PUSCH)). Therefore, they are not continuously or periodically transmitted reference signals which are associated with throughput overhead. In particular, a different DMRS signal is transmitted with each of PDSCH/PUSCH spatial MIMO layers simultaneously transmitted by a respective transmitting side. Moreover, the same adaptive precoding is used with respect to the DMRS signal. In the 5G NR communication system, a unique index (number) referred to as a DMRS port is associated with every DMRS signal. Therefore, for instance, a DMRS port is unambiguously mapped to every PDSCH spatial MIMO layer transmitted from a TRP in the 5G NR communication system. Thus, the number of MIMO layers is equal to the number of DMRS ports.

The flow of transmission of plural spatial MIMO layers in combination with DMRS signals is illustrated in FIG. 1.

FIG. 1 is an illustrative scheme of spatial processing of signals at a receiver side according to an embodiment of the disclosure.

Referring to FIG. 1, it provides a simplified scheme of the spatial processing in the transmitter, where signal adaptive precoding, which converts an input signal of MIMO layers into a signal of digital antenna ports, is performed in the first step. Furthermore, respective spatial processing in OFDM systems can be carried out in the frequency domain, thereby enabling to flexibly generate different beam patterns in different subcarriers. After the precoding procedure, the analog beamforming procedure is applied that converts a digital port Input signal into signals of subarray physical antennas. This spatial signal processing is performed in the time domain for the entire OFDM signal, thereby imposing constraints onto the number of simultaneously generated beams.

The main purpose of DMRS signals is providing coherent reception of physical data channels (PDSCH and PUSCH). More precisely, during propagation through a communication channel each of transmitted MIMO layers is subjected to various distortions, and the channel estimation procedure is performed at the receiver side to correctly receive said MIMO layer, the algorithms of said procedure using a DMRS signal corresponding to the MIMO layer. Channel estimation is a critical procedure in the 5G NR communication system, and reliability thereof is of exclusive significance. As a consequence, good reception of DMRS signals at the receiver side has great importance.

Figure 2A:
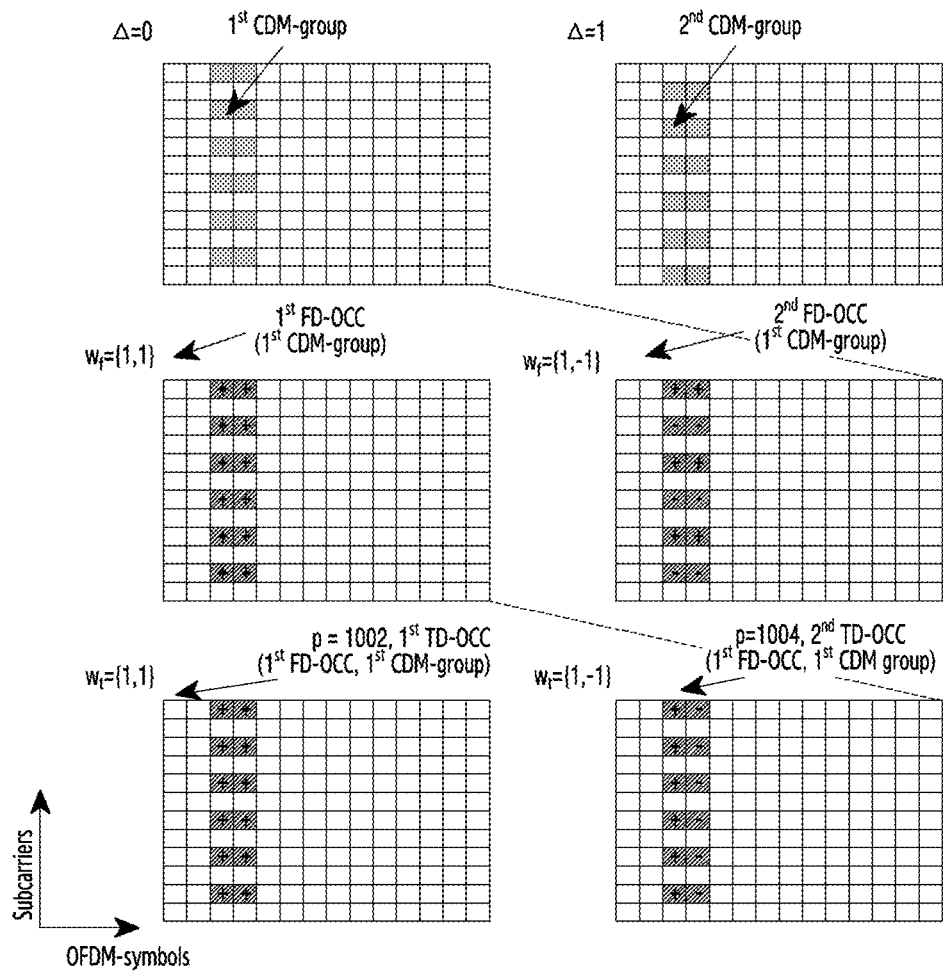
FIG. 2A is a $5^{th}$ generation (5G) new radio (NR) Type 1 demodulation reference signals (DMRS) pattern according to an embodiment of the disclosure.

FIG. 2A is a 5G NR Type 1 DMRS pattern according to an embodiment of the disclosure.

Figure 2B:
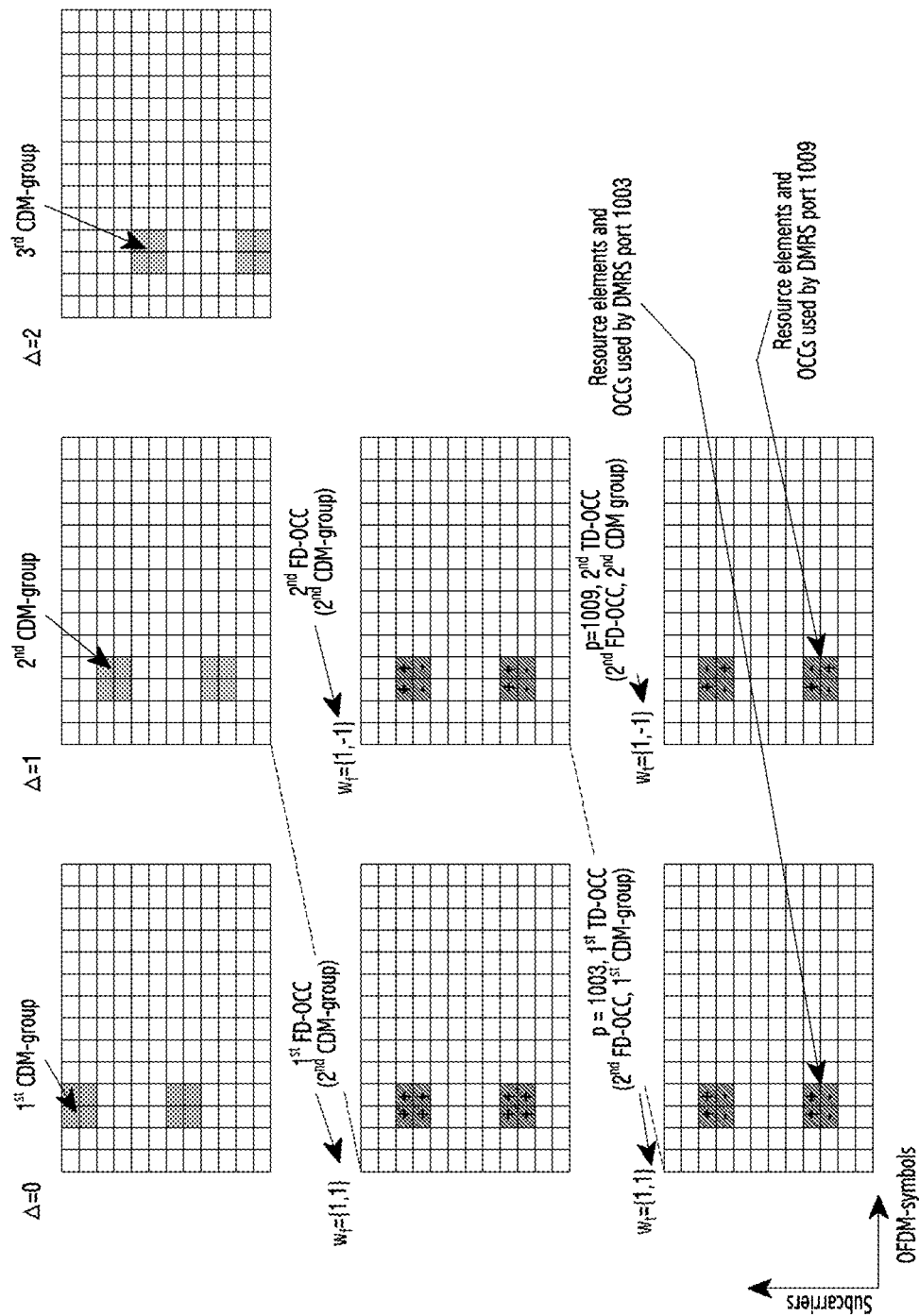
FIG. 2B is a 5G NR Type 2 DMRS pattern according to an embodiment of the disclosure.

FIG. 2B is a 5G NR Type 2 DMRS pattern according to an embodiment of the disclosure.

Referring to FIGS. 2A and 2B, the 5G NR communication system uses, to simultaneously transmit plural DMRS signals of respective MIMO layers, respective multiplexing of said signals over resource elements (REs). In the context of multiplexing DMRS signals in the 5G NR communication system, two types of DMRS patterns are supported: Type 1 DMRS pattern and Type 2 DMRS pattern which are illustrated in the grid of resource elements in FIGS. 2A and 2B, where each RE is defined by a subcarrier in the frequency domain and an OFDM-symbol in the time domain.

First of all, subcarriers in the frequency domain are subdivided according to code domain multiplexing (CDM) groups. Two CDM groups are defined for the Type 1 pattern, and in this case the distribution of subcarriers in the frequency domain has uniform nature, i.e., the spacing between subcarriers of different CDM groups is always the same (see FIG. 2A). The CDM groups are indexed by index Δ. Then, in each of the two CDM groups, DMRS signals are multiplexed by using length 2 frequency domain (FD) orthogonal cover codes (OCCs) and length 2 time domain (TD) OCCs. Each of the FD-OCCs and each of the TD-OCCs also has its own index. Therefore, 8 DMRS signals are multiplexed in the Type 1 pattern: 2 CDM groups×2 length 2 FD-OCCs×2 length 2 TD-OCCs, i.e., 8 DMRS ports are defined for respective 8 parallel spatial MIMO layers.

Three CDM groups with the non-uniform distribution in the frequency domain are defined for the Type 2 pattern (see FIG. 2B). Then, in each of the three CDM groups, DMRS signals are multiplexed again by using length 2 FD-OCCs and length 2 TD-OCCs. Therefore, 12 DMRS signals are multiplexed in the Type 2 pattern: 3 CDM groups×2 length 2 FD-OCCs×2 length 2 TD-OCCs, i.e., 12 DMRS ports are defined for respective 12 parallel spatial MIMO layers.

Thus, maximum 12 spatial MIMO layers are supported in the 5G NR communication system at the TRP side.

It should be emphasized that multiplexed DMRS signals in each CDM group of both the Type 1 pattern and the Type 2 pattern are orthogonal, i.e., do not cause interference. The orthogonality in the considered case has exclusive importance for correct reception of DMRS signals and, hence, for reliable channel estimation.

It should be noted herein that, though, in accordance with the aforesaid, up to 12 MIMO layers are generally supported at the TRP side, maximum 8 MIMO layers are supported in the SU-MIMO mode, i.e., not more than 8 MIMO layers can be simultaneously transmitted to one UE. Moreover, in the 5G NR communication system, semi-static switching between the Type 1 and Type 2 DMRS patterns is provided which is implemented by radio resource control (RRC) signaling when it is required to increase or decrease the maximum number of transmitted MIMO layers. In other words, the number thereof is not known a priori before the transmission. Therefore, a UE should know in advance which DMRS ports are to be used to receive a downlink (DL) data channel and transmit an uplink (UL) data channel.

Figure 3:
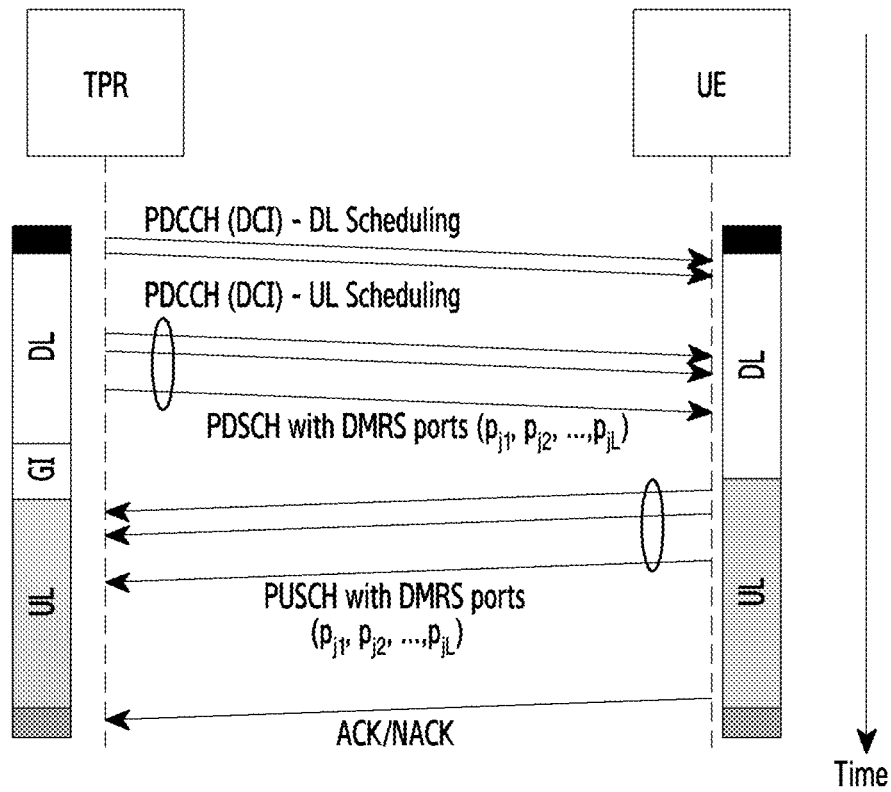
FIG. 3 is a general scheme of informing a user equipment (UE) about DMRS ports to be used according to 5G NR according to an embodiment of the disclosure.

FIG. 3 is the general scheme of informing a user device (UE) about used DMRS ports in a 5G NR system according to an embodiment of the disclosure.

Referring to FIG. 3, a physical downlink control channel (PDCCH), which carries a control message in the form of downlink control information (DCI), is initially transmitted from a TRP to the UE. The DCI informs the user device about PDSCH/PUSCH signal transmission parameters chosen by a scheduler at the TRP side. First of all—that transmission of the PDSCH is scheduled to the user device. The DCI also conveys to the UE information about numbers of DMRS ports which are to be used for demodulating the scheduled number of MIMO layers of the PDSCH, as well as for scheduling transmission of the PUSCH. Moreover, the DCI may include other control information, for example, information about a modulation and coding scheme (MCS), frequency domain resource allocation (FDRA), adaptive precoding, or the like.

The informing disclosed above is relatively fast (in terms of low delays), since it is performed on the physical level in the compact DCI message. At the same time, this compactness implies strict constraint on the overall amount of bits in a DCI message (not more than 50-70 bits in the 5G NR system), and, therefore, information about used DMRS ports should be encoded into the DCI with minimization of bit overhead.

FIGS. 4A and 4B illustrate a approach to arrangement of data to implement informing a UE on DMRS ports to be used, as employed in a 5G NR system according to various embodiments of the disclosure.

Referring to FIGS. 4A and 4B, in accordance with the multiplexing discussed above, a unique set of a CDM group index, an FD-OCC, and an TD-OCC can be associated with every DMRS port. It should be noticed that the term 'DMRS port' is oftentimes directly referred to the unique combination of a CDM group, an FD-OCC, and a TD-OCC. In FIG. 4A the correspondence of a DMRS port number to the combination of the parameters listed above is shown as a table for the Type 1 DMRS. For this DMRS type, where not more than four DMRS ports can be used at the UE side (i.e., the UE can receive or transmit not more than 4 spatial MIMO layers of a physical data channel at a time), FIG. 4B illustrates, as a table, encoding a combination of DMRS ports for usage (right column) with a code point (left column) which is in one-to-one correspondence with said combination. Namely a value of such a code point is transmitted from a TRP within the DCI to a UE to inform the UE on a specific DMRS port combination which is to be used for the PDSCH or for the PUSCH. It should be noticed herein that the notation of indices '0', '1', '2', '3' of DMRS ports, which is used in the right column of the table in FIG. 4B, is respectively equivalent to the notation of indices '1000', '1001', '1002', '1003' of DMRS ports, which is used in the left column of the table in FIG. 4A, said notations can be used interchangeably in the application in a way clear to a skilled artisan.

As to the middle column in the table of FIG. 4B, it should be noted that OFDM-symbols allocated for transmission of DMRS signals can be partially used to transmit a physical data channel (PDSCH or PUSCH). More particularly, the code point for informing a UE on a combination of DMRS ports according to FIG. 4B is mapped to the number of CDM groups not used for data transmission. For example, for the code point equal to '0', the first CDM group of a DMRS OFDM-symbol should be used for DMRS transmission, whereas the second CDM group should be used to transmit a physical data channel (PDSCH). For the code point equal to '3', the physical data channel is not transmitted in an OFDM-symbol allocated for DMRSs. Moreover, the first and second CDM groups are used to transmit DMRSs for two or more users. Multiplexing DMRSs with the data channel in one OFDM-symbol allows to reduce the overhead associated with the DMRS transmission.

Figure 5A:
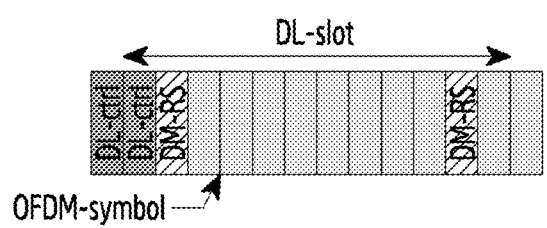
FIG. 5A is an illustration of allocating time resources in 5G NR according to an embodiment of the disclosure.
Figure 5B:
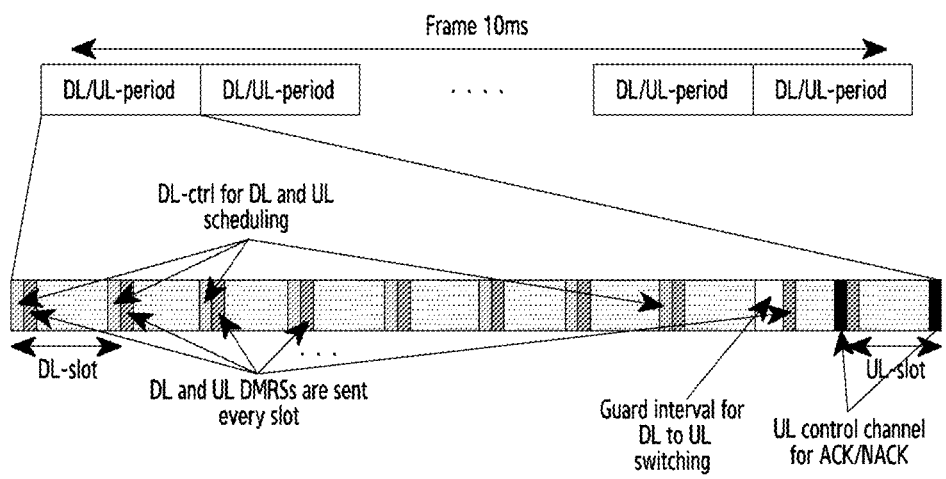
FIG. 5B is an illustration of allocating time resources in 5G NR according to an embodiment of the disclosure.
Figure 5C:
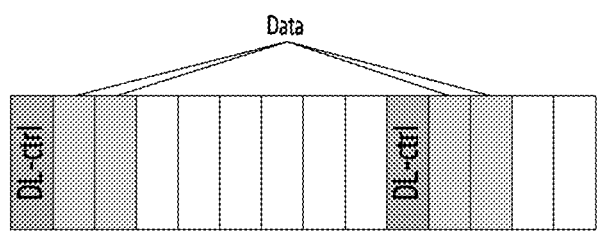
FIG. 5C is an illustration of allocating time resources in 5G NR according to an embodiment of the disclosure.

FIGS. 5A, 5B, and 5C illustrate methods of allocating time resources in a 5G NR wireless communication system on a physical level according to various embodiments of the disclosure.

Referring to FIGS. 5A, 5B, and 5C, the 5G NR system supports two types of allocating time resources for transmission of a physical data channel: Type A and Type B. In FIG. 5A the former approach (Type A) is represented, wherein one downlink slot (DL slot) comprising 14 OFDM-symbols is the minimum unit of allocating time resources to transmit the PDSCH. The illustration of FIG. 5A is given for the frequency range with the carrier frequency of about 3.5 GHz, which is used in 5G NR. In a similar way, the minimum unit of allocating time resources to transmit the PUSCH is one slot (UL slot). Type A is characterized by the limited capability of varying a start OFDM-symbol (from $0^{th}$ to $3^{rd}$) of the data channel within a slot.

FIG. 5B illustrates allocating time resources according to a Type A scheme in a greater time interval. In the system, each frame having length of 10 ms is divided into a number of "downlink transmission—uplink transmission" periods (DL/UL-periods) each including a respective number of DL slots and UL slots separated by a guard interval to enable switching between DL and UL. As seen from the illustrations of FIGS. 5A and 5B, in each DL/UL slot, OFDM-symbols are allocated for transmitting a physical control channel and DMRS signals. It should be noted that the ratio between the number of DL slots and UL slots in a DL/UL-period is flexibly configurable.

Type A is typically used for enhanced mobile broadband (eMBB) traffic, which corresponds, for example, to ordinary Internet traffic in smartphones.

FIG. 5C illustrates a latter of a time resource allocation types used in 5G NR, in particular, Type B, wherein the minimum unit of allocating time resources is a mini-slot. In this case, a user can be allocated, within a slot, with one or more PDSCH transmissions, each having length of one mini-slot comprising 2 (as shown in FIG. 5C), 4, or 7 OFDM-symbols. A physical downlink control channel (DL-ctrl) is typically associated with each of such PDSCH transmissions, each mini-slot also comprises DMRS signals (not shown in FIG. 5C). The same applies to PUSCH transmissions. This type, in particular, is characterized by greater flexibility of the data channel start symbol (from $0^{th}$ to $12^{th}$) within a slot. Information about start symbols of PDSCH mini-slots is signaled to a UE in the DL-ctrl.

Type B is typically used for ultra-reliable low-latency communication (URLLC) traffic which is mostly used for communications in industrial applications (e.g., between robots, or the like), where demands to fidelity/reliability and to latency are high.

It should be emphasized once again that the exemplified configurations of a frame, slot, mini-slot are flexible in 5G NR to a substantial extent, and FIGS. 5A to 5C are given solely as illustrations in order to provide exhaustive understanding of the application.

Finally, though, in accordance with the foregoing disclosure, DMRS signals, transmitted from one base station are orthogonal, i.e., they do not cause interference to each other within the cell served by the base station, nevertheless, orthogonality between DMRS signals of neighboring cells is initially lacking, which may cause interference at cell boundaries. In order to randomize interference, quadrature phase shift-keying (QPSK) modulation is also performed with respect to DMRS signals transmitted from the base stations. In the 5G NR system, QPSK modulation is performed by a Gold sequence of length 31 with initialization common over CDM groups or specific to each CDM group. In the latter case, two initial initializing values (seeds) are configured for each base station by the RRC signaling and dynamically signaled to UEs by the DCI for subsequent demodulation. Therefore, sets of initializing values are different for different TRPs, thereby providing diversity of DMRS signals transmitted by the different TRPs. It should be noticed that a similar procedure is also applied in UL to randomize interference between DMRS signals from users served by neighboring TRPs.

The aspects of operating 5G NR wireless communication systems, as briefly discussed above, are disclosed in specifications TS 38.211, 38.212 "NR. Physical channels and modulation", v17.3.0, 2022-09-21, 3gpp.org, which are entirely incorporated into the description by reference.

Though deployment of 5G NR systems in the world is only spinning up, nevertheless active research is being already carried now in different directions for standardization of next generation wireless communication systems, so called 6G, which will have characteristics exceeding 5G NR.

More particularly, for the 6G operating range of 10-12 GHz (UPPER MID BAND), it is planned to support, at base stations (TRPs), ultra-large antenna arrays, with at least 1024 antenna elements, hybrid analog and digital beamforming with a large number of antenna ports (≥128). Therefore, by supporting, in particular, up to 64 simultaneously transmitted spatial MIMO layers in UPPER MID BAND communication systems, the concept of a radio interface with the ultra-large antenna array (Massive MIMO) will be rendered to a principally new level.

Support of a set of reference signals similar to the one used in 5G NR, such as DM-RS, channel state information (CSI)-RS, sounding reference signal (SRS), phase tracking (PT)-RS, primary synchronization signal (PSS)/secondary synchronization signal (SSS), in planned in 6G. Details regarding the listed RSs are given in the abovementioned specifications. At the same time, the approaches to operating on the reference signals, as applied in 5G NR, may not be always extrapolated to next generation wireless communication systems.

For instance, the abovementioned DMRS patterns used in 5G NR systems can enable to multiplex maximum 12 DMRS signals, whereas parallel transmission of at least 64 spatial MIMO layers and, hence, 64 DMRS signals should be provided in the 6G system. In other words, the existing DMRS patterns cannot enable to multiplex the number of DMRS signals required for 6G.

Then, as recited above with reference to FIGS. 2A and 2B, non-uniform distribution of subcarriers in the frequency domain is typical to the Type 2 DMRS pattern, unlike the uniform nature of the Type 1 pattern. Substantially different channel estimation algorithms are used for these two DMRS pattern types. Furthermore, greater complexity is typical for the algorithm of the non-uniform Type 2 DMRS pattern. This is not a serious problem for the relatively small number of DMRS ports in 5G NR, however, it may turn out to be inacceptable for the significantly greater number thereof in 6G, since complexity of the channel estimation algorithm significantly increases in the case of the abovementioned non-uniformity.

Then, if the necessity occurs to adjust density of a DMRS pattern in the frequency domain (in view of adjusting the number of available DMRS ports), respective switching is performed in the 5G NR communication system between the Type 1 and Type 2 DMRS patterns having the different channel estimation algorithms associated therewith, which are different in terms of complexity inter alia. Moreover, in accordance with the aforesaid, said switching has semi-static nature, i.e., dynamic switching between the Type 1 and Type 2 patterns is not supported in 5G NR. In other words, there is rather limited flexibility of the DMRS pattern adaptation, with the switching between the substantially inconsistent pattern types. In 6G, implementation of such an approach would lead to inacceptable growth of complexity at the receiver side.

Therefore, there is an urgent need in designing a new DMRS pattern for next generation communication systems (including 6G) that would satisfy the following design requirements:
  support of a greater number of DMRS ports (up to 64);
  adaptability of the DMRS pattern depending on capacity requirements, with the capability of varying its density in time and frequency, without modifying the DMRS pattern itself;
  maintenance of low complexity of the channel estimation algorithm.

It should be taken into account when designing such a DMRS pattern that, in view of the above requirement regarding increased capacity thereof (the capability of multiplexing a greater number of DMRS signals for a respectively greater number of MIMO layers), such a pattern will include a greater number of Res, inter alia—occupy a greater number of OFDM-symbols in the time domain. If the time resource allocation similar to 5G NR is used when doing this, then relatively high frequency of DMRS transmission, as typical to 5G NR, will unavoidably cause undesirably increased overhead in the case of the more capacious DMRS pattern.

Technical solutions are known from the art which relate to allocating resources in the time domain for future communication systems. Such technical are provided, for instance, in U.S. Ser. No. 11/297,635, U.S. Ser. No. 10/560,934, CN 110121849.

U.S. Ser. No. 11/297,635 provides a method of grouping mini-slots in an OFDM-based wireless communication system, wherein the mini-slots are aggregated to improve likelihood of successful reception, by repeatedly transmitting a given data block. Mini-slots which are adjacent in time and/or frequency can be aggregated. Furthermore, mini-slots from different slots can be aggregated. The drawback of the approach provided in U.S. Ser. No. 11/297,635 in the considered context is impossibility to use this approach to address the abovementioned issue of the DMRS overhead.

U.S. Ser. No. 10/560,934 provides aggregation of transmission time intervals (TTIs) for downlink (DL) communication. A base station can determine that it is required to provide TTI aggregation for DL communication for at least one carrier of a wireless link. The base station can send to a user device an indication regarding the provision of the TTI aggregation for DL communication for the determined carrier(s) of the wireless link. The base station can subsequently perform, based on the TTI aggregation, downlink transmissions to the user device on said determined carrier(s). This approach according to U.S. Ser. No. 10/560, 934 enables to improve PDSCH DL coverage per component carrier. At the same time, its basic drawback is in the following: the PDSCH structure remains unmodified, and, hence, the problem of the DMRS overhead cannot be address based on said approach for next generation communication systems, including 6G with massive MIMO and operating in UPPER MID BAND.

In accordance with the approach provided in CN 110121849, a first device can exclude, in at least two mini-slots, a first type of data or control information, with substitution by a second type of data or control information. Moreover, the first device can aggregate the at least two mini-slots within a subframe, wherein the subframe can include a part for transferring positive acknowledgement (ACK)/negative acknowledgement (NACK) information associated with the second type of data or control information, and the first device can communicate with a UE during said at least two mini-slots in the subframe. A second device can receive the ACK/NACK information associated with the second type of data or control information, and the second device can decrease transmission power for the first type of data or control information during a subsequent subframe, when the ACK/NACK information indicates negative acknowledgement. The drawbacks of the approach provided in CN 110121849 are in the following: a DMRS position (if present) is fixed in a slot. Furthermore, the same DMRS density is implied, whereas, for scheduler decisions in next generation communication systems, variation of the DMRS pattern is possible.

Hereinafter reference is made to various embodiments of the disclosure which are illustrated in the accompanying drawings where the same reference numerals denote similar elements. It should be appreciated that the embodiments of the disclosure can have various forms and should not be considered to be limited by the descriptions given herein. Therefore, the various embodiments are described hereinbelow with reference to the drawings to elucidate the essence of the aspects of the disclosure.

Figure 6:
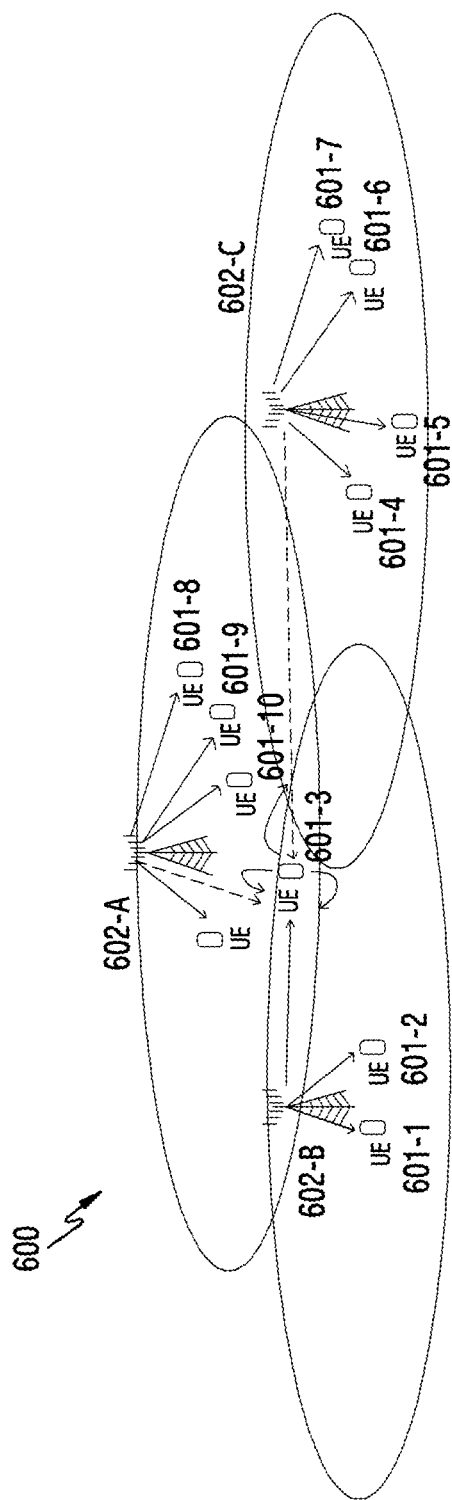
FIG. 6 is an illustrative scheme of a wireless communication system in which embodiments of the disclosure can be implemented according to an embodiment of the disclosure.

FIG. 6 generally illustrates a wireless communication system wherein aspects of the disclosure can be implemented according to an embodiment of the disclosure.

Referring to FIG. 6, user devices (UEs) 601 communicate with base stations (TRPs) 602 in a radio access network (RAN) 600. UEs 601 (for example, UE 601-1, 601-2, 601-3, 601-4, 601-5, 601-6, 601-7, 601-8, 601-9, 601-10, . . . ) are distributed over the RAN 600, and each of the UEs 601 can be fixed or mobile. Broadly known examples of UEs are smartphones, tablets, modems, or the like.

The base stations 602 (for example, the TRPs 602-A, 602-B, 602-C) can provide coverage for a specific geographic area oftentimes referred to as 'cell'. The base stations 602 basically have fixed structure, but they can have mobile implementation as well. In general, the base stations can represent macro-TRPs (as illustrated by the TRPs 602-A, 602-B, 602-C in FIG. 6), as well as pico-TRPs for pico-cells or femto-TRPs for femto-cells. Cells in turn can be divided into sectors.

Coordination and management of operation of the base stations 602 can be provided by a network controller which is in communication therewith (for instance, via a backhaul connection). The RAN 600 may be in communication with a core network (CN) (for example, via the network controller) which provides various network functions, such as e.g., access and mobility management, session management, authentication server function, application function, or the like. Moreover, the base stations 602 in the RAN 600 can also connect to each other (for instance, via a direct physical connection).

When a user device is moving within the RAN 600, handover of the device from one TRP to another TRP can be performed. For example, the UE 601-3 can be handed over from the TRP 602-B to the TRP 602-A. While performing this, respective operation parameters of the UE are reconfigured for operation with the new TRP. The UE can be also handed over between sectors of one TRP.

In the 5G NR wireless communication system the Cloud RAN (C-RAN) concept is implemented that refers to dividing a base station into three parts and using a special interface defined to exchange information between these functional parts. More particularly, the TRP can be divided into a radio unit (RU) which carries out radio transceiver functions, a distributed unit (DU) for L1 (physical level) and L2 (MAC level) computations, and a centralized unit for L2 and L3 (RRC level) computations. Such a division enables to centralize Cus in a respective central network node, whereas Dus can be distributed to a greater extent in cell nodes. In this case switchings of connections between cell nodes can be performed on the L1 level, i.e., with relatively small delays. Support of this concept is also expected in wireless communication networks of next generations.

It should be noticed that the description according to FIG. 6 and said figure itself have exclusively illustrative, non-limiting nature with the aim of outlining the general operation environment of the disclosure. Though only known basic components of the communication system are illustrated in FIG. 6, it should be appreciated that the communication system can further include plural other elements.

Each of the TRPs 602 shown in FIG. 6 includes hardware and logical means to implement respective functions in the TRP. The hardware means refer to, in particular, an antenna array comprised of transceiving antenna elements which have been discussed above, various specially configured processors, controllers, data storage devices, other circuit elements, as well as buses connecting them. The logical means refer to software which is stored in respective memory devices and configures respective circuit elements. Firmware directly hardwired in processors and controllers also refers to the software. The abovementioned hardware means are configured inter alia to perform various processing with respect to transmitted and received signals, including (de)modulation, (de)multiplexing, (de)coding, amplifying, filtering, digitizing, (de)interleaving, resource allocation, reception/transmission scheduling.

In a similar way, each of the UEs 601 shown in FIG. 6 includes hardware and logical means to implement respective functions in the UE. The hardware means refer to, in particular, transceiving devices with respective antenna elements, various specially configured processor(s), controllers, data storage devices, other circuit elements, as well as buses connecting them. The logical means refer to software which is stored in respective memory devices and configures respective circuit elements. Firmware directly hardwired in controllers also refers to the software. The indicated hardware means are configured inter alia to perform various processing with respect to transmitted and received signals, including (de)modulation, (de)multiplexing, (de)coding, amplifying, filtering, digitizing, (de)interleaving. Moreover, the UE comprises means to interact with a user, including a touch screen, speakers/microphone, buttons, as well as user applications which are stored in the memory of the UE and executed by the processor of the UE in a respective operating system.

Examples of the abovementioned processors/controllers include microprocessors, microcontrollers, digital signal processors (DSPs), field programmable gate arrays (FPGAs), discrete hardware integrated circuits, or the like. Firmware/software executed by the processors/controllers should be understood broadly, as referring to computer-executable instructions, instruction sets, program code, code segments, subroutines, program modules, objects, procedures, or the like. The software is stored in respective computer-readable media which can be implemented e.g., in the form of a random-access memory (RAM), a read-only memory (ROM), an electrically erasable programmable ROM (EEPROM), a solid state storage devices, magnetic storage devices, optical storage devices, or the like, which can be recorded with respective program codes and data structures that can be accessed by respective processors/controllers.

The hardware and software elements of TRPs and UEs, as listed above, are configured for enabling to perform, in the TRPs and UEs, the methods according to the application which are described hereinbelow. Implementation itself of the component hardware means of the TRPs and the UEs and specific configuring thereof, including by respective logical means, is known in the technical field which the application relates to. Moreover, various functions according to the methods of the application can be performed in plural separate elements or in one or more integral elements, as defined by design structural characteristics.

I. Multiplexing DMRS Signals

The method of multiplexing DMRS signals for broadband transmission according to the application is described hereinafter with reference to FIGS. 7 to 9.

The method provided herein is performed in a transmitting side communication device in a wireless communication system. Preferably, in a next generation communication system. The transmitting side communication device supports simultaneous transmission of a plurality of spatial MIMO layers to transmit one physical data channel. As recited previously, a different DMRS signal is associated with each of the plurality of MIMO layers. The transmitting side communication device can be a TRP (for example, the TRP 602 of FIG. 6), and in this case the physical data channel is the PDSCH. Alternatively, the transmitting side communication device can be a UE (for instance, the UE 601 of FIG. 6), and in this case the physical data channel is the PUSCH.

The description will be provided hereinbelow, without loss of generality, of the case when the transmitting side communication device is the TRP.

As discussed above, in the 6G wireless communication system, for the 10-12 GHz range, support of a significantly greater number of MIMO layers than in 5G NR is implied. The case of 64 simultaneously transmitted spatial MIMO layers will be considered hereinafter as a preferable various embodiment of the disclosure. As will be shown below, the technical solution provided herein encompasses cases of both a greater and smaller number of MIMO layers.

Figure 7:
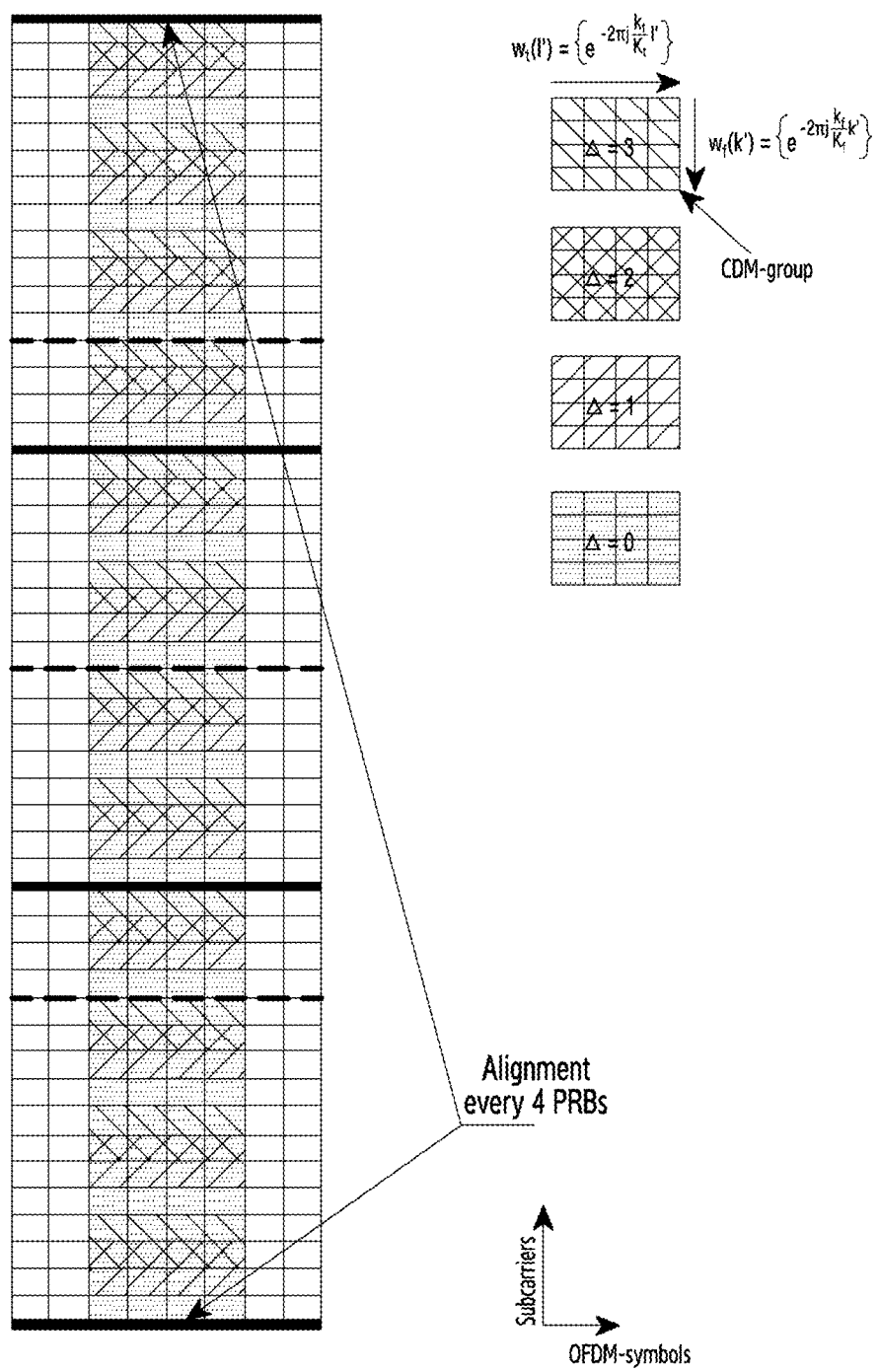
FIG. 7 is a schematic representation of a DMRS pattern according to an embodiment of the disclosure.

FIG. 7 illustrates a DMRS pattern according to an application in a time-frequency grid of resource elements (REs) according to an embodiment of the disclosure. The DMRS pattern provides multiplexing of 64 DMRS signals for 64 spatial MIMO layers of the PDSCH, respectively. For example, the DMRS signals are multiplexed over the resource elements of the DMRS pattern.

As noted above, in the time-frequency grid every resource element is defined by an OFDM subcarrier in the frequency domain and by an OFDM-symbol in the time domain. According to OFDM, the frequency range of the system is divided into a plurality of subcarriers, and each of the OFDM subcarriers can be modulated with data. The total number of OFDM subcarriers depends of the system frequency range, and a spacing between neighboring subcarriers can be fixed or varying. More particularly, in 5G NR the basic subcarrier spacing (SCS) of 15 kHz is supported. Furthermore, other SCSs are supported relative to the basic SCS, for example, 30 kHz, 60 kHz, 120 kHz, 240 kHz, or the like.

Referring to FIG. 7, each of the OFDM subcarriers in the DMRS pattern provided herein is related to one of four CDM groups. Each of the CDM groups depicted in FIG. 7 has its own index Δ, from 0 to 3, and is shown in a distinguishable way. In each of the CDM groups, modulation of DMRS signals is performed by applying digital Fourier transform (DFT) based FD-OCCs (DFT FD-OCCs) of length 4 and DFT-based TD-OCCs (DFT TD-OCCs) of length 4.

In general, DFT FD-OCCs are defined by the following equation:

$$w_f(l') = \left\{ e^{-2\pi j \frac{k_f}{K_f} l'} \right\}, l' = 0, \ldots, K_f - 1 \qquad \text{Equation 1}$$

where $k_f$ is the frequency domain orthogonal cover code index, $K_f$ is the code length, j is the imaginary unit. In the considered case, $K_f=4$, and the possible DFT FD-OCCs are illustrated in Table 1.

TABLE 1

| $k_f$ | $w_f(0)$ | $w_f(1)$ | $w_f(2)$ | $w_f(3)$ |
|---|---|---|---|---|
| 0 | +1 | +1 | +1 | +1 |
| 1 | +1 | −j | −1 | +j |
| 2 | +1 | −1 | +1 | −1 |
| 3 | +1 | +j | −1 | −j |

In a similar way, in general, DFT TD-OCCs are defined by the following equation:

$$w_t(k') = \left\{ e^{-2\pi j \frac{k_t}{K_t} k'} \right\}, k' = 0, \ldots, K_t - 1 \qquad \text{Equation 2}$$

where $k_t$ is the time domain orthogonal cover code index, $K_t$ is the code length. In the considered case, $K_t=4$, and the possible DFT TD-OCCs are illustrated in Table 2.

TABLE 2

| $k_t$ | $w_t(0)$ | $w_t(1)$ | $w_t(2)$ | $w_t(3)$ |
|---|---|---|---|---|
| 0 | +1 | +1 | +1 | +1 |
| 1 | +1 | −j | −1 | +j |
| 2 | +1 | −1 | +1 | −1 |
| 3 | +1 | +j | −1 | −j |

As a result, DMRS signals in every CDM group are mutually orthogonal.

As a consequence, the DMRS pattern proposed herein provides orthogonal multiplexing of 64 DMRS signals: 4 CDM groups×4 DFT FD-OCCs of length 4×4 DFT TD-OCCs of length 4.

As seen from FIG. 7, the DMRS pattern continuously repeats over the plurality of OFDM subcarriers. Moreover, said pattern is uniform in the frequency domain the spacing between subcarriers of any one CDM group in the DMRS pattern is the same, thereby complexity of the channel estimation algorithm is in turn maintained at a relatively low level in the receiving side.

Figure 8:
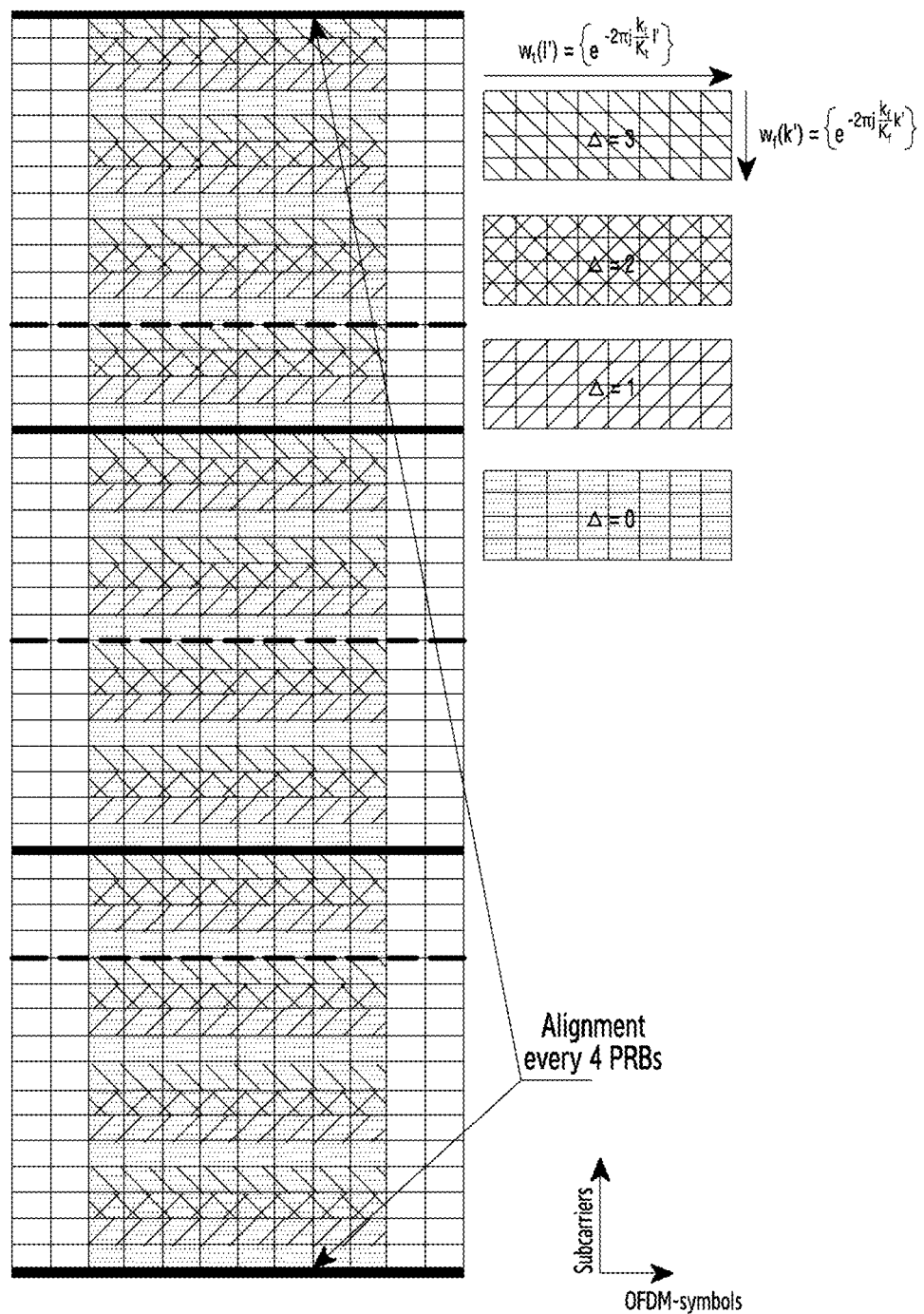
FIG. 8 is a schematic representation of a DMRS pattern according to an embodiment of the disclosure.

FIG. 8 is a schematic representation of a DMRS pattern according to an embodiment of the disclosure.

Referring to FIG. 8, as reported above, the DMRS pattern described above is preferable but not the only possible. FIG. 8 shows the uniform DMRS pattern according to the application that provides orthogonal multiplexing of 128 DMRS signals for 128 simultaneously transmitted spatial MIMO layers of the PDSCH, respectively, by using DFT TD-OCCs of length 8, i.e., $K_t=8$ in Equation 2.

In modern communication systems, scheduling of resources in the frequency domain is performed not in terms of separate subcarriers, but with a certain granularity. In particular, in the 5G NR wireless communication system a minimum unit of allocation of resources in the frequency domain is 1 resource block (RB) comprised of 12 successive OFDM subcarriers.

Referring to FIGS. 7 and 8, the boundary of the DMRS pattern according to the application, which comprises 16 successive OFDM subcarriers in the frequency domain, will not match the boundary of one RB. For example, why it is proposed in the application to carry out scheduling of resources for transmission with such a granularity that in the frequency domain the boundary of the integer number S of successive DMRS patterns is aligned with the integer number $P_{PRB}$ of successive physical RBs (PRBs). In the case illustrated in FIGS. 7 and 8, scheduling of resources in the frequency domain should be performed with the granularity of 4 PRBs ($P_{PRB}$=4) which will contain 3 successive DMRS patterns (S=3). Other granularities of resource scheduling will be shown hereinbelow.

Figure 9:
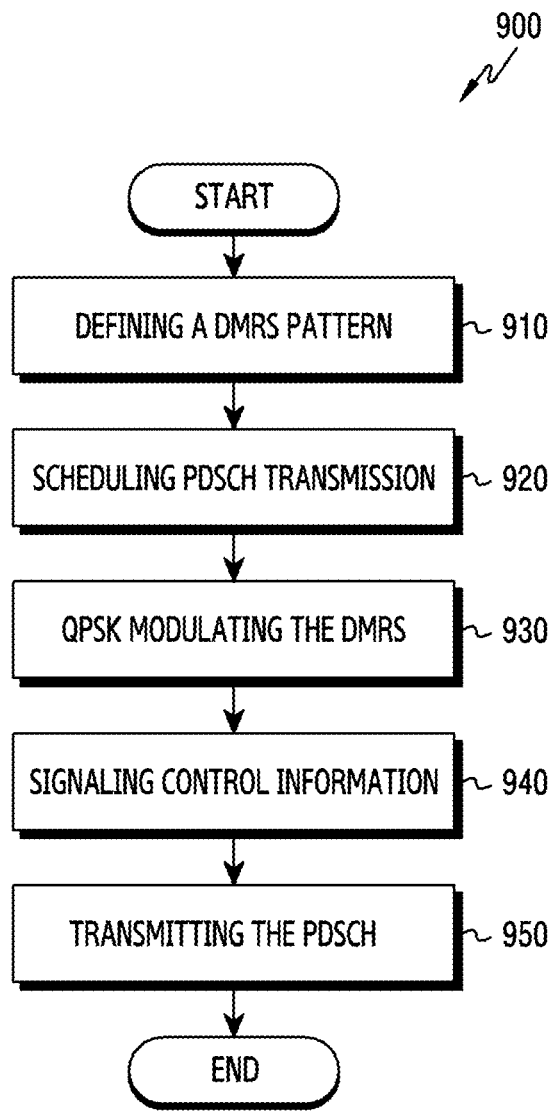
FIG. 9 is a flowchart of an embodiment of a method for multiplexing DMRS signals according to an embodiment of the disclosure.

FIG. 9 is a flowchart of an embodiment of a method 900 of multiplexing DMRS signals according to an embodiment of the disclosure.

Referring to FIG. 9, as an illustration, but not limitation, the method 900 is performed in a base station (for example, the TRP 602 of FIG. 6) which supports simultaneous transmission of a plurality of PDSCH spatial MIMO layers.

In operation 910, for N MIMO layers (N is a positive integer) a DMRS pattern is defined which is comprised of resource elements (Res) over which respective N DMRS signals are multiplexed. Each of OFDM subcarriers in the DMRS pattern is related to one of L CDM groups in such a way that a spacing between OFDM subcarriers of any one CDM group in the DMRS pattern is the same. In every CDM group, multiplexing of DMRS signals is provided by applying DFT FD-OCCs of length $K_f$ and DFT TD-OCCs of length $K_t$. As recited above, the DMRS pattern continuously repeats over the plurality of OFDM subcarriers in the frequency domain.

For the case considered in FIG. 7, L=4, $K_f$=4, $K_t$=4 and, accordingly, N=64, for the case considered in FIG. 8, L=4, $K_f$=4, $K_t$=8 and, accordingly, N=128. Examples with other values of said integer parameters will be given below. It should be noticed herein that $K_f$ according to the disclosure can also have the value equal to 8.

As discussed earlier, operation 910 of the method 900 can be performed in a UE supporting broadband transmission, evidently keeping in mind that the UE supports a smaller maximum number of simultaneously transmitted MIMO layers than the TRP. In particular, for the case of the planned support of 64 DMRS ports in the TRP for 6G 10-12 GHz, as discussed above, maximum 16 DMRS ports will be supported in the UE.

The method 900 can include subsequent steps performed in the TRP which are associated with using the DMRS pattern defined in operation 910 for communication.

So, in operation 920 a scheduler of the TRP schedules transmission of the PDSCH to one or more UEs (for instance, the UE 601 of FIG. 6) by using N MIMO layers. Furthermore, in this step, the TRP scheduler can also schedule transmission of the PUSCH from the UE.

In operation 940, the TRP signals control information to the UEs. The control information comprises information about the DMRS pattern defined in operation 910, including at least the parameters L, $K_f$ and $K_t$. The aspects of signaling DMRS-related information to the UE are described below.

According to the preferable embodiment, the control information is transmitted to the UE in DCI carried by the PDCCH. The DCI also comprises other information, as outlined above with reference to FIG. 3. In particular, the UE is also informed through the DCI that the transmission is scheduled for it.

In accordance with other embodiments, the control information can be transmitted to the UE in the RRC (i.e., L3) level or in the MAC (i.e., L2) level which are higher levels as compared to the physical (i.e., L1) level in which the DCI is transmitted.

In operation 950, the TRP performs the scheduled broadband transmission of the PDSCH.

Embodiments of adaptation of the DMRS pattern provided according to the application will be described hereinbelow with reference to FIGS. 10, 11, 12A to 12D, 13A, 13B, and 14.

The necessity of such adaptation may arise in cases where transmission of a great number (e.g., 64) of spatial MIMO layers is not needed more, for example, in view of decrease in consumer load onto a data channel, and in such a case they are reduced in a base station. The DMRS pattern should be naturally adapted to such reduction by respectively decreasing a number of DMRS signals orthogonally multiplexed therein, or, in other words, by respectively reducing DMRS capacity.

One embodiment of the adaptation is underlain by the fact that DFT OCCs are well parameterizable.

Figure 10:
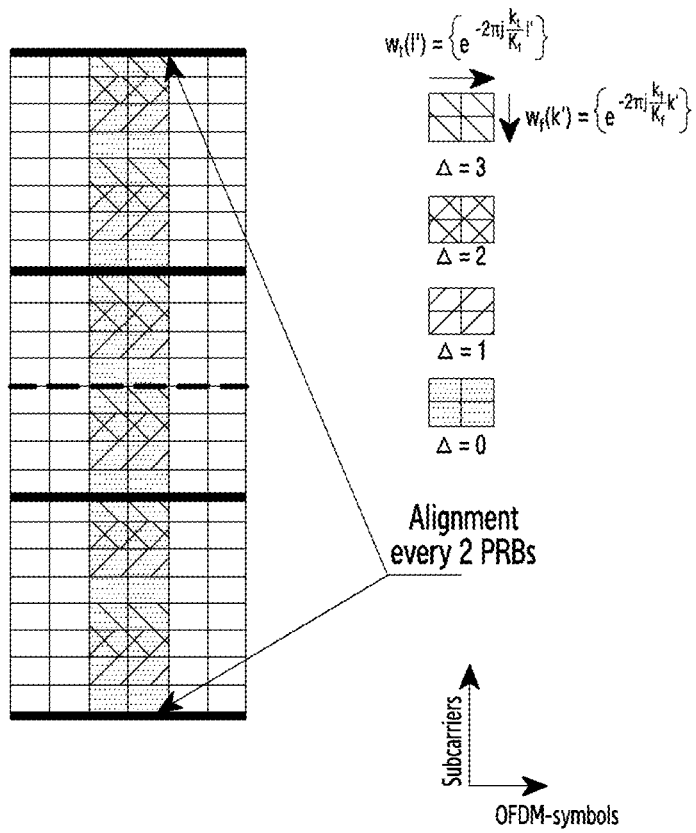
FIG. 10 is a schematic representation of an adapted DMRS pattern according to an embodiment of the disclosure.

FIG. 10 is a schematic representation of an adapted DMRS pattern according to an embodiment of the disclosure.

Referring to FIG. 10, it shows the adaptation (sub-sampling) of the DMRS pattern by setting the DFT FD-OCC length $K_f'$ and the DFT TD-OCC length $K_t'$ both equal to 2 (see Equations 1 and 2), with said four CDM groups.

This DMRS pattern, which continuously repeats over the plurality of OFDM subcarriers, enables to orthogonally multiplex 16 DMRS ports for 16 MIMO layers, respectively. Said adapted pattern has smaller DMRS capacity, but it is at the same time characterized by less overhead, as well as by higher quality of channel estimation due to higher DMRS density in the frequency domain.

Referring to FIG. 10, scheduling of resources in the frequency domain in the case of this adaptation will be carried out with granularity of 2 PRBs which will contain 3 successive DMRS patterns.

An additional possible implementation of the considered one embodiment is adaptation of the DMRS pattern by using two CDM groups and setting the DFT FD-OCC length and the DFT TD-OCC length both equal to 2. The adapted DMRS pattern obtained in such a way provides orthogonal multiplexing of 8 DMRS ports for 8 MIMO layers, respectively. It should be emphasized that said adapted DMRS pattern exactly matches the 5G NR Type 1 DMRS pattern discussed above with reference to FIG. 2A. Therefore, the DMRS pattern proposed herein has backwards compatibility, and it can be used in existing wireless communication systems.

It should be noted in view of the aforesaid that the DMRS pattern shown in FIG. 7 can be obtained through adapting the DMRS pattern shown in FIG. 8 by setting the DFT TD-OCC length equal to 4 while maintaining the DFT FD-OCC length and the four CDM groups.

Figure 11:
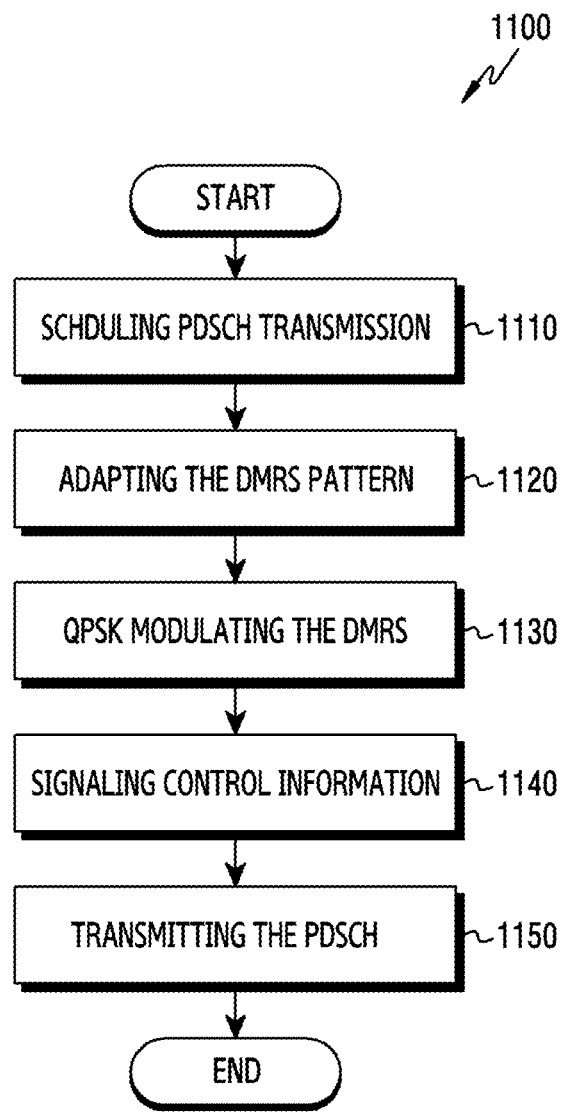
FIG. 11 is a flowchart of an embodiment of a wireless communication method according to an embodiment of the disclosure.

FIG. 11 is a flowchart of an embodiment of a wireless communication method 1100 according to an embodiment of the disclosure.

Referring to FIG. 11, a method 1100 is performed in a base station (for example, the TRP 602 of FIG. 6) which supports simultaneous transmission of N spatial MIMO layers of the PDSCH (for instance, 64), each having a different DMRS signal associated therewith.

In operation 1110, transmission of the PDSCH is scheduled to one or more UEs (for example, the UE 601 of FIG. 6) by using a desired number of M MIMO layers from the N MIMO layers, where M is a positive integer less than N (for instance, M=16 or 8).

In operation 1120, respective adaptation of the DMRS pattern initially defined for N MIMO patterns (see operation 910 with reference to FIG. 9) is performed. As reported above, said initial DMRS pattern is characterized by using L CDM groups (L=4), DFT FD-OCCs of length $K_f$, and DFT TD-OCCs of length $K_t$. For the considered embodiment of N=64, this initial DMRS pattern is illustrated in FIG. 7, where $K_f$=4 and $K_t$=4.

The DMRS pattern is adapted in operation 1120 by reducing the DFT FD-OCC length $K_f$ to $K_f'$ and/or reducing the DFT TD-OCC length $K_t$ to $K_t'$, where $K_f'$ is a positive integer less than $K_f$, and $K_t'$ is a positive integer less than Kr, wherein L can be set equal to 2 or 4. The adapted DMRS pattern provides multiplexing of the M DMRS signals for the M MIMO layers.

For the case illustrated in FIG. 10 (M=16), L remains equal to 4, $K_f'$=2, and $K_t'$=2. For the case illustrated in FIG. 2A (M=8), L is set equal to 2, $K_f'$=2, and $K_t'$=2.

In operation 1140, similarly to operation 940, the TRP sends control information to the UEs. The control information comprises information about the DMRS pattern adapted in operation 1120, including at least the parameters L, $K_f'$, and $K_t'$.

In operation 1150, similarly to operation 950, the scheduled PDSCH transmission is performed.

Another embodiment of adaptation of the DMRS pattern provided herein is based on excluding specific DFT FD-OCCs and/or specific DFT TD-OCCs from respective available DFT OCCs, in a required number and without modifying their length.

The considered other embodiment of the adaptation, like the one considered earlier, is aimed at modifying respective density of DMRS signals in order to improve quality of channel estimation at the receiving side.

Generally speaking, there is the DMRS pattern according to the application, with the available set of $K_f$ DFT FD-OCCs and set of $K_t$ DFT TD-OCCs. For the DMRS pattern illustrated in FIG. 7, the available FD-OCC sets are presented in Tables 1 and 2, respectively ($K_f$=4, $K_t$=4). The considered approach is generally underlain by such exclusion of orthogonal cover codes from the available set of $K_f$ DFT FD-OCCs and/or the available set of $K_t$ DFT TD-OCCs, i.e., such creation of a respective reduced subset thereof, that the reduced subset includes DFT OCCs for which a distance between code indices modulo the code length is maximum. This maximization in turn enables to improve efficiency of channel estimation at the receiving side, and this will be discussed hereinbelow.

Figure 12A:
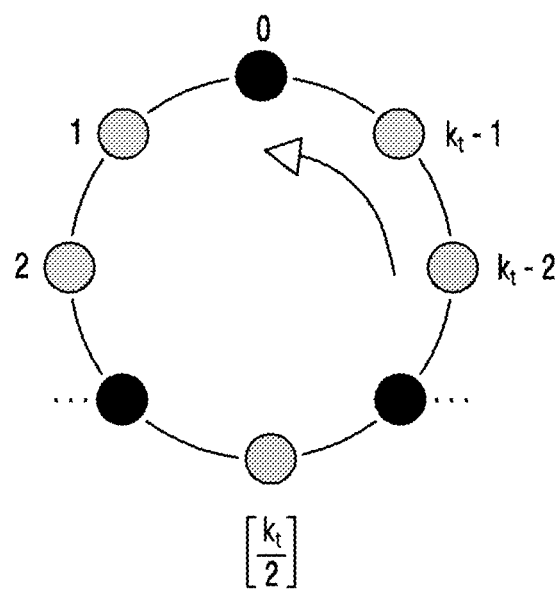
FIG. 12A is illustrative embodiments of adaptation according to an embodiment of the disclosure.

FIG. 12A is illustrative embodiments of adaptation according to an embodiment of the disclosure.

Figure 12B:
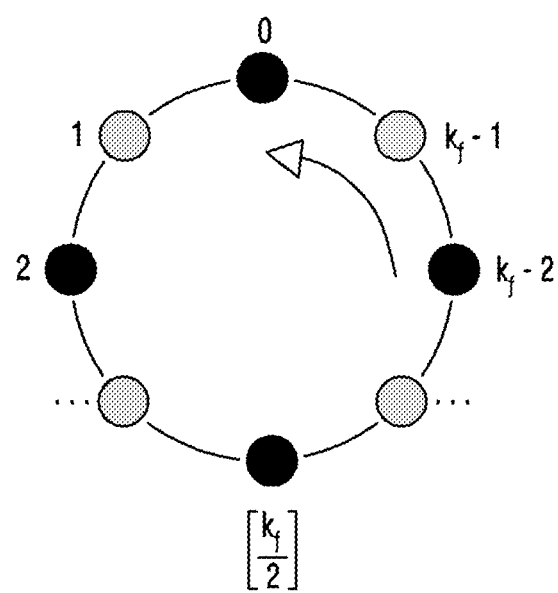
FIG. 12B is illustrative embodiments of adaptation according to an embodiment of the disclosure.

FIG. 12B is illustrative embodiments of adaptation according to an embodiment of the disclosure.

Figure 12C:
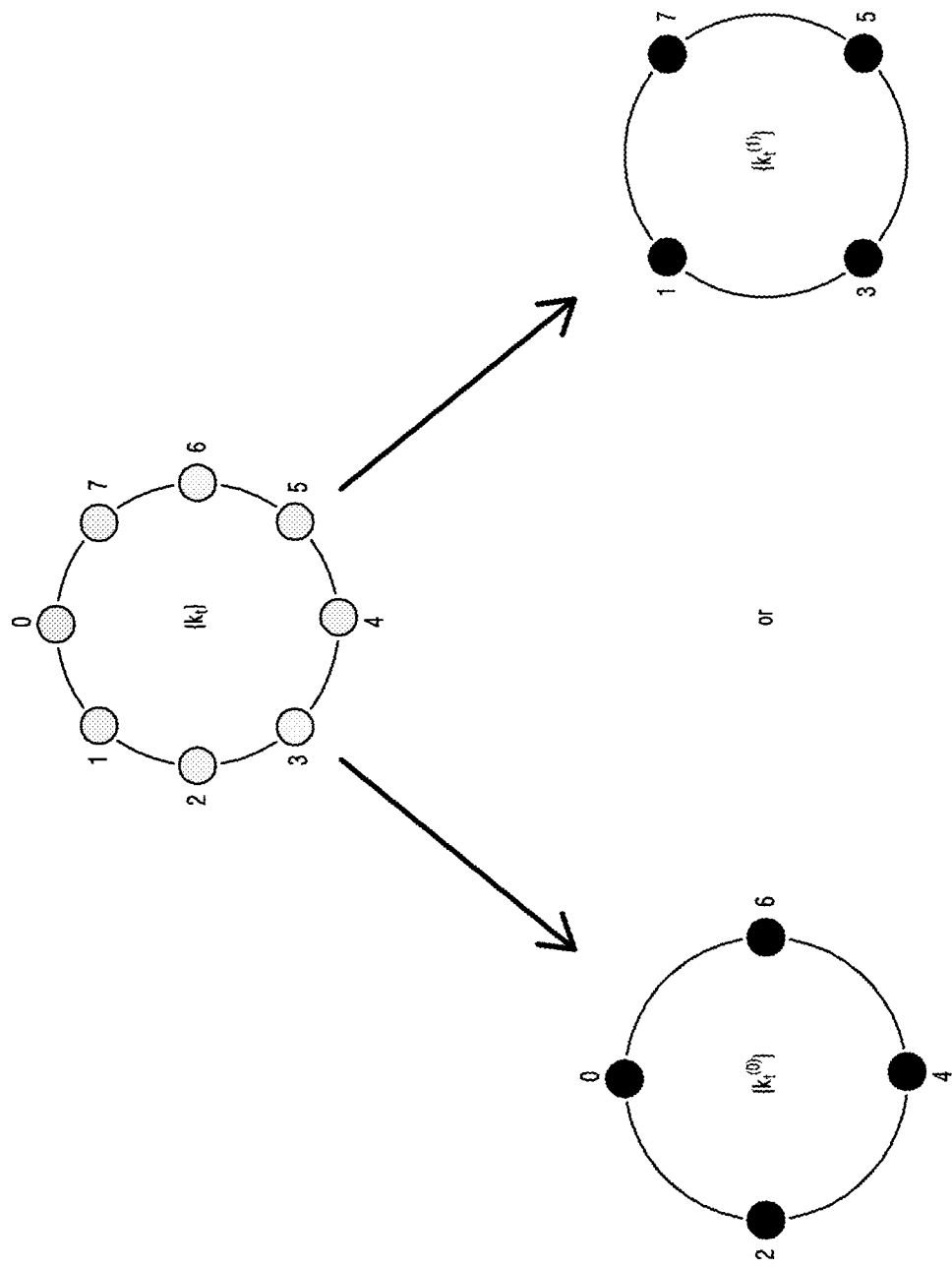
FIG. 12C is illustrative embodiments of adaptation according to an embodiment of the disclosure.

FIG. 12C is illustrative embodiments of adaptation according to an embodiment of the disclosure.

Figure 12D:
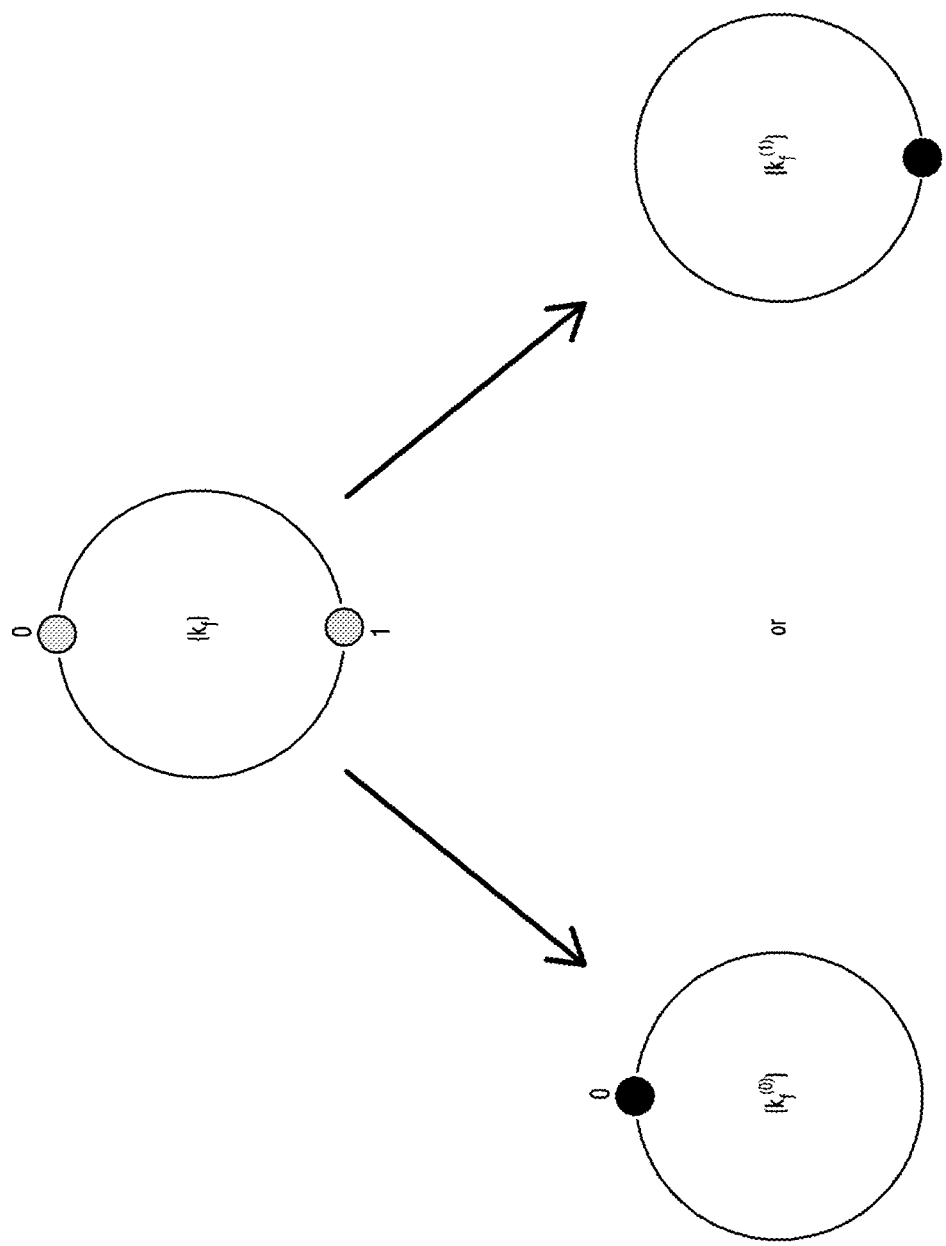
FIG. 12D is illustrative embodiments of adaptation according to an embodiment of the disclosure.

FIG. 12D is illustrative embodiments of adaptation according to an embodiment of the disclosure.

Referring to FIGS. 12A, 12B, 12C, and 12D, the approach according to the application to the considered embodiment of the adaptation is generally illustrated: FIGS. 12A to 12C—for DFT TD-OCCs and FIGS. 12B and 12D—for DFT FD-OCCs.

In each of FIGS. 12A and 12B, the available DFT OCC sets are shown, for visual clarity, on a circumference, with indexing the orthogonal cover codes counter-clockwise. Though 8 DFT OCCs are shown in each of them, it should be appreciated that the available set can comprise a different number of DFT OCCs, which is implied by ellipses in those figures.

The reduced subset of DFT FD-OCCs is determined according to the following expression:

$$\{k_t^{(m)}\} = \mod\left\{\left\lfloor \frac{K_t}{K_{t\_reduced}} \right\rfloor \cdot i + m, K_t\right\} \quad \text{Equation 3}$$

where $K_{t\_reduced}$ is the required number of orthogonal cover codes in the subset, i.e., after the subsampling;
$K_t$ is the DFT TD-OCC length;
m=0, 1, . . . , $$\left\lfloor \frac{K_t}{K_{t\_reduced}} \right\rfloor - 1$$

the DFT TD-OCC subset index;
i=0, 1, . . . , $K_{t\_reduced}$−1 is the DFT TD-OCC index within the reduced subset;
⌊ ⌋ is the operation of rounding to the closest smaller integer;
mod{a, b} (or b-mod(a)) is the operation of taking the remainder of division of b by a;
$k_t$ is the DFT TD-OCC code sequence (code vector) index in the initially available set of DFT TD-OCCs (see, for example, Table 2).

The black circles in FIG. 12A illustratively denote the DFT TD-OCCs which the reduced subset is comprised of.

Moreover, FIG. 12C specifically illustrates the possible options of reducing the initially available set of 8 DFT TD-OCCs, which corresponds to the DMRS pattern in FIG. 8, to the subset of 4 DFT TD-OCCs according to the application. As seen from this figure, the subset 0 of 4 DFT TD-OCCs with indices $k_t$ {0, 2, 4, 6} and the subset 1 of 4 DFT TD-OCCs with indices $k_t$ {1, 3, 5, 7} can be obtained according to Equation 3.

Thereafter, the reduced subset of DFT FD-OCCs is determined in a similar way according to the following expression:

$$\{k_f^{(m)}\} = \mod\left\{\left\lfloor \frac{K_f}{K_{f\_reduced}} \right\rfloor \cdot i + m, K_f\right\} \quad \text{Equation 4}$$

where $K_{f\_reduced}$ is the required number of orthogonal cover codes in the reduced subset;
$K_f$ is the DFT FD-OCC length;
m=0, 1, . . . , $$\left\lfloor \frac{K_f}{K_{f\_reduced}} \right\rfloor - 1$$

is the DFT FD-OCC subset index;
i=0, 1, . . . , $K_{f\_reduced}$−1 is the DFT FD-OCC index within the reduced subset;
$k_f$ is the DFT FD-OCC code sequence index in the initially available set of DFT FD-OCCs (see, for example, Table 1).

The black circles in FIG. 12B also illustratively denote the DFT FD-OCCs which the reduced subset is comprised of. Furthermore, FIG. 12D shows, purely for illustration purposes, the possible options of reducing the available set of 2 DFT FD-OCCs to 1 DFT FD-OCC according to the application.

The maximum 'distance' between DFT OCCs remaining in the reduced subset is seen from the circumferences of FIGS. 12A, 12B, and 12C. It should be appreciated that the configuration of the three DFT TD-OCCs of the reduced subset, as illustratively shown in FIG. 12A, is not the only possible implementation, and subsets of the same size can be obtained from other code sequences $k_f$, with the same characteristic of 'distance'. In the same way, the configuration of the four DFT FD-OCCs of the reduced subset, as illustratively shown in FIG. 12B, is not the only possible implementation, and a subset(s) of the same size can be obtained from other code sequences $k_f$, with the same characteristic of 'distance'. Such possible implementations of one configuration are depicted in FIG. 12C.

Table 3 below provides different configurations of reduced subsets of orthogonal cover codes for the DMRS pattern provided herein, as illustrated in FIG. 7 and in Table 1, and Table 2.

TABLE 3

| configuration | $k_f$ | $k_t$ | DMRS capacity | remarks |
| --- | --- | --- | --- | --- |
| 0 | {0, 1, 2, 3} | {0, 1, 2, 3} | 64 | codes are not excluded |
| 1 | {0, 2} or {1, 3} | {0, 1, 2, 3} | 32 | exclusion of codes for FD-OCCs |
| 2 | {0, 1, 2, 3} | {0, 2} or {1, 3} | 32 | exclusion of codes for TD-OCCs |
| 3 | {0, 2} or {1, 3} | {0, 2} or {1, 3} | 16 | exclusion of codes for FD-OCCs and TD-OCCs |

In accordance with the aforesaid, DMRS capacity in Table 3 refers to the required number of used DMRS ports.

Figure 13A:
FIG. 13A is an illustration of selecting a reduced digital Fourier transform (DFT) orthogonal cover code (OCC) configuration according to an embodiment of the disclosure.
Figure 13B:
FIG. 13B is an illustration of selecting a reduced DFT OCC configuration according to an embodiment of the disclosure.

FIGS. 13A and 13B are illustrations of selecting a reduced DFT OCC configuration from a respective initially available combination of orthogonal cover codes according to various embodiments of the disclosure.

Referring to FIG. 13A, it shows generating the reduced subset 0 which consists of the DFT FD-OCC having index 0 and the DFT FD-OCC having index 2 according to the approach of the considered embodiment of the application, which corresponds to the configuration 1 or 3 of Table 3.

Referring to FIG. 13B, in a similar way, it shows generating the reduced subset 1 which consists of the DFT TD-OCC having index 1 and the DFT TD-OCC having index 3, which corresponds to the configuration 2 or 3 according to Table 3.

It should be emphasized herein that the required orthogonality is maintained in each of the considered possible embodiments of reduced DFT OCC sets.

The other embodiment of the DMRS pattern adaptation, as described above, provides an additional advantage at the receiving side, since the approach to generating reduced code points to reduce DMRS capacity, as proposed in the application, provides more reliable avoidance of interference between DMRS signals, especially in view of various kinds of distortions which the transmitted MIMO layers can be subjected to during propagation. This in turn results in more reliable channel estimation performance at the receiving side.

It should be explained herein that, when using orthogonal cover codes (OCCs) in the DMRS pattern, the procedure of de-spreading the received DMRS sequence should be conducted at the receiver side on the entire length of a respective orthogonal cover code (for example, on length 4, which corresponds to some embodiments of the application), in order to suppress interference between the orthogonal cover codes. The procedure of generating a reduced OCC set with maximization of the inter-code distance, as discussed above with reference to FIGS. 12A to 12D, 13A, and 13B, provides full suppression of interference by de-spreading the received DMRS sequence on a smaller length (for example, on length 2). This allows to minimize the influence of possible loss of orthogonality between codes in scenarios with substantial frequency-selective or temporal channel fadings.

Figure 14:
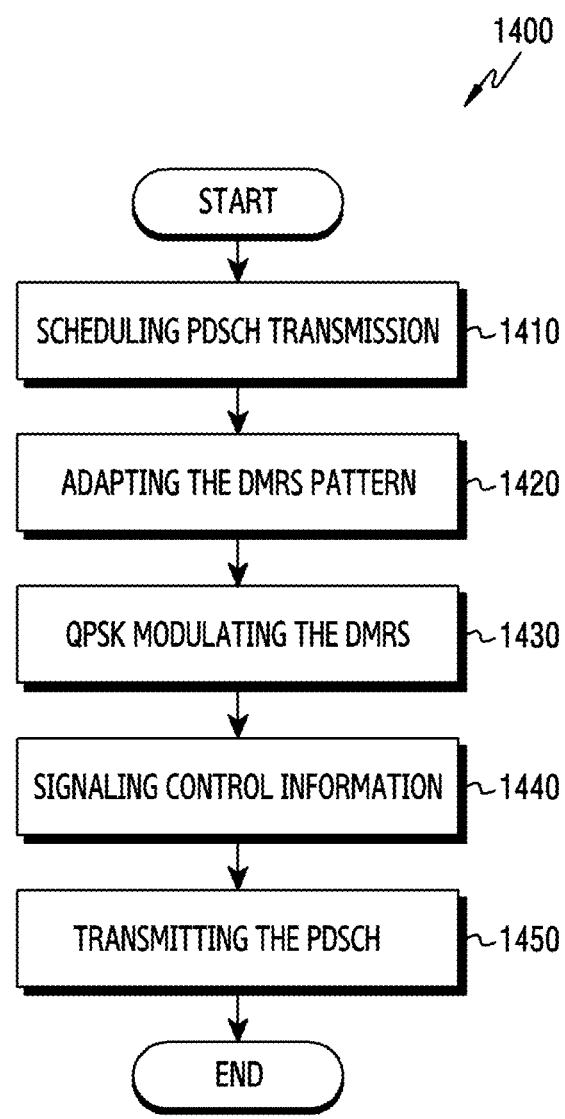
FIG. 14 is a flowchart of an embodiment of a wireless communication method according to an embodiment of the disclosure.

FIG. 14 is a flowchart of another embodiment of a wireless communication method 1400 according to an embodiment of the disclosure.

Referring to FIG. 14, a method 1400 is performed in the base station (for example, the TRP 602 of FIG. 6) which supports simultaneous transmission of N spatial MIMO layers of the PDSCH (for instance, 64) each having a different DMRS signal associated therewith.

In operation 1410, PDSCH transmission to at least one UE (for example, the UE 601 of FIG. 6) is scheduled by using a desired number M MIMO layers from the N MIMO layers, where M is a positive integer less than N (for example, M=32, 16, or 8).

In operation 1420, respective adaptation of the DMRS pattern initially defined for the N MIMO layers (see operation 910 with reference to FIG. 9) is performed. As reported above, said initial DMRS pattern is characterized by using L CDM groups (L=4), DFT FD-OCCs of length Kf, and DFT TD-OCCs of length Kt. For the considered embodiment of N=64, this initial DMRS pattern is illustrated in FIG. 7, where Kf=4 and Kt=4.

The DMRS pattern is adapted in operation 1420 by reducing the Kf initially available DFT FD-OCCs to a reduced subset of Kf_reduced DFT FD-OCCs and/or the Kt initially available DFT TD-OCCs to a reduced subset of Kt_reduced DFT TD-OCCs, where Kf_reduced is a positive integer less than Kf, and Kt_reduced is a positive integer less than Kt, wherein L can be set equal to 2 or 4. The adapted DMRS pattern provides multiplexing of the M DMRS signals for the M MIMO layers. Said reduction is performed in such a way that a respective reduced subset includes DFT OCCs for which the distance between code indices modulo the code length is maximum, as disclosed above with reference to FIGS. 12A, 12B, 12C, and 12D, 13A, and 13B, and Table 3.

In operation 1440, similarly to operation 940, the TRP signals control information to the UEs. The control information, besides the parameters L, Kf, and Kt, also comprises an indication of the reduced DFT FD-OCC subset and/or the reduced DFT TD-OCC subset. The aspects of signaling the control information, including the indication of an orthogonal cover code set(s), will be disclosed hereinbelow.

In operation 1450, similarly to operation 950, the scheduled PDSCH transmission is performed.

The attention should be drawn to the fact that, in any of the embodiments of adaptation described above, the DMRS pattern according to the application remains stable and maintains uniformity in the frequency domain. For example, the technical solution provided herein avoids transitioning to a substantially different DMRS pattern when it is required to change DMRS capacity, like e.g., in the case of switching between Type 1 and Type 2 in 5G NR, and the associated growth of complexity of the channel estimation algorithm at the receiving side.

According to the preset application, combined usage of both disclosed options of adapting the DMRS pattern is not excluded. For instance, the DMRS pattern shown in FIG. 8 can be adapted to the DMRS pattern shown in FIG. 7 by accordingly reducing the DFT TD-OCC length, as outlined above, and thereafter this adapted DMRS pattern can be subjected to further adaptation by excluding orthogonal cover codes in accordance with the disclosure of FIGS. 12A, 12B, 12C, and 12D, 13A, and 13B with reference to Table 3.

Though the abovementioned adaptation methods according to the application have been described for the case of reducing DMRS capacity, it should be appreciated that they are also applicable to the case of increasing thereof, when it may be required to again transmit a greater number of MIMO layers.

In particular, an embodiment of the wireless communication method 1100, which corresponds to at least partial inversion of said former embodiment of adapting the DMRS pattern, is illustrated with reference to FIG. 11. The method 1100 is performed in a base station (for instance, the TRP 602 of FIG. 6) which supports simultaneous transmission of N spatial MIMO layers of the PDSCH (for example, 64), each having a different DMRS signal associated therewith. It is implied in the embodiment considered herein that the TRP is currently using the previously adapted DMRS pattern wherein M (M<N) DMRS signals are multiplexed (for instance, the adapted DMRS pattern illustrated in FIG. 10, where M=16).

In operation 1110, another PDSCH transmission is scheduled to at least one UE (for instance, the UE 601 of FIG. 6) by using M' MIMO layers, where M<M'≤N.

In operation 1120, adaptation of the DMRS pattern is performed by respectively increasing the DFT FD-OCC length Kf' to Kf", where Kf'<Kf"≤Kf, and/or increasing the DFT TD-OCC length Kt' to Kt", where Kt'<Kt"≤Kt (see Equations 1 and 2). The adapted DMRS pattern provides multiplexing of the M' DMRS signals for the M' MIMO layers. For the embodiment of M'=N=64 considered herein, the DMRS pattern obtained in operation 1120 is illustrated in FIG. 7, where Kf"=Kf=4 and Kt"=Kt=4 at L=4.

In operation 1140, the TRP sends control information to the UE. The control information contains information about the DMRS pattern obtained in operation 1120, including at least the parameters L, Kf", and Kt".

In operation 1150, the scheduled another PDSCH transmission is performed.

For the case of inverting said latter embodiment of adapting the DMRS pattern, the base station uses a new, increased value of the number of OCCs, for example, Kt_reduced=Kt (see Equation 3) and/or Kf_reduced=Kf (see Equation 4), and signals this new value(s) to the UEs.

To summarize the aforesaid, the DMRS pattern according to the application, on one hand, enables to multiplex a greater number of DMRS signals, as corresponding to the requirements of next generation wireless communication systems (for instance, 64 in the case of the 6G 10-12 GHz frequency range), and, on the other hand, has flexible, dynamic (unlike the semi-static one in 5G NR) adaptability, without substantial modification of the DMRS pattern itself (i.e., the DMRS pattern provided herein is unified) and with maintenance of the desired quality and low complexity of channel estimation at the receiving side, as well as with support of backwards compatibility.

Thereafter, as recited plural times earlier, DMRS signals transmitted from one base station are orthogonal, i.e., they do not cause interference to each other within a cell covered by said base station. For example, if the scheme of FIG. 6 is referred to, DMRS signals transmitted from the TRP 602-B do not cause interference in each of the UE 601-1, the UE 601-2, the UE 601-3 which are in the cell covered by the TRP 602-B, DMRS signals transmitted from the TRP 602-C do not cause interference in each of the UE 601-4, the UE 601-5, the UE 601-6, the UE 601-7 which are in the cell covered by the TRP 602-C. At the same time, orthogonality between DMRS signals of neighboring cells is initially not ensured, which may cause interference at cell boundaries. As seen from FIG. 6, the UE 601-3 is simultaneously within coverage areas of the base stations TRP 602-A and TRP 602-B and is in close proximity to the boundary of the cell covered by the base station TRP 602-C. Therefore, interference between DMRS signals received simultaneously from the TRP 602-A, the TRP 602-B, the TRP 602-C may occur in the UE 601-3. Said possible non-orthogonality may lead to highly undesirable decrease of channel estimation quality in the UE 601-3.

As in the case of the known wireless communication systems which have been discussed above, in the application, in order to mitigate this problem, DMRS signals transmitted from each of the TRPs are subjected to QPSK modulation to provide inter-TRP randomization of DMRS signals and thereby avoid interference therebetween. As in the case of said known systems (in particular, 5G NR), according to the application a sequence of QPSK-symbols for modulating the DMRS pattern is obtained from pseudo-nose (PN) sequences. More specifically, the PN sequences represent Gold sequences of length 31. Initialization of the PN sequences is individually configurable per base station. An initialization parameter (seed) of a PN sequence is denoted in the application as NID.

Initialization of PN sequences according to the application is illustrated in FIG. 31 for the case of using the unified DMRS pattern provided herein (see, for example, FIG. 7).

In accordance with the application, a plurality of sets of initialization parameters $\{N_{ID}^i\}$ is provided. As shown in FIG. 31, such sets correspond to its columns. Each initialization parameter in each of the sets is defined independently for each of the L CDM groups, i.e., in general i=0, . . . , L−1. Specifically for the case according to FIG. 7 and FIG. 31, i=0, 1, 2, 3. Thereafter, a unique parameter—a scrambling parameter $n_{SCID}$—is associated with each of the initialization parameter sets, the scrambling parameter substantially uniquely identifying the respective initialization parameter set. Initialization parameter sets identified by any different $n_{SCID}$'s are element-wise different. The sequential order of initialization parameters $\{N_{ID}^i\}$, i=0, 1, 2, 3, in the initialization parameter sets respectively identified by the four scrambling parameters $n_{SCID}$ is specifically illustrated in FIG. 31. Moreover, the cells highlighted in FIG. 31 by a more solid line relate to the embodiment of the pattern with two CDM groups (i.e., L=2, ∆=0, 1, i=0, 1), which corresponds to the 5G NR DMRS patterns described above, as well as to the abovementioned adapted DMRS patterns according to the application. Each of the neighboring base stations is assigned with its own different $n_{SCID}$, i.e., its own different initialization parameter set.

For the purpose of explanation of the aforesaid with reference to FIG. 31, for the initialization parameter set identified by $n_{SCID}$ equal to 0, signals of the CDM group with index ∆=0 are modulated by the PN sequence initialized by NID, signals of the CDM group with index ∆=1 are modulated by the PN sequence initialized by initialized by $N_{ID}^1$, signals of the CDM group with index ∆=2 are modulated by the PN sequence initialized by $N_{ID}^2$, and signals of the CDM group with index ∆=3 are modulated by the PN sequence initialized by $N_{ID}^3$. A similar scenario will take place in the case of $n_{SCID}$ equal to 1, 2, or 3 as well.

The usage of scrambling parameters which unambiguously identify respective different sets of initialization parameters of PN sequences enables to promptly, dynamically notify user devices on which initialization parameters shall be used for QPSK demodulation of received signals. Said notifying is preferably performed by the DCI transmitted in the PDCCH. For instance, inclusion into the DCI transmitted from a TRP (for example, the TRP 602-B of FIG. 6) of $n_{SCID}$ equal to 1 instructs all UEs currently served by said TRP to use the initialization parameter set $\{N_{ID}^1, N_{ID}^0, N_{ID}^3, N_{ID}^2\}$ for the CDM groups $\Delta=0, 1, 2, 3$, respectively. It should be noted that the usage of one parameter $n_{SCID}$ enables to avoid excessive bit overhead in the DCI. Furthermore, fast (i.e., with low delays) switching of an initialization parameter set at the UE side is provided thereby. Following the above example, if a UE (for instance, the UE 601-3 of FIG. 6) subsequently receives, from a TRP (for example, the TRP 602-A of FIG. 6), the DCI with a different scrambling parameter, for example, $n_{SCID}$ equal to 3, then prompt switching to the respective initialization parameter set $\{N_{ID}^3, N_{ID}^2, N_{ID}^3, N_{ID}^0\}$ will be ensured in the UE 601-3. It should be noticed that the example of switching initialization parameters of PN sequences, as presented herein, has solely illustrative nature.

It should be emphasized herein that, owing to usage of the C-RAN technology, which has been discussed above, in existing and future wireless communication systems, fast switching of a UE between base stations is provided, in particular. Therefore, the necessity further arises in respective prompt switching between initialization parameter sets. The technical solution described herein enables to ensure the required promptness.

Therefore, each of the methods 900, 1100, 1400 described above with reference to FIGS. 9, 11, and 14 is added, preferably prior to operations 940, 1140, 1440 of sending the control information, with operation 930, 1130, 1430 wherein modulation of DMRSs is performed with a sequence of QPSK-symbols which is obtained from PN sequences, each initialized by a different initialization parameter $N_{ID}$ from a set comprising L initialization parameters, wherein a different scrambling parameter $n_{SCID}$ is associated with each of the L initialization parameter sets, wherein, in each of the L initialization parameter sets, each of L initialization parameters is set different for each of L CDM groups, so that, for each of the L CDM groups, initialization parameters are different for different scrambling parameters (see FIG. 31 for illustration). Moreover, the control information for scheduling PDSCH or PUSCH transmissions, which is respectively transmitted in operations 940, 1140, 1440 preferably via the DCI to each of UEs served by the base station, further comprises a current value of the scrambling parameter $n_{SCID}$ used for said modulation, in order to instruct the UE to use the initialization parameter set identified by said value.

As reported above, a similar procedure is also applied in uplink to randomize interference between DMRS signals from UEs served by neighboring TRPs.

The approaches to multiplexing DMRS signals according to the application, as disclosed above with reference to FIGS. 7 to 11, 12A to 12D, 13A, 13B, and 14, are summarized by the following mathematical expression which defines the DMRS signal value a for DMRS port p in subcarrier k and OFDM-symbol l:

$$\alpha_{k,l}^{(p)} = \beta^{DMRS} w_t(l') w_f(k') r(4n + k')  \quad \text{Equation 5}$$

wherein $\beta^{DMRS}$ is the power offset for the DMRS;

$$w_f(k') = \left\{ e^{-2\pi j \frac{k_f}{K_f} k'} \right\}, k' = 0, \ldots, K_f - 1 \quad \text{Equation 5-1}$$

$w_f(k')$ is the DFT FD-OCC (see Equation 1 and explanations with respect thereto), where $k_f$ is the DFT FD-OCC code vector index, $K_f$ is the DFT FD-OCC length, k' is the DMRS subcarrier index in a CDM group (for the DMRS pattern according to the application, as shown in FIG. 7, see Table 1: $K_f=4$, k'=0, 1, 2, 3, $k_f=0$, 1, 2, 3);

$$w_t(l') = \left\{ e^{-2\pi j \frac{k_t}{K_t} l'} \right\}, l' = 0, \ldots, K_t - 1 \quad \text{Equation 5-2}$$

$w_t(l')$ is the DFT TD-OCC (see Equation 2 and explanations with respect thereto), where $k_t$ is the DFT TD-OCC code vector index, $K_t$ is the DFT TD-OCC length, l' is the DMRS OFDM-symbol index in a CDM-group (for the DMRS pattern according to the application, as shown in FIG. 7, see Table 2: $K_t=4$, l'=0, 1, 2, 3, $k_t=0$, 1, 2, 3);

$$k = K_f \cdot L \cdot n + L \cdot k' + \Delta \quad \text{Equation 5-3}$$

k is the subcarrier index, where $\Delta$ is the CDM group index, L is the number of CDM groups (for the DMRS pattern according to the application, as shown in FIG. 7, L=4, $K_f L=16$);

$$l = T_{DMRS} \bar{l} + l_{start}^{PDSCH} \quad \text{Equation 5-4}$$

l is the OFDM-symbol index, where $l_{start}^{PDSCH}$ is the start OFDM-symbol index of a PDSCH time interval bundle within a DL/UL-period, $\bar{l}$—is the DMRS occasion index within the DL/UL-period, $\bar{l}=0, 1, 2, \ldots, T_{DMRS}$ is the DMRS period. DL/UL-periods, as well as the parameters $l_{start}^{PDSCH}, \bar{l}, T_{DMRS}$, will be discussed in subsequent sections of the description of the disclosure.

$$r(n) = \quad \text{Equation 5-5}$$
$$\frac{1}{\sqrt{2}}(1 - 2 \cdot c(2n)) + j\frac{1}{\sqrt{2}}(1 - 2 \cdot c(2n + 1)), n = 0, 1, 2, \ldots$$

r(n) is the QPSK sequence, where c( . . . ) is the Gold sequence of length 31 which is unique for each CDM group and which is respectively initialized for the each CDM group by its own $c_{init}$. For the embodiment discussed above with reference to FIG. 31, $$c_{init} = \left(2^{18}\left(N_{symb}^{UL-DL} \cdot n_{UL-DL}^f + l + 1\right)\left(4N_{ID}^{n_{SCID}} + l + 1\right) + 4N_{ID}^{n_{SCID}} + n_{SCID}\right) \bmod 2^{31} \quad \text{Equation 5-6}$$

where $n_{SCID}$ is the scrambling parameter (in accordance with the aforesaid with reference to FIG. 31, it can be dynamically indicated in the DCI among the values {00, 01, 10, 11}), $N_{ID}$ is the initialization parameter (see FIG. 31, wherein $N_{ID}^0, N_{ID}^1, N_{ID}^2, N_{ID}^3 \in \{0, 1, \ldots, 65535\}$)

$N_{symb}^{UL-DL}$ is the number of OFDM-symbols within the DL/UL-period, $n_{UL-DL}^f$ is the DL/UL-period index.

II. Indication of DMRS Ports for UEs

In view of the aforesaid when describing the background art, the following problem exists in the context of designing next generation (including 6G) wireless communication systems.

On one hand, it is required to increase capacity of the DMRS pattern in view of a significantly greater supported number of spatial MIMO layers for broadband data transmission. At the same time, the DMRS port indication scheme existing in 5G NR, as briefly described with reference to FIGS. 4A and 4B, supports at most 12 DMRS ports at the TRP side and at most 8 DMRS ports per UE (SU-MIMO), at the absence at present time of a systematized approach enabling to extend said existing scheme to the required greater number of DMRS ports—in particular, 64 DMRS ports at the TRP side and 16 at the UE side.

On the other hand, the information about DMRSs, inter alia about DMRS ports to be used, should be signaled to user devices with a small delay, and transmission of the DCI over the PDCCH is typically used to this end. Moreover, there is a strict constraint on the total number of DCI bits, as reported above. As a consequence, an attempt to directly extrapolate the existing scheme or approaches similar thereto onto next generation wireless communication systems for transmission to UEs of the information about DMRS ports, which are to be used, over the physical control channel will lead to the unacceptably great number of bits in the DCI.

In the application the techniques are provided in the considered context which enable to efficiently encode the control information transmitted from a TRP about a sub-combination of DMRS ports to be used in a UE(s), with relatively low bit overhead in the control information.

Embodiment 1: Tree-Based Indication of DMRS Ports with Prefix Coding

The tree-like hierarchy based implementation of DMRS port indication with prefix coding according to the application is described thereafter with reference to FIGS. 15, 16A, 16B, and 17.

Figure 15:
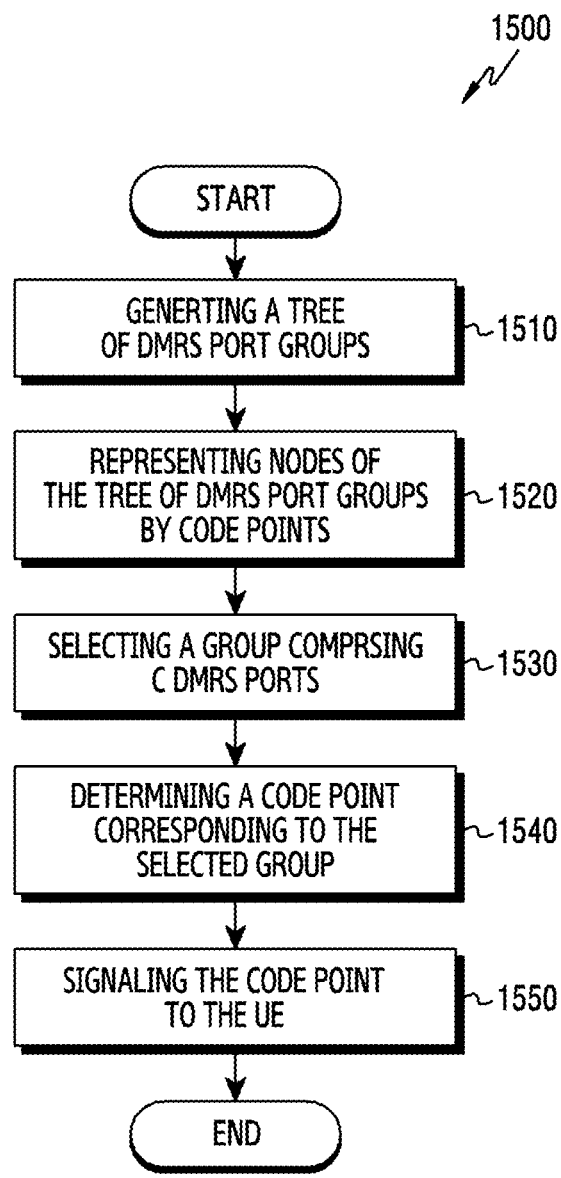
FIG. 15 is a flowchart of a method of indicating DMRS ports for a UE according to an embodiment of the disclosure.

FIG. 15 is a flowchart of a method 1500 of indicating DMRS ports for at least one UE in a wireless communication according to an embodiment of the disclosure.

The method 1500 is performed in a base station (for example, the TRP 602 of FIG. 6) which supports simultaneous transmission of N spatial MIMO layers of the PDSCH (for instance, 64) each having a different DMRS signal associated therewith.

In operation 1510, a tree-like hierarchy of DMRS port groups is generated, where every hierarchy node corresponds to a group of one or more DMRS ports. More particularly, every node in the lowest (leaf) tier of the hierarchy corresponds to one of a preset number N' of DMRS ports. Preferably, N'=N, i.e., the total number of DMRS ports available for usage in the TRP. In every subsequent tier of the tree-like hierarchy, counting from its leaf tier, every node corresponds to a DMRS port group obtained by merging the same number of different DMRS port groups from a preceding hierarchy tier. The highest (sub-root) tier of the tree of DMRS port groups is the tier where the number of DMRS ports in every DMRS port group is equal to the total number M of DMRS ports available for being used in the UE (for instance, 16), where M≤N'.

In operation 1520, every node of the generated tree of DMRS port groups is represented by a code point. Every code point is comprised of a first subset of bits and a second subset of bits, wherein a number of bits in the first subset and a number of bits in the second subset are variable. For every node of the hierarchy of DMRS port groups is a specific hierarchy tier, bits of the first subset encode the number of DMRS ports in every DMRS port group in said specific hierarchy tier, while bits of the second subset encode a DMRS port group corresponding to said hierarchy node.

In operation 1530, a group comprising C DMRS ports to be used in the UE, where C≤M, is selected in the tree-like hierarchy of DMRS port groups.

In operation 1540, a code point corresponding to the selected DMRS port group is determined from the code points obtained in operation 1520.

In operation 1550, control information including the code point determined in operation 1540 is signaled to the UE. This signaling is preferably performed by the DCI transmitted in the PDCCH. The signaling of the code point in operation 1550 can indicate to the UE to use the selected C DMRS ports for reception of C MIMO layers of the PDSCH. Or said signaling can indicate to the UE to use the selected C DMRS ports for transmission of C MIMO layers of the PUSCH.

Figure 16A:
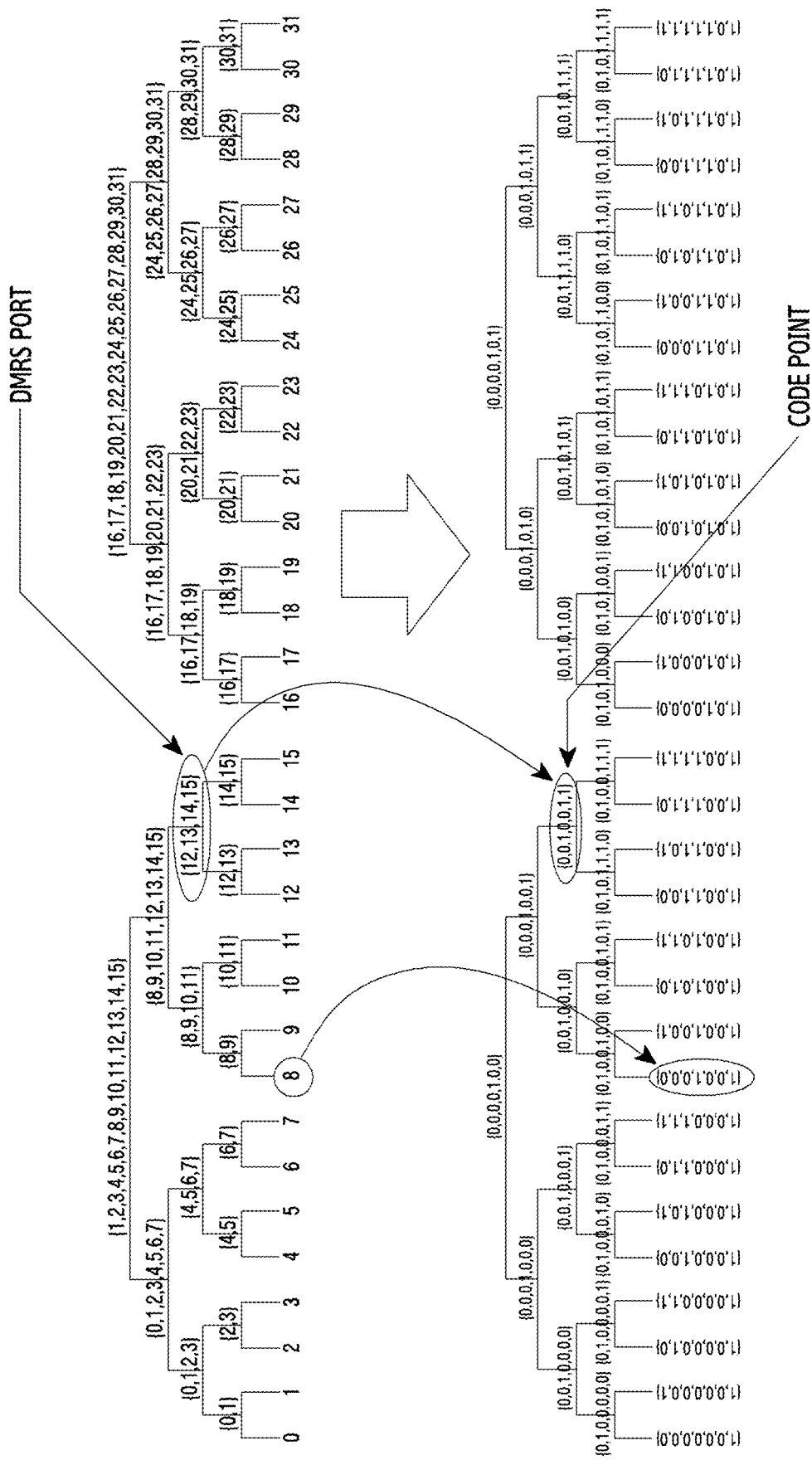
FIG. 16A is an illustration of a tree hierarchy of DMRS port groups and encoding them according to an embodiment of the disclosure.
Figure 16B:
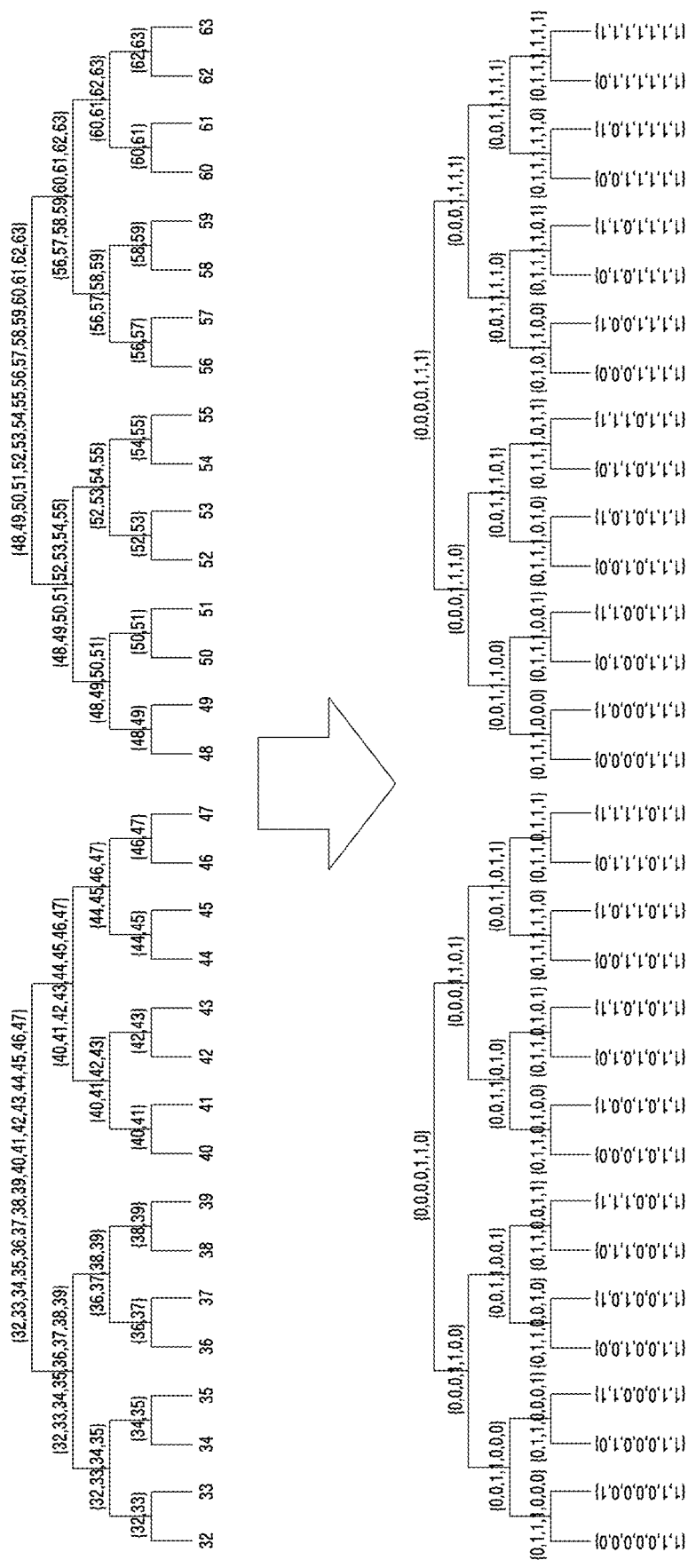
FIG. 16B is an illustration of a tree hierarchy of DMRS port groups and encoding them according to an embodiment of the disclosure.

The general approach described above with reference to FIG. 15 is illustrated in FIGS. 16A and 16B by a specific embodiment of pair-wise merging DMRS port groups, wherein N and M are power 2 integers.

FIG. 16A is an illustration of a tree hierarchy of DMRS port groups and encoding them according to an embodiment of the disclosure.

FIG. 16B is an illustration of a tree hierarchy of DMRS port groups and encoding them according to an embodiment of the disclosure.

Referring to FIGS. 16A and 16B, they show a single tree of DMRS port groups which is obtained for the case where N'=N=64 and M=16 (the upper part of the figures), as well as code points corresponding thereto (the lower part of the figures).

Indices used in the presented tree-like hierarchy of DMRS port groups correspond to sequential indices of DMRS ports. Every node in the lowest hierarchy tier (a leaf) corresponds to one of 64 DMRS ports available for being used in the TRP. Starting from the leaf tier, every DMRS port group of a subsequent tier of the tree is obtained by merging two adjacent DMRS port groups from a preceding hierarchy tier in such a way that every DMRS port group of the preceding hierarchy tier is included only by one DMRS port group of the subsequent hierarchy tier. In the highest tier of the considered tree, nodes correspond to four combinations of sequential 16 DMRS ports which can be available for usage in the UE.

Then in each of the code points which are illustrated by the lower part of FIGS. 16A and 16B, the second subset of bits is a postfix subset, whereas the first subset of bits is a prefix subset. For every node of the tree-like hierarchy of DMRS port groups in its specific tier, bits of the prefix subset encode the number of DMRS ports in every DMRS port group in this specific hierarchy tier, while bits of the postfix subset encode a specific DMRS port group corresponding to said node. In particular, in accordance with the illustration of FIG. 16A, the DMRS port group {12, 13, 14, 15} is represented by the code point {0, 0, 1, 0, 0, 1, 1} in which the prefix (0, 0, 1) substantially encodes a tree tier where nodes located in said tree tier each represent groups of 4 DMRS ports, while the postfix (0, 0, 1, 1) encodes the specific group {12, 13, 14, 15} in said tier. Therefore, namely the code point {0, 0, 1, 0, 0, 1, 1} will be signaled in the DCI in operation 1550. In a similar way, in FIG. 16A the tree leaf corresponding to the DMRS port 8 is represented by the code point {1, 0, 0, 1, 0, 0, 0}, wherein the prefix (1) encodes the lowest tier of the tree, whereas the postfix (0, 0, 1, 0, 0, 0) encodes the particular single port. In this case, the code point {1, 0, 0, 1, 0, 0, 0} will be signaled in the DCI in operation 1550. In both considered illustrative cases, the size of the code point is only 7 bits, i.e., bit overhead in the DCI for indicating the required combination of DMRS ports is low.

Figure 17:
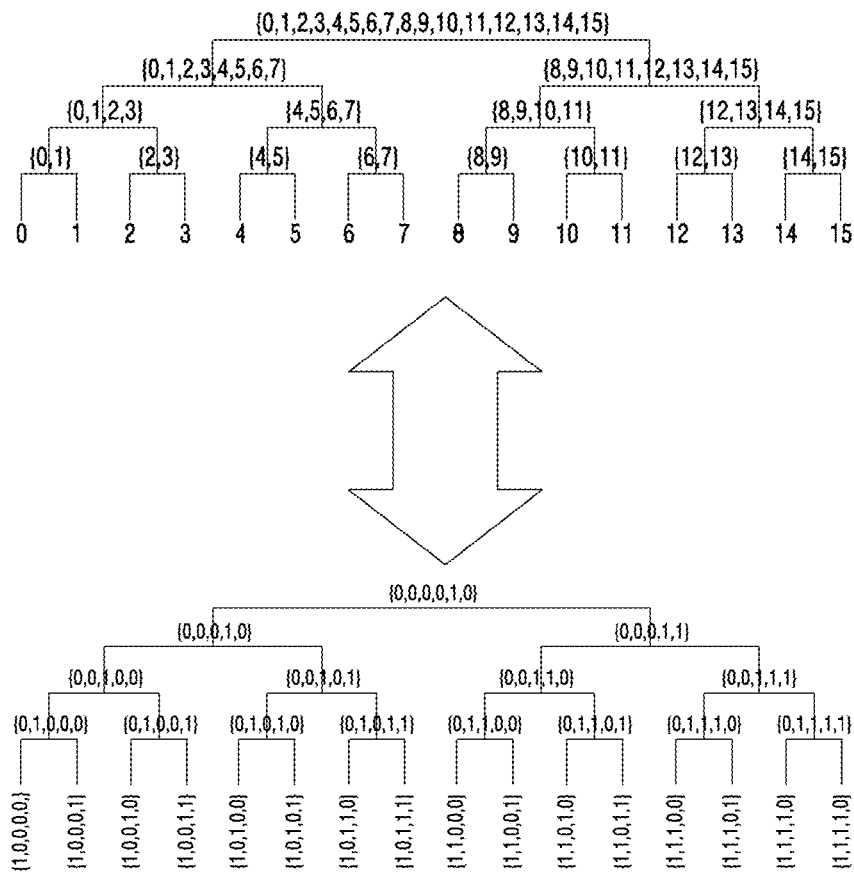
FIG. 17 is an illustration of a tree hierarchy of DMRS port groups and encoding them according to an embodiment of the disclosure.

FIG. 17 is an illustration of a tree hierarchy of DMRS port groups and encoding them according to an embodiment of the disclosure.

Referring to FIG. 17, it similarly illustrates adaptation of the considered approach when DMRS port groups are generated from the total number of 16 DMRS ports, i.e., N'=M=16 (the upper part of the figure), and are respectively represented by code points (the lower part of the figure). Every leaf in the lowest tier of the tree-like hierarchy corresponds to a specific one of the 16 DMRS ports, whereas its highest tier corresponds to the combination of all the sequential 16 DMRS ports. Every code point similarly encodes, by its prefix part, a tree tier, and encodes, by its postfix part, a specific DMRS port group. In the illustrative case considered herein, the code point size is 5 bits, i.e., bit overhead in the DCI for indicating the required combination of DMRS ports is again very low.

It should be appreciated that the bit representation outlined in FIGS. 16A, 16B, and 17 and respective disclosure is illustrative, but not the only possible. In particular, without limitation of generality, in every code point, its postfix subset may encode a tier of the tree of DMRS groups, while the prefix subset may encode a specific DMRS group from this tier. Moreover or in addition to this, other combinations of bits for the encoding can be used in one of or both the postfix subset and the prefix subset—in particular, values of bits in one of or both the postfix subset and the prefix subset may be respectively inverted: 0→1, 1→0.

The advantages of the considered embodiment 1 refer to very low DCI bit overhead and good scalability. Its principal drawback is low flexibility, since only a relatively small number of strictly defined combinations of DMRS ports can be indicated for usage.

Embodiment 2: Indicating Adjacent DMRS Ports

The implementation of indicating adjacent DMRS ports based on one-to-one coding (mapping) according to the application is described hereinafter with reference to FIGS. 18, 19A, 19B, and 19C.

Figure 18:
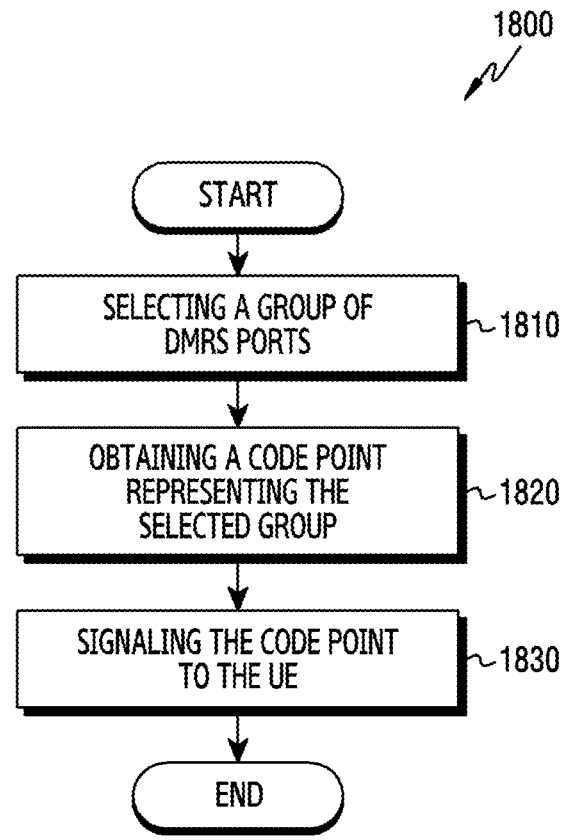
FIG. 18 is a flowchart of a method of indicating DMRS ports for a UE according to an embodiment of the disclosure.

FIG. 18 is a flowchart of a method 1800 of indicating DMRS ports for at least one UE in a wireless communication system according to an embodiment of the disclosure.

Referring to FIG. 18, the method 1800 is performed in a base station (for instance, the TRP 602 of FIG. 6) which supports simultaneous transmission of a plurality of PDSCH spatial MIMO layers each having a different DMRS signal associated therewith.

In operation 1810, a DMRS port group comprising C sequential indices of DMRS ports to be used in the UE is selected from the total number M of sequential indices of DMRS ports available for being used in the UE, where C≤M.

In operation 1820, a code point P is obtained which represents the DMRS port group selected in operation 1810. The code point is calculated as follows:

$$\text{if } (C-1) \le M/2 \quad \text{Equation 6}$$
$$P = M \cdot (C-1) + s,$$
$$\text{else}$$
$$P = M \cdot (M - C + 1) + (N - 1 - s),$$

where s is the start DMRS port index in the selected DMRS port group, s=0, 1, . . . , C−1.

In operation 1830, control information, which includes binary representation of the code point P obtained in operation 1820, is signaled to the UE. Said signaling is preferably performed through the DCI transmitted in the PDCCH. In the UE, a respective DMRS port group to be used can be obviously restored from the received code point P. Moreover, similarly to embodiment 1, the signaling of the code point in operation 1830 can indicate to the UE to use the selected C DMRS ports for receiving C MIMO layers of the PDSCH, or indicate to the UE to use the selected C DMRS ports for transmitting C MIMO layers of the PUSCH.

If a requirement to limit bit size of the code point P is imposed, then possible values of C may be additionally limited in operation 1810 as 2739, where γ and ζ are non-negative integers, for example, C=2, 3, 4, 6, 8, 9, 12, 16.

Figure 19A:
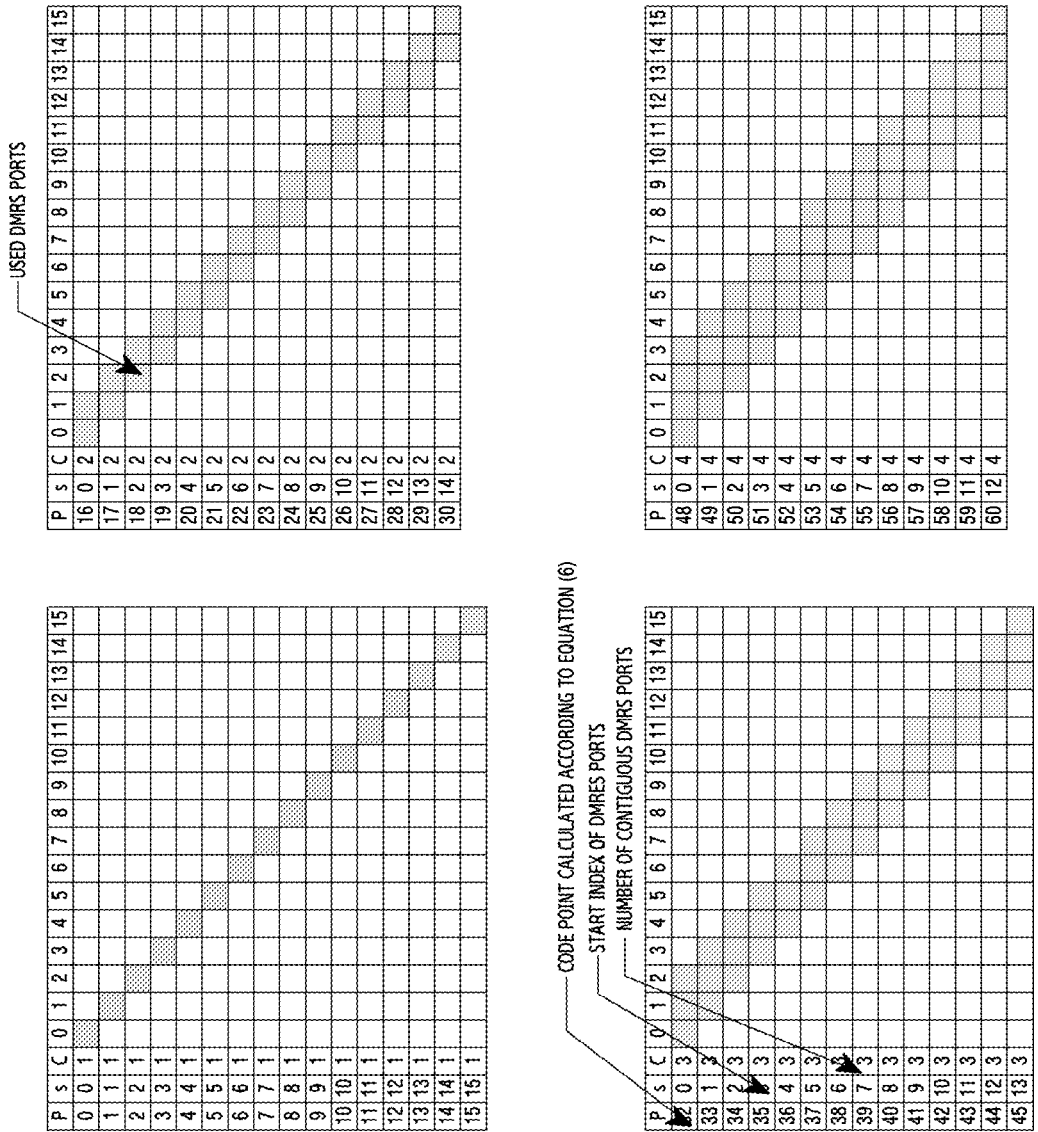
FIG. 19A is illustrations of a table representation of adjacent DMRS port groups according to an embodiment of the disclosure.

The general approach, as disclosed above with reference to FIG. 18, is illustrated in FIGS. 19A-, 19B, and 19C by the table representation of specific embodiments of generating possible groups of adjacent DMRS ports from the total number M=16 of sequential DMRS port indices.

Figure 19B:
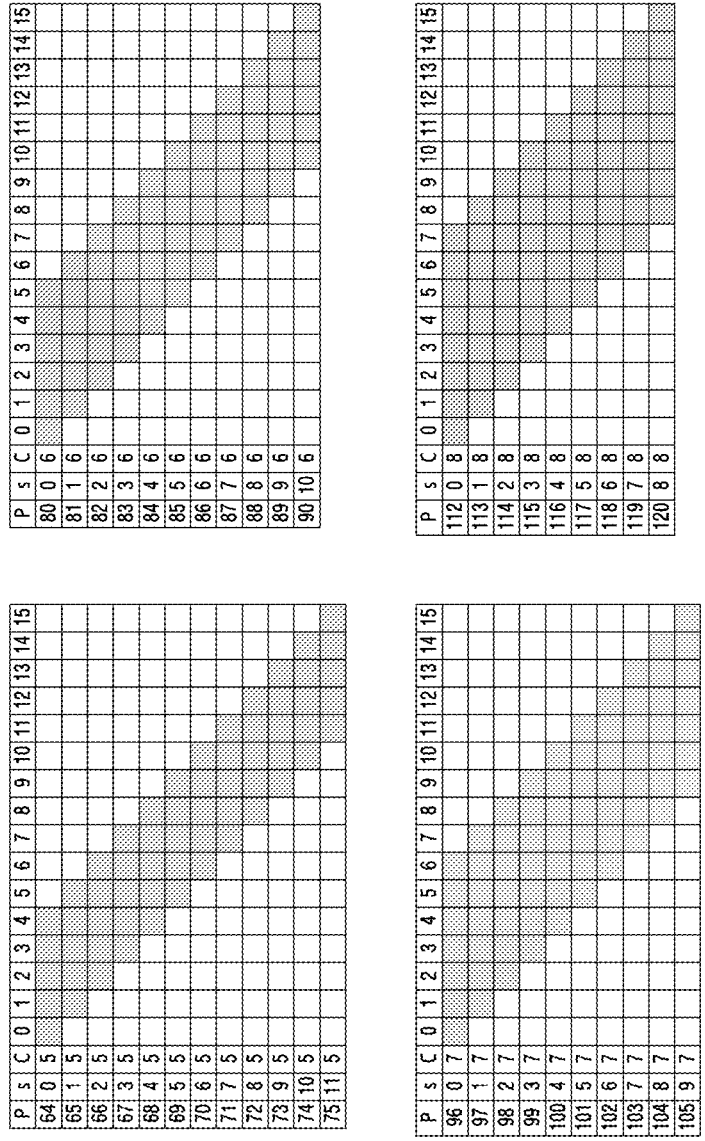
FIG. 19B is illustrations of a table representation of adjacent DMRS port groups according to an embodiment of the disclosure.

For example, by signaling the code point P=72 in operation 1830, the UE is instructed to use the combination of DMRS ports {8, 9, 10, 11, 13}(see FIG. 19B).

FIG. 19A is illustrations of a table representation of adjacent DMRS port groups according to an embodiment of the disclosure.

FIG. 19B is illustrations of a table representation of adjacent DMRS port groups according to an embodiment of the disclosure.

Figure 19C:
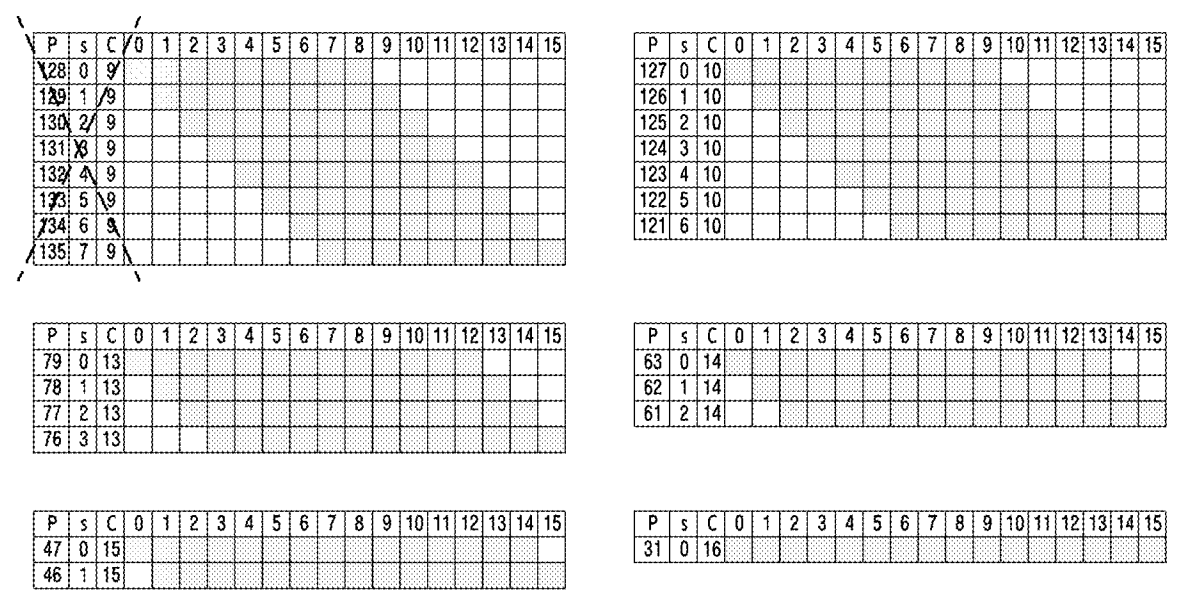

FIG. 19C is illustrations of a table representation of adjacent DMRS port groups according to an embodiment of the disclosure.

Referring to FIGS. 19A, 19B, and 19C, striking out the table in FIG. 19C illustrates the abovementioned limitation of values of C in operation 1810 of the method 1800, i.e., C=9 is excluded from usage.

In the illustrative case considered herein, the code point size does not exceed 8 bits, i.e., bit overhead in the DCI to indicate the required combination of DMRS ports is again not high, though it is in general exceeds the one according to embodiment 1.

The advantages of the considered embodiment 2 refer to relatively low DCI bit overhead, good scalability for different numbers of supported DMRS ports, and greater flexibility as compared to embodiment 1, in terms of greater variety of options to select combinations of DMRS ports. Attention should be further drawn to high efficiency of the encoding, as considered herein, in terms of compactness of representation of all the possible groups of adjacent DMRS ports from the total available number thereof by means of the code point defined by Equation 6, without divergences or omissions.

Embodiment 3: Indicating DMRS Ports Based on Combinatorial Coding

The implementation of indicating generally non-adjacent DMRS ports based on combinatorial coding according to the application is described hereinbelow with reference to FIGS. 20 and 21.

Figure 20:
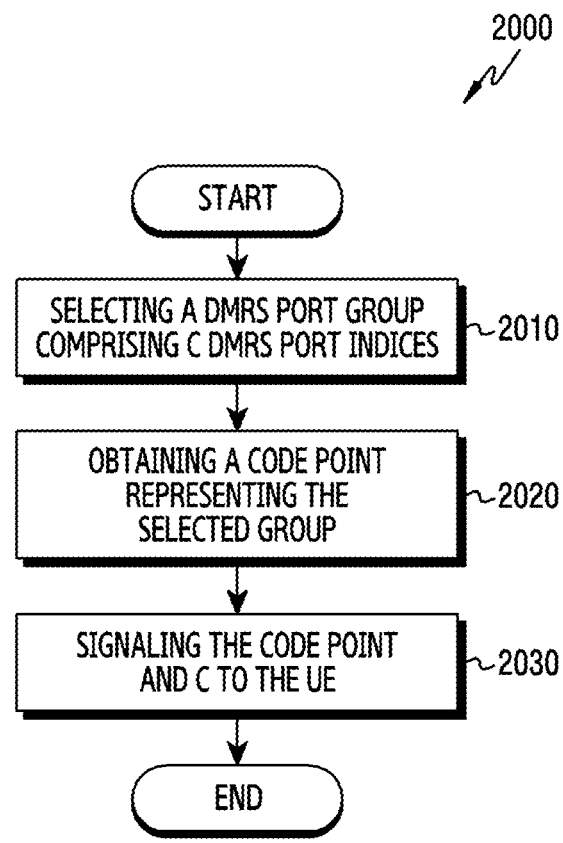
FIG. 20 is a flowchart of a method of indicating DMRS ports for a UE according to an embodiment of the disclosure.

FIG. 20 is a flowchart of a method 2000 of indicating DMRS ports for at least one UE in a wireless communication system according to an embodiment of the disclosure.

Referring to FIG. 20, the method 2000 is performed in a base station (for example, the TRP 602 in FIG. 6) which supports simultaneous transmission of a plurality of PDSCH spatial MIMO layers each having a different DMRS signal associated therewith.

In operation 2010, a DMRS port group comprising C indices of DMRS ports to be used in the UE is selected from the total number M of sequential indices of DMRS ports available for being used in the UE, where C≤M.

In operation 2020, a code point P is obtained which represents the DMRS port group selected in operation 2010. The code point is calculated by combinatorial coding as follows:

$$P = \sum_{i=0}^{C-1} \begin{pmatrix} M - p_i \\ C - i \end{pmatrix},$$ Equation 7 where $$\begin{pmatrix} x \\ y \end{pmatrix} = \begin{cases} \begin{pmatrix} x \\ y \end{pmatrix}, & x \geq y \\ 0, & x < y \end{cases}, \quad \begin{pmatrix} x \\ y \end{pmatrix} = \frac{x!}{y!(x-y)!}$$

$\{p_i\}$ is the ordered set of indices $p_i$ of the selected group of DMRS ports, i=0, . . . , C−1, $p_i$=1, 2, . . . , M.

In operation 2030, control information, which includes binary representation of the code point P obtained in operation 2020, as well as binary representation of the value of C, is signaled to the UE. The signaling is preferably performed through the DCI transmitted in the PDCCH. Moreover, similarly to embodiments 1 and 2, the signaling of the code point in operation 2030 can indicate to the UE to use the selected C DMRS ports for receiving C MIMO layers of the PDSCH, or indicate to the UE to use the selected C DMRS ports for transmitting C MIMO layers of the PUSCH.

It is supposed for illustration of the general approach disclosed above with reference to FIG. 20 that the following combination of C=4 DMRS ports —{9, 10, 13, 14}—is selected in operation 2010 for being used in the UE where, in total, M=16 DMRS ports are available for usage. Then, by using Equation 7 according to operation 2020, the code point is obtained:

$$P = \begin{pmatrix} 16-9 \\ 4 \end{pmatrix} + \begin{pmatrix} 16-10 \\ 3 \end{pmatrix} + \begin{pmatrix} 16-13 \\ 2 \end{pmatrix} + \begin{pmatrix} 16-14 \\ 1 \end{pmatrix} = 60$$

Figure 21:
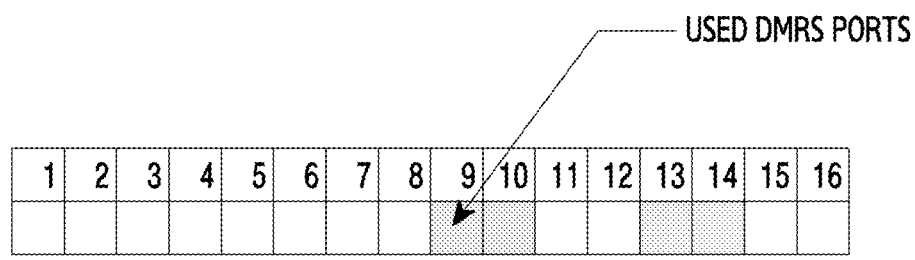
FIG. 21 illustrates encoding a combination of DMRS ports of the method according to FIG. 20 according to an embodiment of the disclosure.

This example is illustrated in FIG. 21.

FIG. 21 illustrates encoding a combination of DMRS ports of a method FIG. 20 according to an embodiment of the disclosure.

Referring to FIG. 21, therefore, by means of signaling the code point P=60 and C=4 in operation 2030, the UE is instructed to use the non-sequential combination of DMRS ports {9, 10, 13, 14}(see FIG. 21). In the illustrative example considered herein, bit overhead in the DCI is 14 bits.

A number of approaches are known which can be implemented in the UE to restore the combination of DMRS ports to be used from the received control information transmitted from the TRP in operation 2030, first of all—based on the code point obtained by combinatorial coding in accordance with Equation 7.

The basic advantage of the considered embodiment 3 refers to much greater flexibility even in comparison with embodiment 2, since embodiment 3 enables to indicate a substantially arbitrary combination of DMRS ports. The drawback of said embodiment is noticeably greater DCI bit overhead.

Hereinafter the description is given of a possible application of the above embodiments 1 to 3 to the case when, in a TRP, the number of MIMO layers is reduced and respective adaptation of the DMRS pattern, the embodiments of which have been described in subsection I of the specification with reference to FIGS. 10, 11, 12A to 12D, 13A, 13B, and 14, is performed.

It should be noted herein that, in embodiments 1 to 3 where DMRS port indices are coded for being signaled in the DCI, existence of a table is assumed which characterizes DMRS ports, similar to the one illustrated in FIG. 4A. For instance, when the DMRS pattern according to the application, as illustrated in FIG. 7, is used in the TRP, then such common table will index 64 DMRS ports to each of which its own unique set of a CDM group, a DFT FD-OCC of length 4, and a DFT TD-OCC of length 4 will correspond.

In the considered context of adaptation of the DMRS pattern, before the method according to any of embodiments 1 to 3, as disclosed above in the subsection of the specification, is performed, respective 'pruning' of said general table should be performed so that the encoding according to those embodiments is performed with respect to acting DMRS ports.

Figure 22A:
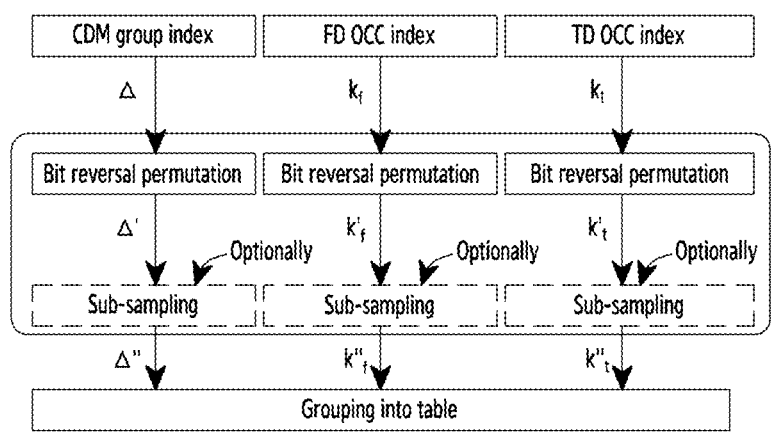
FIG. 22A is an illustration of a general approach to preprocessing a DMRS port table for a case of excluding part of DMRS ports according to an embodiment of the disclosure.

FIG. 22A illustrates a general approach of preprocessing a DMRS port table for a case of exclusion of part of DMRS ports from usage in view of the abovementioned DMRS pattern adaptation according to an embodiment of the disclosure.

Referring to FIG. 22A, at first, bit reversal permutation is performed with respect to each of the combination of CDM group indices Δ, the combination of FD-OCC indices, and the combination of TD-OCC indices $\{k_t\}$ corresponding to the basic, non-adapted DMRS pattern used in the TRP. For instance, for the DMRS pattern according to the application, as illustrated in FIG. 7, Δ={0, 1, 2, 3}, $k_f$={0, 1, 2, 3}, $k_t$={0, 1, 2, 3} (respectively, N=64 in FIG. 22A). Briefly speaking, as a result of the bit reversal permutation, every index in each of said combinations is represented in a digital form. Thereafter, inversion of the order of bits is performed with respect to this binary representation (i.e., the first bit becomes the last one, the second bit becomes the penultimate one, or the like). Thereafter the reversal bit representation is converted back into a numerical representation. As a result, the respective converted combinations of indices are obtained which are denoted in FIG. 22A as {Δ'}, $\{k_f'\}$, $\{k_t'\}$, respectively.

The respective exclusion is performed specifically with respect to one or more of said converted combinations of indices. The exclusion with respect to each of {Δ'}, $\{k_f'\}$, $\{k_t'\}$ is denoted in FIG. 22A as optional, thereby implying that it is not mandatory for all of said combinations to be subjected to sub-sampling—as follows from the respective disclosure according to subsection I of the specification, the sub-sampling can be performed with respect to a particular one of these combinations, or with respect to two of them, or with respect to all of them. As a result of such sub-sampling, the respective pruned combinations of indices are obtained which are denoted in FIG. 22A as {Δ" }, {$k_f$" }, {$k_t$" }, respectively.

Finally, the adapted, reduced table, where DMRS port indices are listed according to the pruned combinations of indices {Δ" }, {$k_f$" }, {$k_t$" }, is built from the general DMRS port table.

Figure 22B:
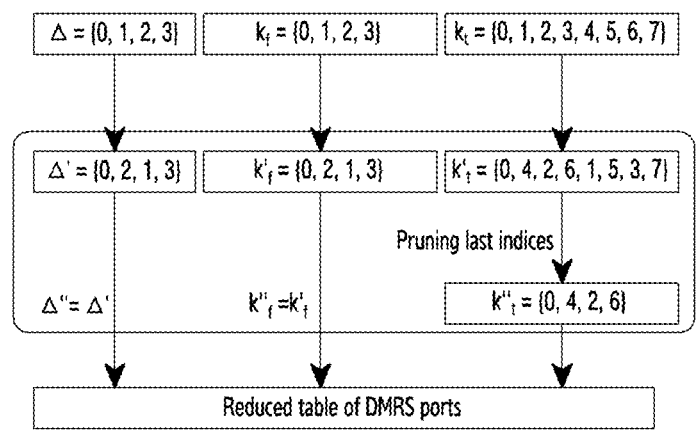
FIG. 22B illustrates implementation of a general approach of FIG. 22A according to an embodiment of the disclosure.

FIG. 22B illustrates an implementation of a general approach disclosed above with reference to FIG. 22A according to an embodiment of the disclosure.

This example substantially corresponds to adapting the DMRS pattern illustrated in FIG. 8 according to the approach disclosed with reference to FIG. 12C in subsection I of the specification.

As seen from FIG. 22B, the pruning is performed only with respect to DFT TD-OCCs by dropping away the last four indices in the converted combination thereof, which corresponds to the left branch in FIG. 12C. As a result, the reduced DMRS port table is obtained where the entries for DMRS port indices with the excluded DFT TD-OCCs are lacking.

In should be noted herein that, from the mathematical point of view, the pruning based on bit reversal permutation, as described with reference to FIGS. 22A and 22B, is equivalent to the embodiment of adaptation according to the application disclosed in subsection I of the specification with reference to FIGS. 12A to 12D, 13A, 13B, and 14.

As reported above, in the considered case the methods according to embodiments 1 to 3 will be performed based on the reduced tables obtained according to the approach disclosed above with reference to FIGS. 22A and 22B. The illustration thereof may be the DMRS port group tree of FIG. 17 as corresponding to exclusion of 48 DMRS ports from their total number 64, and the tree-like hierarchy of DMRS port groups according to FIGS. 16A and 16B corresponds to this case. As seen from these figures, 7 bits are required for the code representation of a tree node according to FIGS. 16A and 16B, whereas 5 bits are required for the code representation of a tree node according to FIG. 17. For example, additional reduction of DCI bit overhead can be provided due to applying the approach according to FIGS. 22A and 22B.

It should be emphasized that, though the DMRS patterns disclosed with reference to FIGS. 7 and 8 have been used as examples in the embodiments discussed in the present subsection of the specification, it should be emphasized that the approach to indicating DMRS ports for UEs, as provided herein, equally applies to other advanced DMRS patterns which are planned to be used in next generation wireless communication systems.

III. Allocating Resources in the Time Domain

Figure 23:
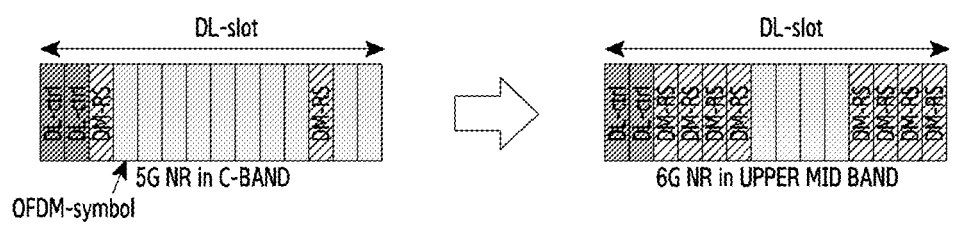
FIG. 23 is an illustration of an attempt to use a 5G NR approach to allocating time resource in a next generation wireless communication system according to an embodiment of the disclosure.

FIG. 23 is an illustration of an attempt to use a 5G NR approach to allocating time resource in a next generation wireless communication system according to an embodiment of the disclosure.

Figure 24A:
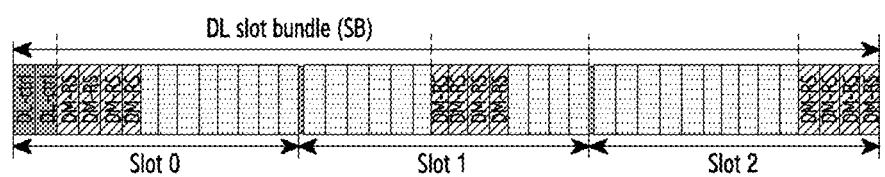
FIG. 24A is various embodiments of aggregating time domain resources for a DL part of a DL/UL period of a frame according to an embodiment of the disclosure.

FIG. 24A is embodiments of aggregating time domain resources for a DL part of a DL/UL period of a frame according to an embodiment of the disclosure.

Figure 24B:
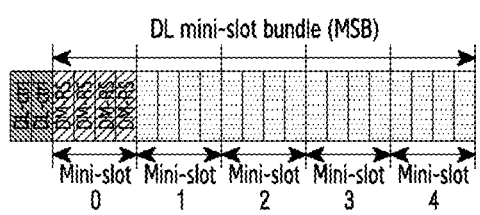
FIG. 24B is various embodiments of aggregating time domain resources for a DL part of a DL/UL period of a frame according to an embodiment of the disclosure.

FIG. 24B is embodiments of aggregating time domain resources for a DL part of a DL/UL period of a frame according to an embodiment of the disclosure.

Referring to FIGS. 23, 24A, 24B, in view of the aforesaid when describing the background art, increased capacity of the new DMRS pattern for next generation (including 6G) wireless communication systems causes such a pattern to occupy a greater number of OFDM-symbols in the time domain. If allocation of time domain resources according to 5G NR is used in this case, for example, according to Type A described with reference to FIGS. 5A and 5B, then the presence of the more capacious DMRS pattern along with the control channel in every slot will lead to undesired growth of overhead. This aspect is pictorially illustrated in FIG. 23, where the DMRS pattern described with reference to FIG. 7 is implied, as an example, as said new DMRS pattern, and, as seen from the right part of FIG. 23, only 4 OFDM-symbols remain in the slot for 6G PDSCH transmission.

It should be reminded herein that, in 5G NR Type A, allocation of at least one OFDM-symbol for a DMRS signal(s) in every slot is typically required. Therefore, the DMRS signal will be transmitted to a UE with every slot, even if no changes in distribution of DMRS ports have taken place. Moreover, at least one symbol is occupied by the control channel in every slot.

Therefore, improved techniques of allocating time domain resources for broadband data transmission, which would enable to avoid the abovementioned negative effects, are required in the considered context.

In accordance with the disclosure, the aggregated approach to allocating resources in the time domain is provided, both on the slot level and the mini-slot level, which is described below with reference to FIGS. 24A, 24B, 25A, 25B, 26A, 26B, 27, 28A, and 28B.

As in the case of 5G NR, from the macro view, a frame of length 10 ms is divided in a plurality of the same DL/UL-periods, wherein length of a DL/UL-period is configurable in a base station. The base station can signal the set DL/UL-period length to UEs served thereby by using the abovementioned DCI (L1) signaling, MAC (L2) signaling, RRC (L3) signaling, or even some combination thereof. Every DL/UL-period is split into slots, where every slot can consist of 14 or 12 (if the extended cyclic prefix is used in the slot) OFDM-symbols. Each DL/UL-period comprises $N_{symb}^{UL\text{-}DL}$ OFDM-symbols in total.

Typically, a part of slots of a DL/UL-period is allocated for downlink (DL) transmission (a DL-part), while another part of slots of the DL/UL-period is allocated for uplink (UL) transmission (a UL-part). The DL-part and the UL-part are separated from each other by a guard interval (GI) to provide time for switching between the DL transmission and the UL transmission. Part of a slot of the DL-part or of the UL-part is usually allotted for the guard interval. It should be noticed that distribution of slots between the DL- and UL-parts is configurable in the base station—for instance, all $N_{symb}^{UL\text{-}DL}$ OFDM-symbols of the DL/UL-period can be allocated only for the DL-part.

Flexible aggregation of slots is provided according to the disclosure, so that a larger unit is utilized for allocating/scheduling resources in the time domain than a single slot (Type A in 5G NG) or a single mini-slot (Type B in 5G NG). For example, it is assumed that allocation of resources in the time domain for transmitting data can be performed in such aggregated units.

Various embodiments of the aggregation for the DL-part of a DL/UL-period of a frame will be described first with reference to FIGS. 24A and 24B.

FIG. 24A illustrates, along a time axis, OFDM-symbols which constitute three slots of a DL-part of a DL/UL-period. These slots are aggregated into a single bundle of slots which forms the new unit of scheduling/allocating time domain resources. Unlike the respective 5G NR Type A (see FIG. 5A), adjacent OFDM-symbols allocated for transmission of the downlink control channel (DL-ctrl) are allocated per entire slot bundle rather than per every slot, as in the case of 5G NR Type A.

Adjacent OFDM-symbols are also allocated for transmission of a DMRS pattern. Such adjacent symbols will be referred to hereinafter as a DMRS-subbundle. DMRS signals for a required number of MIMO layers of the PDSCH to be transmitted are multiplexed in the DMRS pattern. Every occasion of a DMRS-subbundle in the DL/UL-period is indexed by index ī=0, 1, 2, . . . .

It should be emphasized that the allocation of DMRS-subbundles, as shown FIG. 24A, is illustrative, and other allocations thereof can be used. Then, DMRS patterns of smaller and greater capacity have been considered above which respectively greater and smaller density in the time domain and/or frequency domain than the pattern of FIG. 7 supposed herein as an illustration, i.e., the DMRS-subbundle size of 4 OFDM-symbols, as shown in FIG. 24A, does not impose any limitations either. The aspects of allotting DMRS-subbundles will be discussed below.

The remaining OFDM-symbols in the slot bundle can be allocated for transmission of the PDSCH. Though FIG. 24A shows allocation of all the remaining symbols, it should be appreciated that a greater or smaller number thereof can be allocated for the PDSCH transmission. Then, every slot in FIG. 24A is shown comprising 14 OFDM-symbols. At the same time, as recited above, a slot can comprise 12 OFDM-symbols. The indicated specific aspects do not impose any limitations to the disclosure herein.

FIG. 24B illustrates, along the same time axis, OFDM-symbols which constitute four mini-slots of the DL-part of the DL/UL-period, each mini-slot comprising 4 OFDM-symbols. These mini-slots are aggregated into a single bundle of mini-slots which also forms a new unit of scheduling/allocating time domain resources. Unlike the respective 5G NR Type B (see FIG. 5C), adjacent OFDM-symbols of the downlink control channel (DL-ctrl), like in the case of FIG. 24A, are allotted per entire mini-slot bundle rather than per every mini-slot, as in the case of 5G NR Type B. The attention should be drawn to the fact that in the considered example adjacent OFDM-symbols allocated for transmission of the DL-ctrl precede the mini-slot bundle, being not included thereby. This does not impose any limitation, and the mini-slot bundle can be arranged including the DL-ctrl OFDM-symbols.

Similarly to the discussion according to FIG. 24A, a DMRS-subbundle can be also allotted in the mini-slot bundle for transmission of a DMRS pattern. In this case, solely for the sake of illustration, the DMRS-subbundle is shown occupying the entire mini-slot within the mini-slot bundle that follows after the DL-ctrl symbols.

The other OFDM-symbols in the mini-slot bundle can be allocated for transmission of the PDSCH. Though FIG. 24B shows allocation of all the other symbols, it should be appreciated that a grater or smaller number thereof can be allocated for the PDSCH transmission.

Then, every mini-slot in FIG. 24B is shown comprising 4 OFDM-symbols. At the same time, as outlined above, a mini-slot can be also comprised of 1 or 2 or 7 OFDM-symbols, and the DMRS-subbundle itself can have a different size, as recited with respect to FIG. 24A, and may not be aligned with boundaries of a mini-slot. The indicated specific aspects do not impose any limitations onto the disclosure.

The mini-slot length is in general set in a TRP and signaled from the TRP to UEs through a control message. For example, an RRC message or a DCI message can be used to indicate the mini-slot length. A combination of RRC and DCI messages can be also used, when the RRC message specifies a subset of mini-slot length values: for example, the subset {2, 7} is specified from the entire set {2, 4, 7, 14}, while the DCI message indicates one specific value from said subset (for instance, 1 bit in the DCI selects either 2 or 7) which relates to the current PDSCH signal transmission.

Figure 25A:
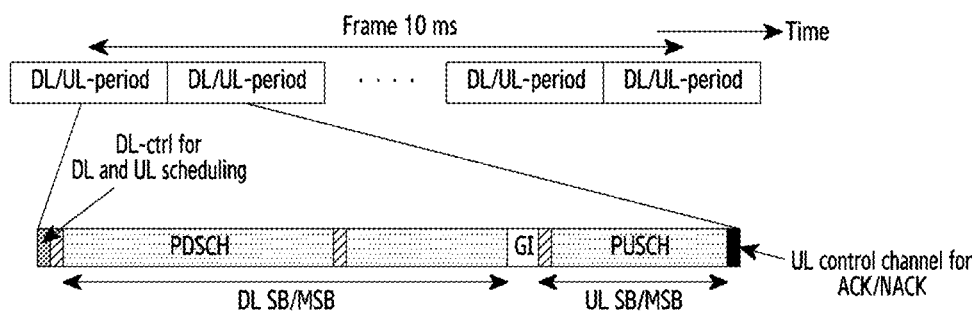
FIG. 25A is a high-level representation of resource aggregation according to an embodiment of the disclosure.
Figure 25B:
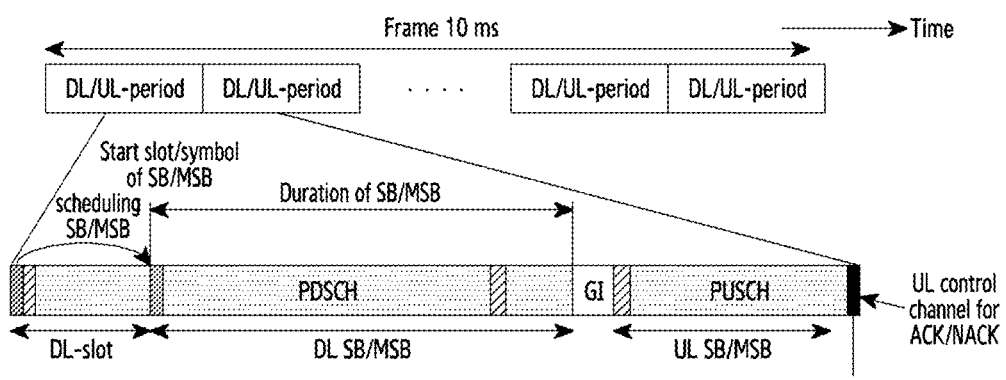
FIG. 25B is a high-level representation of resource aggregation according to an embodiment of the disclosure.

FIGS. 25A and 25B illustrates a macro view of an aggregation provided in an application according to various embodiments of the disclosure.

Referring to FIG. 25A, it shows the case when a bundle of slots or mini-slots occupies the entire DL-part, and FIG. 25B illustrates the case when a bundle of slots or mini-slots is preceded by a slot. It should be emphasized for the embodiment of FIG. 25B that the abovementioned OFDM-symbols for the DL-ctrl are included by the preceding slot, at the same time, said DL-ctrl contains control information for scheduling the bundle of slots/mini-slots. In other words, the presence of the DL-ctrl OFDM-symbols in the slot bundle, as depicted in FIG. 24A, is not mandatory according to the application. The embodiment of FIG. 25B can be considered as corresponding to the combination of the known approach (5G NR Type A) and the approach provided in the application. It should be appreciated that the bundle of slots/mini-slots can be preceded by more than one slot. Moreover, an embodiment is possible when the bundle of slots/mini-slots will precede one or more slots.

It should be explained that, in accordance with the approach of the disclosure, the DL-ctrl can reside, in general, in any place of the DL/UL-period according to the configuration of decoding the control channel. The principal requirement is that, for a specific UE, transmission of the DL-ctrl takes place prior to the beginning of the bundle of slots/mini-slots, so that the UE is able to receive the control channel and decode the DCI which will contain information about scheduling of the PDSCH (including information about the beginning of transmission of the bundle of slots/mini-slots and duration of said bundle).

Reduced overhead is clearly seen from the illustrations according to FIGS. 25A and 25B—in particular, reservation of an OFDM-symbol(s) for the DL-ctrl for every slot/mini-slot is avoided. Furthermore, the possibility of using less frequent DMRS occasions within the DL/UL-period, without reduction of the channel estimation quality, is provided.

Figure 26A:
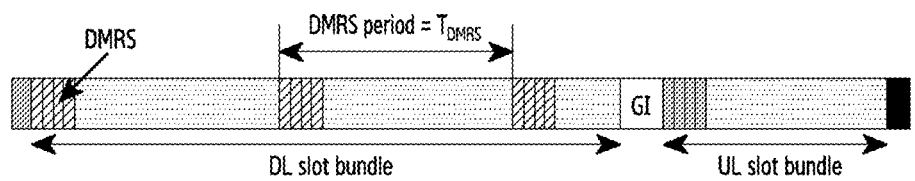
FIG. 26A is illustrations of periodic allocation of DMRS sub-bundles when allotting time domain resources according to an embodiment of the disclosure.

In accordance with a preferable embodiment of the disclosure, DMRS-subbundles are allocated within the DL-part with a preset period $T_{DMRS}$. FIG. 26A shows periodic consecution of DMRS-subbundles allocated for transmission of the DMRS pattern with the same density within the bundle of slots/mini-slots. The illustration of FIG. 24A refers to this case.

FIG. 26A is illustrations of periodic allocation of DMRS sub-bundles when allotting time domain resources according to an embodiment of the disclosure.

Figure 26B:
FIG. 26B is illustrations of periodic allocation of DMRS sub-bundles when allotting time domain resources according to an embodiment of the disclosure.

FIG. 26B is illustrations of periodic allocation of DMRS sub-bundles when allotting time domain resources according to an embodiment of the disclosure.

It should be emphasized that the periodic configuration of DMRS-subbundles should not be mandatorily within boundaries of the bundle of slots/mini-slots, as shown in FIGS. 24A and 26A—for instance, in the embodiment of FIG. 25B this DMRS periodicity may not be anchored to the boundaries of the bundle of slots/mini-slots. In other words, this does not impose a limitation on the disclosure disclosed herein.

Referring to FIG. 26B, it illustrates another preferable embodiment thereof, where DMRS-subbundles are allocated within the DL-part also with a preset period $T_{DMRS}$, but in this case the amount of resources allocated for transmission of the DMRS pattern in the first DMRS-subbundle is greater than the amount of resources allocated for transmission of the DMRS pattern in each of the subsequent DMRS-subbundles. In particular, as seen from FIG. 26B, the number of OFDM-symbols of the subsequent DMRS-subbundle is less than the number of OFDM-symbols of the first DMRS-subbundle, unlike FIG. 26A, and in the embodiment according to FIG. 26B the first DMRS-subbundle can be referred to as high density (HD) DMRS-subbundle, while every subsequent subbundle can be referred to as low density (LD) DMRS-subbundle. In this case, additional reduction of overhead obviously takes place.

For example, the DMRS pattern corresponding to the one illustrated in FIG. 10 or 2A can be transmitted with repetition in the HD DMRS-subbundle, thereby occupying 4 OFDM-symbols in the time domain, and without repetition in every subsequent LD DMRS-subbundle, thereby each occupying 2 OFDM-symbols. This example can be considered to be nominally corresponding to the illustration of FIG. 26B.

The situation illustrated by FIG. 26B can take place in the following case. When establishing a connection between a TRP and a UE, more reliable channel estimation can be required at the UE side, and to this end greater DMRS density can be required in the time and frequency domain, as a consequence, an HD DMRS-subbundle will be allocated. Thereafter, after the connection has been established, channel estimation will be performed in the UE substantially on the level of adjustment, based on the available data/measurements acquired earlier. In such a case, LD DMRS-subbundles will be used for the DMRS transmission.

It should be emphasized that the considered periodic approach to DMRS allocation is preferable but not limiting, and DMRS-subbundles can be allocated in a non-periodic way, which follows, in particular, from the illustration of FIGS. 25A and 25B.

As noted above, scheduling of time domain resources to transmit data is performed by a scheduler of a base station (TRP), and UEs are informed about the resources reserved by the scheduler via the downlink control channel transmitted from the TRP. In accordance with the disclosure, a bundle of slots or mini-slots can be used as a unit of scheduling/allocating time domain resources for transmission, unlike a single slot or mini-slot according to 5G NR. The aggregation configuration according to the application is set by the base station (TRP), and information about said configuration is signaled to UEs in the downlink control channel (DL-ctrl). According to the preferred embodiment, said information is at least partially transmitted in the DCI message carried in the PDCCH. The DCI signals, in particular, an indication of the beginning of the bundle of slots/mini-slots in the DL/UL-period, the slot/mini-slot bundle length, an indication of the number of slots/mini-slots allocated within the bundle of slots/mini-slots for the PDSCH, the DMRS period which in general can be different for the DL-part and the UL-part. It should be noted that the DCI can further signal other control information which have been mentioned in this and preceding sections of the specification.

The start OFDM-symbol ($l_{start}^{PDSCH}$) of the bundle of slots/mini-slots within the DL/UL-period can be indicated in the DCI as the beginning of said bundle, for the slot bundle, its start slot can be indicated as said beginning.

The length of the bundle of slots/mini-slots is set in the TRP as a function of a scheduler decision which may depend on a size of data transmitted to a user, the necessity to transmit data to another user, a transmitted traffic type, a channel state (modulation, coding rate, a number of MIMO layers), transmission of other scheduled signals, or the like.

The period $T_{DMRS}$ of the bundle of slots/mini-slots can be set in the TRP depending on a speed at which a transmission channel changes with time. For instance, fast change of the channel can take place owing to, in particular, travelling of the UE, and, owing to said change, a decision can be taken in the TRP to adjust $T_{DMRS}$ downwards so that DMRS signals are sent more frequently for the respective tuning.

Then, channel coding is typically performed with respect to data to be transmitted in the PDSCH. Channel coding is block coding, and encoded data is represented as a result as code blocks of certain length. LDPC coding can be a possible embodiment of channel coding. The code blocks are then respectively mapped to time-frequency resources for transmission in the PDSCH. Each code block is mapped to time-frequency resources as a whole.

Moreover, if the existing procedure of determining the number of code blocks for data transmission, as disclosed in TS 38.212 5G NR, is directly applied when mapping code blocks to time-frequency resources, then said procedure should be applied to the entire bundle of slots/mini-slots according to the disclosure (for example, the entire DL-part of the DL/UL-period), and, as a consequence, alignment of temporal boundaries of an integer number of code blocks will be ensured only by the end of such a bundle of slots/mini-slots. For example, if the existing approach is directly used, then alignment of temporal boundaries of an integer number of code blocks with a slot or mini-slot boundary will not be ensured, in general. As a consequence, processing of received data cannot start at the receiver side until the entire aggregated bundle of slots/mini-slots is received. In other words, a downtime occurs at the receiver side, said downtime being associated with the necessity of buffering the received code blocks while waiting for the end of reception of the aggregated bundle, so that the processing of said code blocks could begin.

Figure 27:
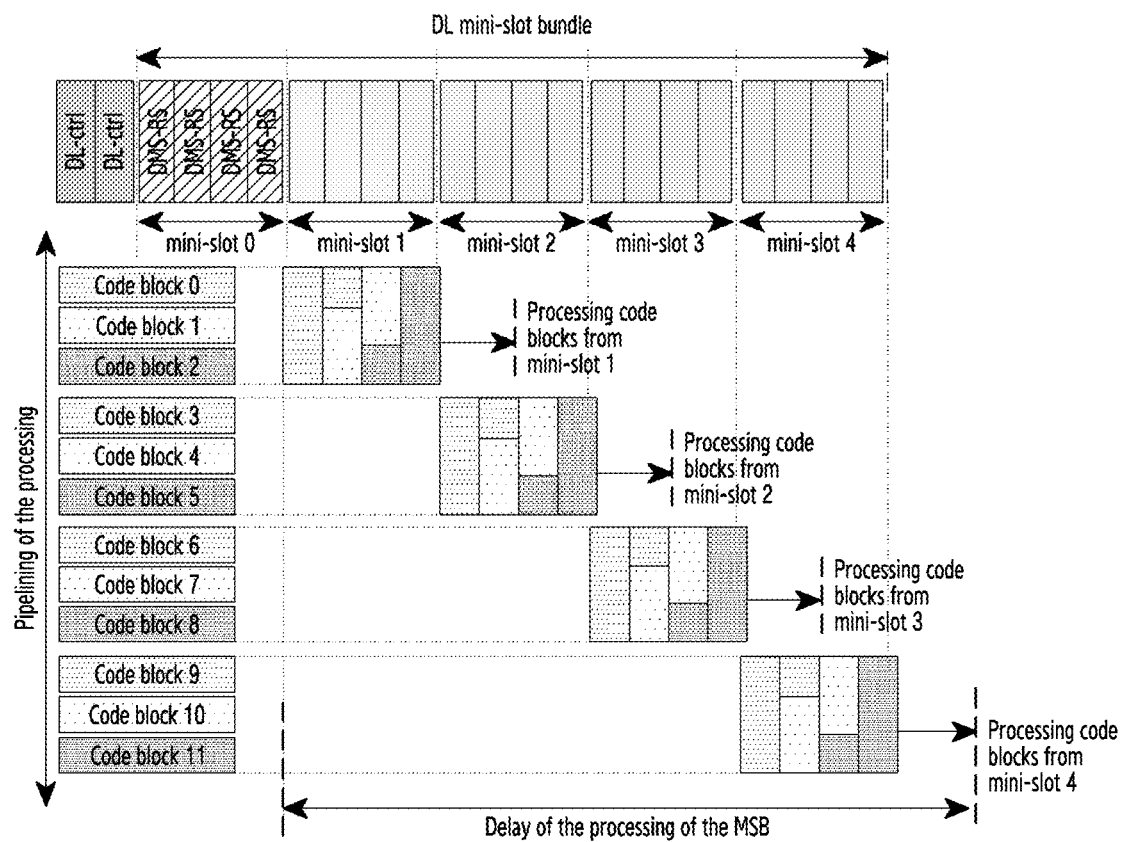
FIG. 27 is an illustration of aggregating time domain resources to provide pipelining of processing of code blocks at a receiver side according to an embodiment of the disclosure.

The approach of flexible aggregation of time domain resources, as provided in the application, enables to address this issue and improve efficiency of pipelining of the code block processing at the receiver side, which is illustrated in FIG. 27.

FIG. 27 is an illustration of aggregating time domain resources to provide pipelining of processing of code blocks at a receiver side according to an embodiment of the disclosure.

In accordance with a preferable embodiment, the number and length of code blocks are selected according to a mini-slot length in such a way that, when allocating time-frequency resources for every combination of said number of code blocks, boundaries of this combination in the time domain are aligned specifically with mini-slot boundaries in a mini-slot bundle. More particularly, the number and length of code blocks are selected according to the number of available Res in a mini-slot, modulation being used, and channel coding rate. Moreover, in the considered embodiment, usage of said existing procedure of determining the number of code blocks, as described in TS 38.212 5G NR, is substantially performed specifically with respect to each group of OFDM-symbols which form a mini-slot, individually.

Referring to FIG. 27, it shows alignment of sets of three code blocks with boundaries of mini-slots in a mini-slot bundle. As a consequence, data processing in the receiver can start almost immediately upon reception of the first mini-slot comprising three (i.e., integer number) of code blocks. Then, upon reception of the second mini-slot, the processing of the next three code blocks will be performed, or the like. It should be obvious that, in the considered embodiment, downtimes associated with the processing of the received data, are significantly reduced. Attention should be also drawn to high flexibility of the considered embodiment, since, besides the length and number of code blocks, the mini-slot duration is itself flexibly configurable.

It should be emphasized that, though the embodiment described above is preferable for the mini-slot-level aggregation, it is nevertheless equally applicable to slot-level aggregation. In view of the aforesaid, it should be obvious for the slot-level implementation that a greater delay will take place than in the illustrated case of mini-slots.

The techniques of aggregating time domain resources according to the application, as described with reference to FIGS. 24A, 24B, 25A, 25B, 26A, 26B, and 27 with respect to the DL-part of the DL/UL-period of the frame, apply to its UL-part as well. In this case the specificity is in that the TRP scheduler decision is single with respect to both the DL-part and the UL-part, and information regarding allocation of time domain resources for the UL-part is also signaled in the downlink control channel (DL-ctrl), as discussed above. For instance, the beginning and duration of transmission of an UL bundle of slots/mini-slots is selected in the TRP and signaled to the UE by the control information in the downlink control channel. More particularly, said selection is performed by the TRP scheduler, and said signaling is performed through the DCI in the PDCCH.

Therefore, an uplink control channel, which is the PUCCH in the considered case, will in general have different functionality as compared to the downlink control channel. In particular, in the UL-part, there is no mandatory requirement for the control channel to precede the DMRS and PUSCH. Furthermore, the uplink control channel may be absent at all in the UL-part.

For instance, in FIGS. 25A and 25B, exclusively for the sake of illustration, the control channel is shown as located in the tail of the bundle of slots/mini-slots and containing acknowledgement (ACK/NACK) information. Nevertheless, in the UL-part, OFDM-symbols allocated for the uplink control channel may precede OFDM-symbols allocated for the DMRS and PUSCH. It should be emphasized that, in general, the bundle of slots/mini-slots according to the disclosure may be substantially in any place of the UL-part.

Since the PUCCH is not directly associated with resource scheduling, then options are possible when transmission of the PUCCH will not relate anyhow to a bundle(s) of slots/mini-slots (neither to slots or mini-slots at all)—for example, said channel can be used to transmit a Scheduling Request or Channel State Information (CSI),—or when transmission of the PUCCH will relate to preceding slots, mini-slots, or a bundle(s) of slots/mini-slots.

Figure 28A:
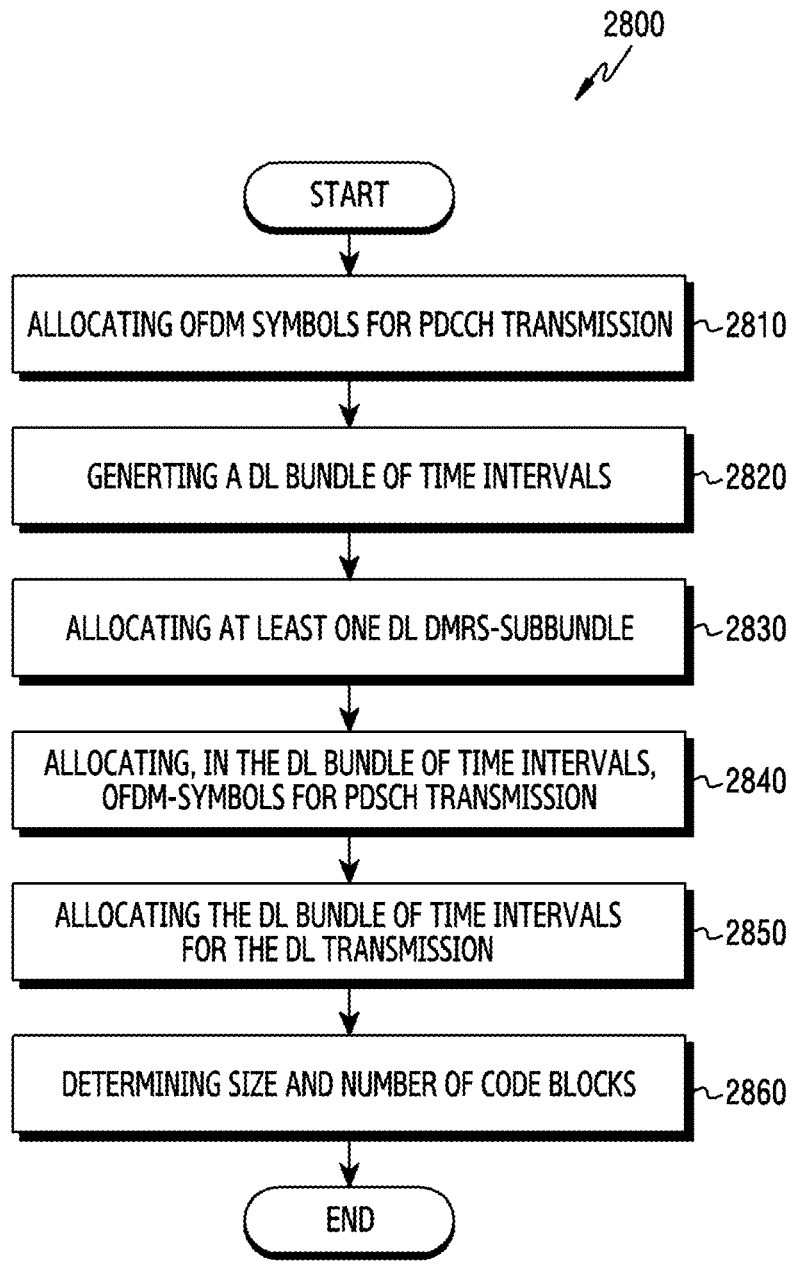
FIG. 28A is a flowchart of a method of allocating resources in a time domain according to an embodiment of the disclosure.
Figure 28B:
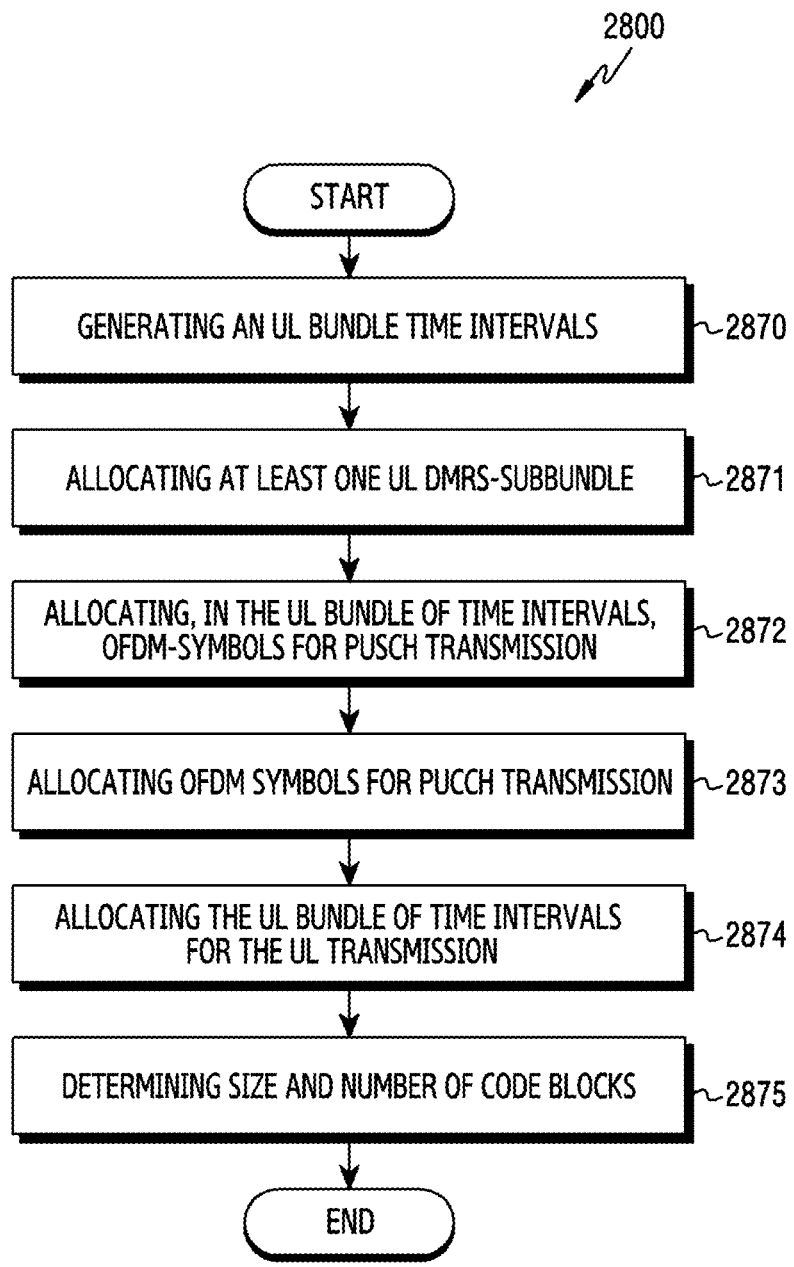
FIG. 28B is a flowchart of a method of allocating resources in a time domain according to an embodiment of the disclosure.

FIGS. 28A and 28B are flowcharts of a method 2800 of allocating resources in a time domain according to various embodiments of the disclosure.

Referring to FIGS. 28A and 28B, as an illustration, the method 2800 is performed in a base station (for example, the TRP 602 in FIG. 6) which supports simultaneous transmission of a plurality of spatial MIMO layers of the PDSCH.

Operations 2810-2860 of the method 2800, which are performed with respect to a DL-part of an DL/UL-period of a frame, are considered with reference to FIG. 28A.

In operation 2810, a preset number of adjacent OFDM-symbols are allocated for transmission of a downlink control channel which is preferably the PDCCH.

In operation 2820, a DL bundle of time intervals is generated, the bundle comprising an integer number of adjacent time intervals, wherein each time interval includes a preset number of OFDM-symbols. Moreover, the PDCCH, which is to be transmitted in the OFDM-symbols of the DL-part that have been allocated thereto, relates to the entire bundle of time intervals. In accordance with the above disclosure, the time interval can be a slot which can comprise 12 or 14 OFDM-symbols, or a mini-slot which can comprise 1, 2, 4, or 7 OFDM-symbols.

In operation 2830, at least one DL DMRS-subbundle is allocated to transmit DMRS signals for a required number of MIMO layers of the PDSCH.

In operation 2840, OFDM-symbols for transmission of the PDSCH are allocated in the DL bundle of time intervals.

The possible embodiments of mutual arrangement of OFDM-symbols for the PDCCH, the DL DMRS-subbundle(s), and the bundle of slots/mini-slots in the DL-part are described above, in particular, with reference to FIGS. 24A, 24B, 25A, 25B, 26A, and 26B.

In operation 2850, the DL bundle of time intervals is allocated for the scheduled DL transmission.

As reported above multiple times, the control information should be transmitted in the PDCCH, more specifically—in the DCI message. Besides the control data which have been outlined above, in the considered case the control information can include an indication of the beginning of the DL bundle of time intervals and a duration of the DL bundle of time intervals. If, according to the preferred embodiment (see FIGS. 26A and 26B), the DMRS-subbundles are arranged with a period $T_{DMRS}$, then $T_{DMRS}$ is also included into the control information.

In operation 2860, for data to be transmitted in the OFDM-symbols allocated for the PDSCH in the DL bundle of time intervals, a size and a number of code blocks are determined to perform channel coding (preferably, LDPC), and code blocks representing the encoded data are obtained. The number and the length of the code blocks are selected in such a way that, when allocating time-frequency resources for every combination of said number of code blocks, boundaries of said combination in the time domain are aligned with boundaries of a time interval in the bundle of time intervals (see FIG. 27).

Operations 2870-2875 of the method 2800, which are performed with respect to an UL-part of the DL/UL-period of the frame, are considered with reference to FIG. 28B.

In operation 2870, an UL bundle of time intervals which comprises an integer number of time intervals is generated.

In operation 2871, at least one UL DMRS-subbundle is allocated to transmit a DMRS pattern wherein DMRS signals for a required number of MIMO layers of the PUSCH are multiplexed.

In operation 2872, OFDM-symbols for transmission of the PUSCH are allocated.

In operation 2873, a preset number of adjacent OFDM-symbols are allocated for transmission of the PUCCH.

The possible embodiments of mutual arrangement of OFDM-symbols for the PUCCH, the UL DMRS-sub-bundle(s), and the bundle of slots/mini-slots in the UL-part are described above.

In operation 2874, the UL bundle of time intervals is allocated for the UL transmission.

In operation 2875, similarly to operation 2860, channel coding, along with respectively selecting a number and a length of code blocks, is performed with respect to data to be transmitted in the OFDM-symbols allocated for the PUSCH in the UL bundle of time intervals.

It should be emphasized that, though in the embodiments considered in the subsection of the specification the DMRS pattern disclosed with reference to FIG. 7 and other DMRS patterns provided in the application have been used for example, it should be appreciated that the approach to time resource allocation, as proposed herein, equally applies to other advanced DMRS patterns which are planned for being used in next generation wireless communication systems.

Figure 29:
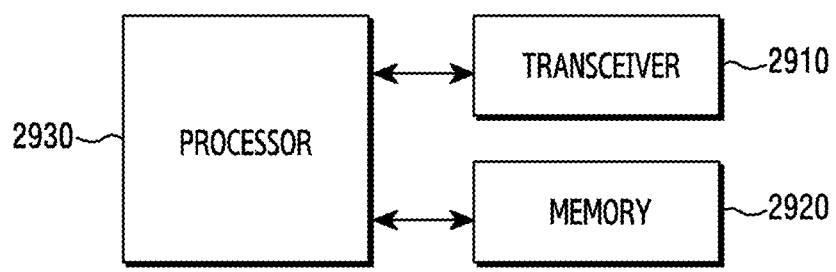
FIG. 29 is a block diagram illustrating a structure of a user equipment according to an embodiment of the disclosure.

FIG. 29 is a block diagram illustrating a structure of a UE according to an embodiment of the disclosure.

Referring to FIG. 29, the UE according to an embodiment may include a transceiver 2910, a memory 2920, and a processor 2930. The transceiver 2910, the memory 2920, and the processor 2930 of the UE may operate according to a communication method of the UE described above. However, the components of the UE are not limited thereto. For example, the UE may include more or fewer components than those described above. In addition, the processor 2930, the transceiver 2910, and the memory 2920 may be implemented as a single chip. In addition, the processor 2930 may include at least one processor. Furthermore, the UE of FIG. 29 corresponds to the UE of FIG. 3 or 6.

The transceiver 2910 collectively refers to a UE receiver and a UE transmitter, and may transmit/receive a signal to/from a base station or a network entity. The signal transmitted or received to or from the base station or a network entity may include control information and data. The transceiver 2910 may include a RF transmitter for up-converting and amplifying a frequency of a transmitted signal, and a RF receiver for amplifying low-noise and down-converting a frequency of a received signal. However, this is only an example of the transceiver 2910 and components of the transceiver 2910 are not limited to the RF transmitter and the RF receiver.

In addition, the transceiver 2910 may receive and output, to the processor 2930, a signal through a wireless channel, and transmit a signal output from the processor 2930 through the wireless channel.

The memory 2920 may store a program and data required for operations of the UE. In addition, the memory 2920 may store control information or data included in a signal obtained by the UE. The memory 2920 may be a storage medium, such as a read-only memory (ROM), a random access memory (RAM), a hard disk, a compact disc (CD)-ROM, and a digital versatile disc (DVD), or a combination of storage media.

The processor 2930 may control a series of processes such that the UE operates as described above. For example, the transceiver 2910 may receive a data signal including a control signal transmitted by the base station or the network entity, and the processor 2930 may determine a result of receiving the control signal and the data signal transmitted by the base station or the network entity.

Figure 30:
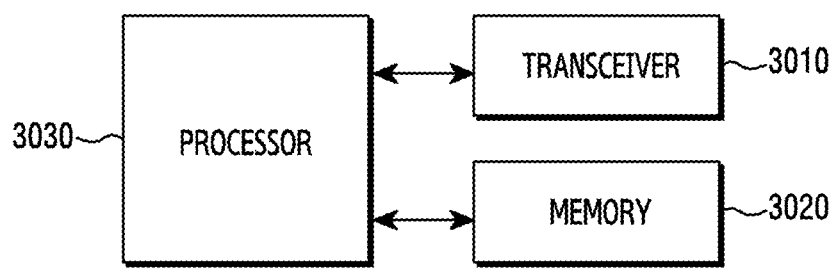
FIG. 30 is a block diagram illustrating a structure of a base station according to an embodiment of the disclosure.

FIG. 30 is a block diagram illustrating a structure of a base station according to an embodiment of the disclosure.

Referring to FIG. 30, the base station according to an embodiment may include a transceiver 3010, a memory 3020, and a processor 3030. The transceiver 3010, the memory 3020, and the processor 3030 of the base station may operate according to a communication method of the base station described above. However, the components of the base station are not limited thereto. For example, the base station may include more or fewer components than those described above. In addition, the processor 3030, the transceiver 3010, and the memory 3020 may be implemented as a single chip. In addition, the processor 3030 may include at least one processor.

The transceiver 3010 collectively refers to a base station receiver and a base station transmitter, and may transmit/receive a signal to/from a terminal (UE) or a network entity. The signal transmitted or received to or from the terminal or a network entity may include control information and data. The transceiver 3010 may include a RF transmitter for up-converting and amplifying a frequency of a transmitted signal, and a RF receiver for amplifying low-noise and down-converting a frequency of a received signal. However, this is only an example of the transceiver 3010 and components of the transceiver 3010 are not limited to the RF transmitter and the RF receiver.

In addition, the transceiver 3010 may receive and output, to the processor 3030, a signal through a wireless channel, and transmit a signal output from the processor 3030 through the wireless channel.

The memory 3020 may store a program and data required for operations of the base station. In addition, the memory 3020 may store control information or data included in a signal obtained by the base station. The memory 3020 may be a storage medium, such as a ROM, a RAM, a hard disk, a CD-ROM, and a DVD, or a combination of storage media.

The processor 3030 may control a series of processes such that the base station operates as described above. For example, the transceiver 3010 may receive a data signal including a control signal transmitted by the terminal, and the processor 3030 may determine a result of receiving the control signal and the data signal transmitted by the terminal.

It should be also appreciated that the illustrated various embodiments merely refer to preferable, but not the only possible implementations of the disclosure. More particularly, the scope of the disclosure is defined by the claims presented below and equivalents thereof.

The methods according to the embodiments described in the claims or the detailed description of the disclosure may be implemented in hardware, software, or a combination of hardware and software.

When the electrical structures and methods are implemented in software, a computer-readable recording medium having one or more programs (software modules) recorded thereon may be provided. The one or more programs recorded on the computer-readable recording medium are configured to be executable by one or more processors in an electronic device. The one or more programs include instructions to execute the methods according to the embodiments described in the claims or the detailed description of the disclosure.

The programs (e.g., software modules or software) may be stored in RAM, a non-volatile memory including a flash memory, ROM, an electrically erasable programmable ROM (EEPROM), a magnetic disc storage device, CD-ROM, a DVD, another type of optical storage device, or a magnetic cassette. Alternatively, the programs may be stored in a memory system including a combination of some or all of the above-mentioned memory devices. In addition, each memory device may be included by a plural number.

The programs may also be stored in an attachable storage device which is accessible through a communication network, such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

At least some of the example embodiments described herein may be constructed, partially or wholly, using dedicated special-purpose hardware. Terms, such as 'component', 'module' or 'unit' used herein may include, but are not limited to, a hardware device, such as circuitry in the form of discrete or integrated components, a field programmable gate array (FPGA) or application specific integrated circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The disclosure is not restricted to the details of the foregoing embodiment(s). The disclosure extends to any novel one, or any novel combination, of the features disclosed in this specification (including any accompanying claims, abstract and drawings), or to any novel one, or any novel combination, of the steps of any method or process so disclosed.

For all of the examples/aspects/embodiments, or the like, described above/herein, it should be considered that the corresponding features/operations apply in any order or combination, and that furthermore there exists the possibility to omit one or more features/operations. In addition, references herein to the "network" may refer to at least one of the RAN, an access and mobility management function (AMF), a session management function (SMF), an unified data management (UDM), a network exposure function (NEF), a policy control function (PCF), the new defined entity (non-limitingly termed AI/machine learning (ML) network function (NF) 100), or any other entity in the 5G core (5GC) and is not limited to particular nodes/entities. Of course, it will also be appreciated that the network may be defined differently. Furthermore, network signaling to provide any of the above-described information may, as non-limiting examples, include RRC or non-access stratum (NAS) messages or system information. It will be appreciated that, optionally, network entities may first share necessary information amongst them/each other and then a recipient entity may share the information with the UE using the appropriate signaling.

Moreover, for all of the proposals above, the proposals apply to at least long term evolution (LTE), NR, NR non-terrestrial network (NTN) or Internet of things (IoT) NTN (note this list is merely to give some examples and should not be seen as limiting), including any related signaling/messages on any of the inferences X2, Xn, NG, S1, F1, or the like, (again, this list is merely to give some examples and should not be seen as limiting). It will be appreciated that, in each example/embodiment/aspect or the like, described above, one or more features or operations may be omitted, modified or moved (e.g., to change the order of the features or the operations), if desired and appropriate.

Additionally, regarding al of the above, one or more features or operations, or the like, from any example/embodiment may be combined with features or operations from any other example/embodiment. For example, the disclosure should be considered to include all combinations of examples/embodiments disclosed herein, as appropriate, as well as combinations of individual features within and between each example/embodiment, as appropriate.

The techniques described herein may be implemented using any suitably configured apparatus and/or system. Such an apparatus and/or system may be configured to perform a method according to any aspect, embodiment or example disclosed herein. Such an apparatus may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). The one or more elements may be implemented in the form of hardware, software, or any combination of hardware and software.

It will be appreciated that examples of the disclosure may be implemented in the form of hardware, software or any combination of hardware and software. Any such software may be stored in the form of a volatile or a non-volatile storage, for example, a storage device like a ROM, whether erasable or rewritable or not, or in the form of a memory, such as, for example, a RAM, memory chips, a device or integrated circuits or on an optically or magnetically readable medium, such as, for example, a CD, DVD, magnetic disk or magnetic tape, or the like.

It will be appreciated that the storage devices and storage media are embodiments of machine-readable storage that are suitable for storing a program or programs comprising instructions that, when executed, implement certain examples of the disclosure. Accordingly, certain examples provide a program comprising code for implementing a method, apparatus or system according to any example, embodiment and/or aspect disclosed herein, and/or a machine-readable storage storing such a program. Still further, such programs may be conveyed electronically via any medium, for example a communication signal carried over a wired or wireless connection.

While, the disclosure has been shown and described with reference to various embodiments thereof, it will be understood by those skilled in the art that various changes in form and detail may be made therein without departing from the spirit and scope of the disclosure as defined by the appended claims and their equivalents.

What is claimed is:

1. A method performed by a base station (BS) for supporting simultaneous transmission of a plurality of spatial multiple input multiple output (MIMO) layers for data transmission in a wireless communication system, wherein a different demodulation reference signal (DMRS) is associated with each of the plurality of spatial MIMO layers, the method comprising:
   in a downlink transmission part (DL part) of a downlink transmission—uplink transmission period (DL/UL-period) of a frame,
      allocating a preset number of adjacent orthogonal frequency division multiplexing (OFDM)-symbols for transmission of a downlink control channel,
      generating a DL bundle of time intervals, the DL bundle comprising an integer number of adjacent time intervals, wherein each time interval includes a preset number of OFDM-symbols, wherein the downlink control channel relates to the DL bundle of time intervals,
      allocating at least one DL subbundle of OFDM-symbols to transmit DMRS signals (DL DMRS-subbundle) for a required number of spatial MIMO layers of a physical downlink shared channel (PDSCH),
      allocating, within the DL bundle of time intervals, OFDM-symbols for transmission of the PDSCH; and
      allocating the DL bundle of time intervals for DL transmission,
   wherein the downlink control channel includes control information indicating a beginning of the DL bundle of time intervals and a duration of the DL bundle of time intervals.

2. The method of claim 1,
   wherein the time interval is a slot comprising 12 or 14 OFDM-symbols,
   wherein the OFDM-symbols allocated for the transmission of the downlink control channel are start OFDM-symbols of a first slot of a DL bundle of slots,
   wherein the DL bundle of slots includes the at least one DL DMRS-subbundle, and
   wherein a first DL DMRS-subbundle of the at least one DL DMRS-subbundle is adjacent to the OFDM-symbols allocated for the transmission of the downlink control channel.

3. The method of claim 1,
   wherein the at least one DL DMRS-subbundle is a plurality of DL DMRS-subbundles separated from each other by a DL period of a configurable number of OFDM-symbols,
   wherein the DL period is adjustable in the BS, and
   wherein the control information further includes the DL period.

4. The method of claim 3, wherein an amount of resources allocated to transmit DMRS signals in a first DL DMRS-subbundle of the plurality is greater than an amount of resources allocated to transmit DMRS signals in each of subsequent DL DMRS-subbundles of the plurality, in such a way that a number of OFDM-symbols of the subsequent DL DMRS-subbundle is less than a number of OFDM-symbols of the first DL DMRS-subbundle.

5. The method of claim 1,
   wherein the time interval is a mini-slot,
   wherein the mini-slot comprises 1, 2, 4, or 7 OFDM-symbols, and
   wherein boundaries of at least a first DL DMRS-subbundle of the at least one DL DMRS-subbundle in a time domain are aligned with boundaries of the mini-slot.

6. A base station (BS) for supporting simultaneous transmission of a plurality of spatial multiple input multiple output (MIMO) layers for data transmission in a wireless communication system, wherein a different demodulation reference signal (DMRS) is associated with each of the plurality of spatial MIMO layers, the BS comprising:
   a transceiver;
   a controller connected to the transceiver and configured to:
      in a downlink transmission part (DL part) of a downlink transmission—uplink transmission period (DL/UL-period) of a frame,
      allocate a preset number of adjacent orthogonal frequency division multiplexing (OFDM)-symbols for transmission of a downlink control channel,
      generate a DL bundle of time intervals, the DL bundle comprising an integer number of adjacent time intervals, wherein each time interval includes a preset number of OFDM-symbols, wherein the downlink control channel relates to the DL bundle of time intervals, allocate at least one DL subbundle of OFDM-symbols to transmit DMRS signals (DL DMRS-subbundle) for a required number of spatial MIMO layers of a physical downlink shared channel (PDSCH), and allocate, within the DL bundle of time intervals, OFDM-symbols for transmission of the PDSCH; and allocate the DL bundle of time intervals for DL transmission, wherein the downlink control channel carries control information including at least an indication of a beginning of the DL bundle of time intervals and a duration of the DL bundle of time intervals.

7. The BS of claim 6,
wherein the time interval is a slot comprising 12 or 14 OFDM-symbols,
wherein the OFDM-symbols allocated for the transmission of the downlink control channel are start OFDM-symbols of a first slot of a DL bundle of slots,
wherein the DL bundle of slots includes the at least one DL DMRS-subbundle, and
wherein a first DL DMRS-subbundle of the at least one DL DMRS-subbundle is adjacent to the OFDM-symbols allocated for the transmission of the downlink control channel.

8. The BS of claim 6,
wherein the at least one DL DMRS-subbundle is a plurality of DL DMRS-subbundles separated from each other by a DL period of a configurable number of OFDM-symbols,
wherein the DL period is adjustable in the BS, and
wherein the control information further includes the DL period.

9. The BS of claim 8, wherein an amount of resources allocated to transmit DMRS signals in a first DL DMRS-subbundle of the plurality is greater than an amount of resources allocated to transmit DMRS signals in each of subsequent DL DMRS-subbundles of the plurality, in such a way that a number of OFDM-symbols of the subsequent DL DMRS-subbundle is less than a number of OFDM-symbols of the first DL DMRS-subbundle.

10. The BS of claim 6,
wherein the time interval is a mini-slot,
wherein the mini-slot comprises 1, 2, 4, or 7 OFDM-symbols, and
wherein boundaries of at least a first DL DMRS-subbundle of the at least one DL DMRS-subbundle in a time domain are aligned with boundaries of the mini-slot.

11. A method performed by a user equipment (UE) for supporting simultaneous transmission of a plurality of spatial multiple input multiple output (MIMO) layers for data transmission in a wireless communication system, wherein a different demodulation reference signal (DMRS) is associated with each of the plurality of spatial MIMO layers, the method comprising:
receiving, from a base station (BS), downlink control channel including control information indicating a beginning of a downlink (DL) bundle of time intervals and a duration of the DL bundle of time intervals, wherein the DL bundle comprises an integer number of adjacent time intervals, wherein each time interval includes a preset number of orthogonal frequency division multiplexing (OFDM)-symbols; and receiving, the spatial MIMO layers of physical downlink shared channel (PDSCH) based on the control information, wherein a preset number of adjacent OFDM-symbols for transmission of the downlink control channel and at least one DL subbundle of OFDM-symbols to transmit DMRS signals (DL DMRS-subbundle) for a required number of spatial MIMO layers of the PDSCH are allocated in a downlink transmission part (DL part) of a downlink transmission—uplink transmission period (DL/UL-period) of a frame.

12. The method of claim 11,
wherein the time interval is a slot comprising 12 or 14 OFDM-symbols,
wherein the OFDM-symbols allocated for the transmission of the downlink control channel are start OFDM-symbols of a first slot of a DL bundle of slots,
wherein the DL bundle of slots includes the at least one DL DMRS-subbundle, and
wherein a first DL DMRS-subbundle of the at least one DL DMRS-subbundle is adjacent to the OFDM-symbols allocated for the transmission of the downlink control channel.

13. The method of claim 11,
wherein the at least one DL DMRS-subbundle is a plurality of DL DMRS-subbundles separated from each other by a DL period of a configurable number of OFDM-symbols,
wherein the DL period is adjustable in the BS, and
wherein the control information further includes the DL period.

14. The method of claim 13, wherein an amount of resources allocated to transmit DMRS signals in a first DL DMRS-subbundle of the plurality is greater than an amount of resources allocated to transmit DMRS signals in each of subsequent DL DMRS-subbundles of the plurality, in such a way that a number of OFDM-symbols of the subsequent DL DMRS-subbundle is less than a number of OFDM-symbols of the first DL DMRS-subbundle.

15. The method of claim 11,
wherein the time interval is a mini-slot,
wherein the mini-slot comprises 1, 2, 4, or 7 OFDM-symbols, and
wherein boundaries of at least a first DL DMRS-subbundle of the at least one DL DMRS-subbundle in a time domain are aligned with boundaries of the mini-slot.

16. A user equipment (UE) for supporting simultaneous transmission of a plurality of spatial multiple input multiple output (MIMO) layers for data transmission in a wireless communication system, wherein a different demodulation reference signal (DMRS) is associated with each of the plurality of spatial MIMO layers, the UE comprising:
a transceiver; and
a controller connected to the transceiver and configured to:
receive, from a base station (BS), downlink control channel including control information indicating a beginning of a downlink (DL) bundle of time intervals and a duration of the DL bundle of time intervals, wherein the DL bundle comprises an integer number of adjacent time intervals, wherein each time interval includes a preset number of orthogonal frequency division multiplexing (OFDM)-symbols, and receive, the spatial MIMO layers of physical downlink shared channel (PDSCH) based on the control information, wherein a preset number of adjacent OFDM-symbols for transmission of the downlink control channel and at least one DL subbundle of OFDM-symbols to transmit DMRS signals (DL DMRS-subbundle) for a required number of spatial MIMO layers of the PDSCH are allocated in a downlink transmission part (DL part) of a downlink transmission—uplink transmission period (DL/UL-period) of a frame.

17. The UE of claim 16, wherein the time interval is a slot comprising 12 or 14 OFDM-symbols, wherein the OFDM-symbols allocated for the transmission of the downlink control channel are start OFDM-symbols of a first slot of a DL bundle of slots, wherein the DL bundle of slots includes the at least one DL DMRS-subbundle, and wherein a first DL DMRS-subbundle of the at least one DL DMRS-subbundle is adjacent to the OFDM-symbols allocated for the transmission of the downlink control channel.

18. The UE of claim 16, wherein the at least one DL DMRS-subbundle is a plurality of DL DMRS-subbundles separated from each other by a DL period of a configurable number of OFDM-symbols, wherein the DL period is adjustable in the BS, and wherein the control information further includes the DL period.

19. The UE of claim 18, wherein an amount of resources allocated to transmit DMRS signals in a first DL DMRS-subbundle of the plurality is greater than an amount of resources allocated to transmit DMRS signals in each of subsequent DL DMRS-subbundles of the plurality, in such a way that a number of OFDM-symbols of the subsequent DL DMRS-subbundle is less than a number of OFDM-symbols of the first DL DMRS-subbundle.

20. The UE of claim 16, wherein the time interval is a mini-slot, wherein the mini-slot comprises 1, 2, 4, or 7 OFDM-symbols, and wherein boundaries of at least a first DL DMRS-subbundle of the at least one DL DMRS-subbundle in a time domain are aligned with boundaries of the mini-slot.

\* \* \* \* \*